United States Patent
Reubinoff et al.

(10) Patent No.: US 12,467,038 B2
(45) Date of Patent: Nov. 11, 2025

(54) METHODS OF CULTURING HUMAN PLURIPOTENT CELLS

(71) Applicant: Hadasit Medical Research Services and Development Ltd., Jerusalem (IL)

(72) Inventors: Benjamin Eithan Reubinoff, Moshav Bar-Giora (IL); Michal Gropp, Jerusalem (IL)

(73) Assignee: Hadasit Medical Research Services and Development Ltd., Jerusalem (IL)

( * ) Notice: Subject to any disclaimer, the term of this patent is extended or adjusted under 35 U.S.C. 154(b) by 965 days.

(21) Appl. No.: 17/613,137

(22) PCT Filed: May 22, 2020

(86) PCT No.: PCT/IL2020/050566
§ 371 (c)(1),
(2) Date: Nov. 22, 2021

(87) PCT Pub. No.: WO2020/234888
PCT Pub. Date: Nov. 26, 2020

(65) Prior Publication Data
US 2022/0213445 A1 Jul. 7, 2022

Related U.S. Application Data

(60) Provisional application No. 62/851,121, filed on May 22, 2019.

(51) Int. Cl.
*C12N 5/074* (2010.01)
*C12N 5/073* (2010.01)
*C12N 5/0735* (2010.01)

(52) U.S. Cl.
CPC ......... *C12N 5/0696* (2013.01); *C12N 5/0603* (2013.01); *C12N 5/0606* (2013.01); *C12N 5/0611* (2013.01); *C12N 2500/98* (2013.01); *C12N 2501/115* (2013.01); *C12N 2501/727* (2013.01); *C12N 2506/03* (2013.01); *C12N 2533/52* (2013.01)

(58) Field of Classification Search
CPC .. C12N 5/0623; C12N 5/0696; C12N 5/0611; C12N 5/0606; C12N 5/0603; C12N 2501/115; C12N 2501/727; C12N 2533/52; C12N 2501/16; C12N 2500/98; C12N 2501/15; C12N 2506/03; C12N 2501/155; C12N 2506/45; C12N 2506/02; C12N 2513/00
See application file for complete search history.

(56) References Cited

FOREIGN PATENT DOCUMENTS

WO WO 2018/138281 8/2018
WO WO 2020/234888 11/2020

OTHER PUBLICATIONS

"Laminins and cell culture". Interchim Innovations (2017), 16 pages, retreived from https://www.interchim.fr/ft/B/BE0061.pdf (Year: 2017).*
Kitadate et al. Competition for Mitogens Regulates Spermatogenic Stem Cell Homeostasis in an Open Niche. Cell Stem Cell (Jan. 2019), 24, 79-82 and appended Star methods. (Year: 2019).*
Kalkan et al. Tracking the embryonic stem cell transition from ground state pluripotency. Development (2017), 144, 1221-1234. (Year: 2017).*
Notice of Reasons for Rejection Dated Nov. 19, 2024 From the Japan Patent Office Re. Application No. 2021-569231 and its Translation Into English. (8 Pages).
Messmer et al. "Transcriptional Heterogeneity in Naive and Primed Human Pluripotent Stem Cells at Single-Cell Resolution", Cell Reports, 26(4): 815-824, Jan. 22, 2019.
International Preliminary Report on Patentability Dated Dec. 2, 2021 From the International Bureau of WIPO Re. Application No. PCT/IL2020/050566. (12 Pages).
International Search Report and the Written Opinion Dated Aug. 11, 2020 From the International Searching Authority Re. Application No. PCT/IL2020/050566. (18 Pages).
Brinkhof et al. "Characterization of Bovine Embryos Cultured Under Conditions Appopriate for Sustaining Human Naive Pluripotency", PLOS ONE, XP055718176, 12(2): e0172920-1-e0172920-25, Feb. 27, 2017.
Kinoshita et al. "Pluripotency Deconstructed", Development Growth & Differentiation, XP055455321, 60(1): 44-52, Jan. 2018.
Morgani et al. "The Many Faces of Pluripotency: In Vitro Adaptations of A Continuum of In Vivo States", BMC Developmental Biology, XP055455295, 17(1): 7-1-7-20, Published Online Jun. 13, 2017.
Rostovskaya et al. "Capacitation of Human Naïve Pluripotent Stem Cells for Multi-Lineage Differentiation", Development, XP055718557, 146(7): dev.172916-1-dev. 172916-15, Apr. 2019.
Smith "Formative Pluripotency: The Executive Phase in A Developmental Continuum", Development, XP055455303, 144(3): 365-373, Feb. 1, 2017.
Theunissen et al. "Systematic Identfication of Culture Conditions for Induction and Maintenance of Naive Human Pluripotency", Cell Stem Cell, XP055237395, 15(4): 471-487, Oct. 1, 2014.
Zhang et al. "OTX2 Restricts Entry to the Mouse Germline", Nature, XP036900242, 562(7728): 595-599, Oct. 25, 2018.
Notice of Reasons for Rejection Dated Mar. 19, 2024 From the Japan Patent Office Re. Application No. 2021-569231 and its Translation Into English. (16 Pages).
Ueda et al. "History of Pluripotent Stem Cells and Human Naive Pluripotent Stem Cells", Cytometry Research, 27 (1): 19-24, 2017.

(Continued)

*Primary Examiner* — Sean C. Barron

(57) ABSTRACT

A culture of human pluripotent stem cells (hPSCs) is disclosed. In the culture, more than 50% of the hPSCs are formative hPSCs and are capable of renewing. Uses thereof are also disclosed.

8 Claims, 44 Drawing Sheets

Specification includes a Sequence Listing.

(56) References Cited

OTHER PUBLICATIONS

Communication Pursuant to Article 94(3) EPC Dated Jan. 17, 2024 From the European Patent Office Re. Application No. 20731583.9 (9 Pages).

\* cited by examiner

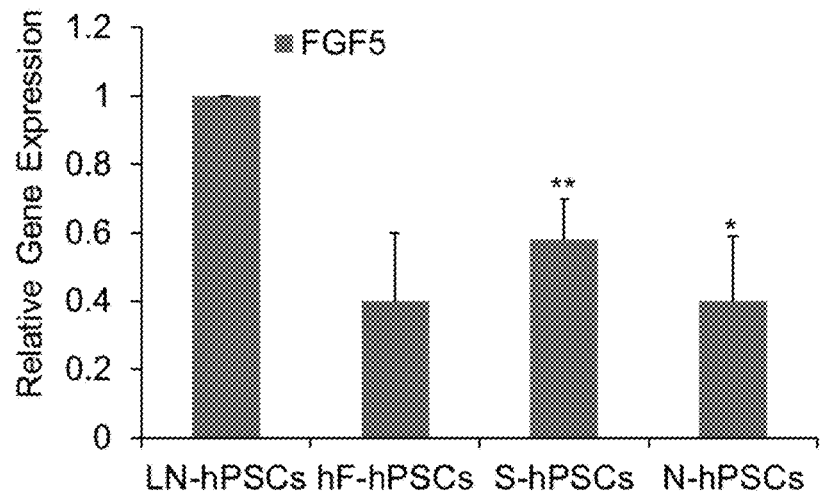

FIG. 2D
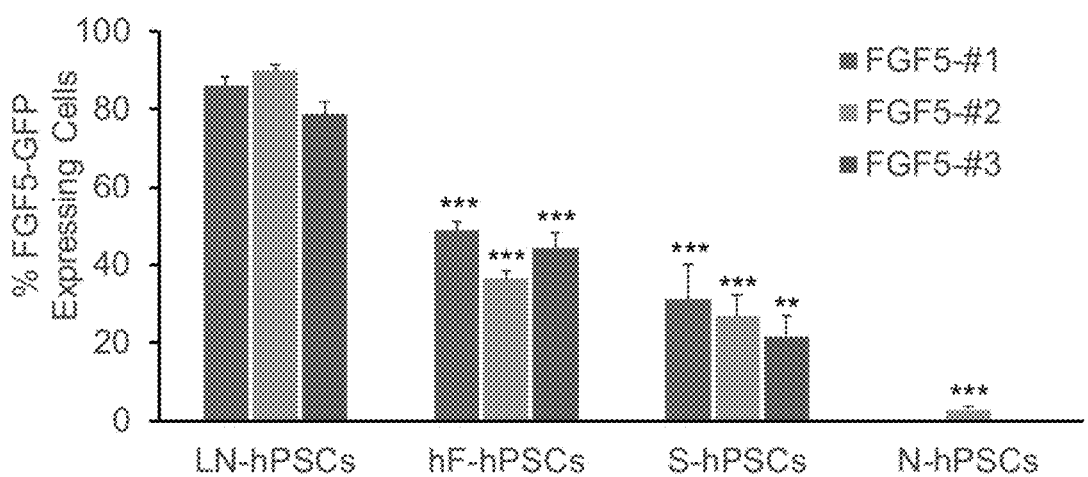

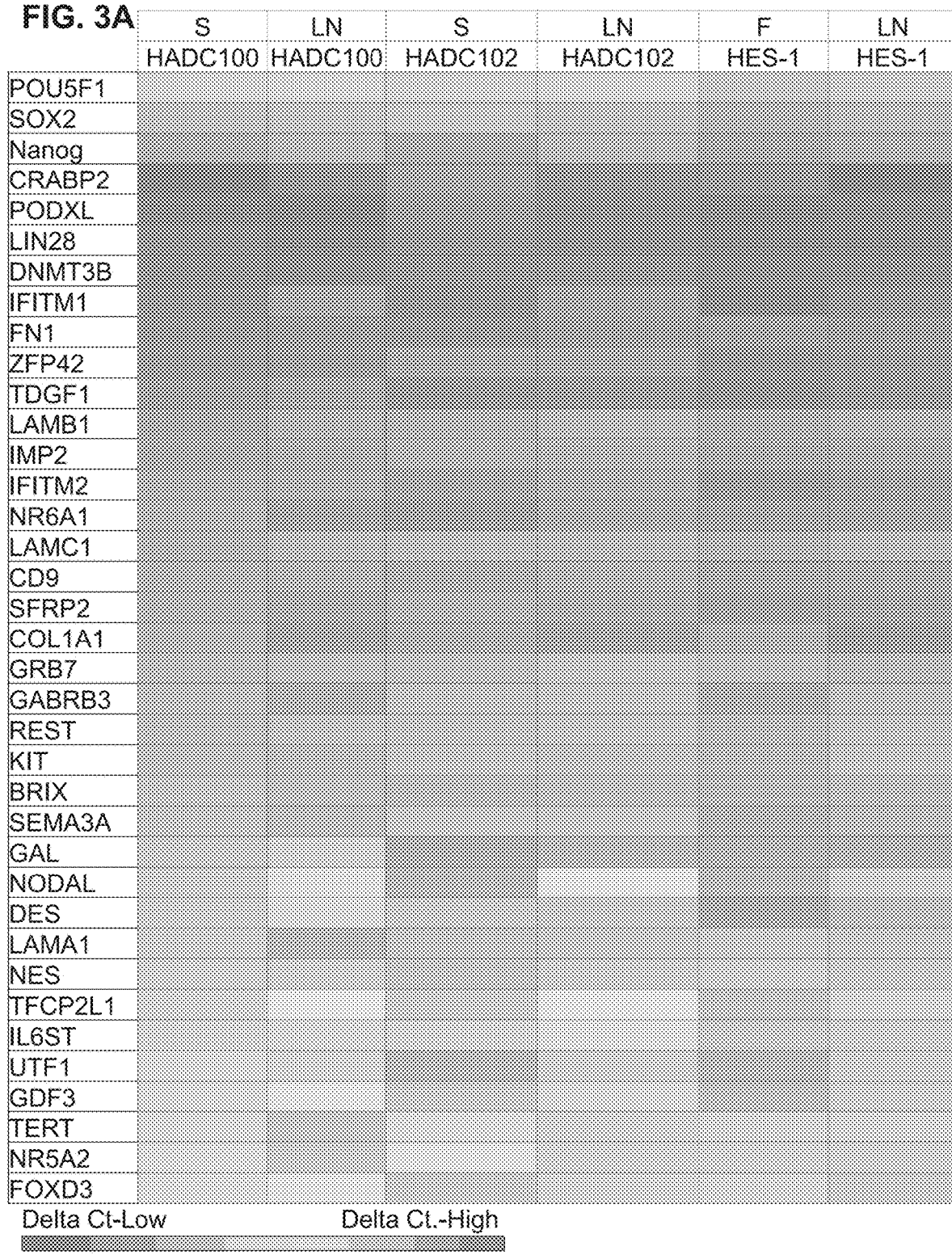

FIG. 3A (Cont. 1)

| | S | LN | S | LN | F | LN |
|---|---|---|---|---|---|---|
| | HADC100 | HADC100 | HADC102 | HADC102 | HES-1 | HES-1 |
| NOG | | | | | | |
| LEFTB | | | | | | |
| FGF5 | | | | | | |
| FGF4 | | | | | | |
| EBAF | | | | | | |
| FLT1 | | | | | | |
| EOMES | | | | | | |
| PAX6 | | | | | | |
| GATA4 | | | | | | |
| FOXA2 | | | | | | |
| PTEN | | | | | | |
| COMMD3 | | | | | | |
| COL2A1 | | | | | | |
| RUNX2 | | | | | | |
| GATA6 | | | | | | |
| SOX17 | | | | | | |
| AFP | | | | | | |
| HBZ | | | | | | |
| CGB | | | | | | |
| GBX2 | | | | | | |
| ISL1 | | | | | | |
| CD34 | | | | | | |
| IAPP | | | | | | |
| DDX4 | | | | | | |
| SST | | | | | | |
| SYP | | | | | | |
| LIFR | | | | | | |
| GCM1 | | | | | | |
| T | | | | | | |
| WT1 | | | | | | |
| NEUROD1 | | | | | | |
| SYCP3 | | | | | | |
| CDH5 | | | | | | |
| SERPINA1 | | | | | | |
| IPF1 | | | | | | |
| Xist | | | | | | |
| CDX2 | | | | | | |

FIG. 3A (Cont. 2)
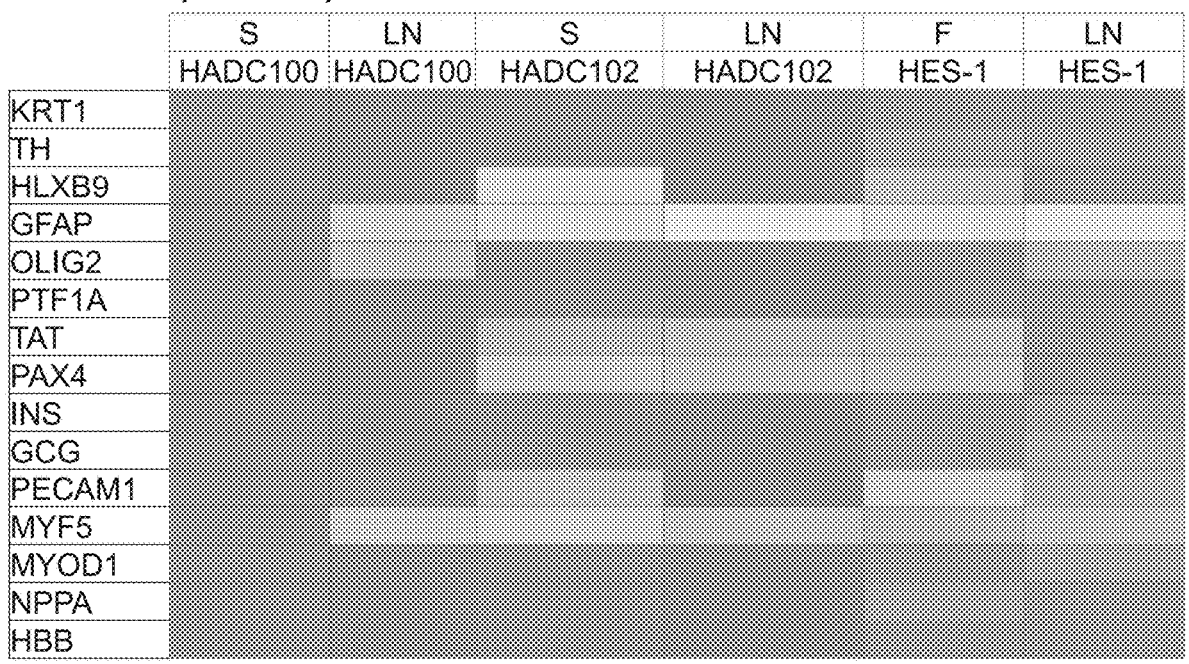

- Activin A
- TGF beta
- ACVRIA
- ACVRIB

FIG. 9A (Cont. 1)
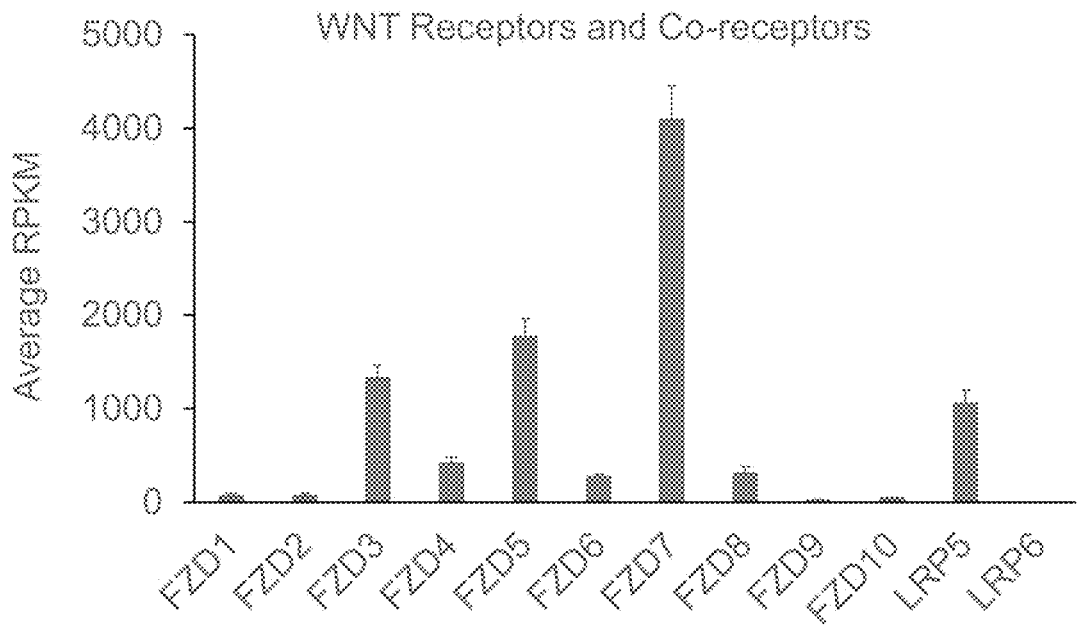
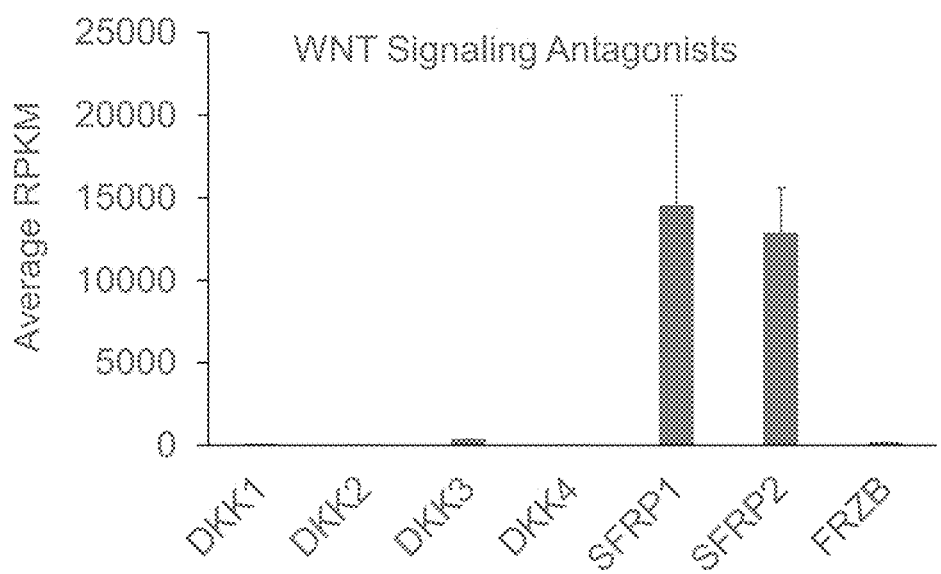

FIG. 10B HES-2, 46 XX

P10 on LN111

FIG. 11B HADC100, 46 XY

|  | Brachyury |
|---|---|
| HES-1-LN111 | 1 |
| HES-2-LN111 | 2.964 |
| HADC100-LN111 | 1.555 |
| HES-1-MEF | 68.164 |

| RQ | Blimp1 | TFAP2C | Nanos3 | Nanog | SOX2 |
|---|---|---|---|---|---|
| d0 | 1 | 1 | 1 | 1 | 1 |
| d2 | 0.882 | 1.928 | 9.4 | 2.52 | 0.72 |
| d3 | 0.53 | 1.607 | 29.96 | 0.898 | 1.078 |
| d4 | 3.158 | 1.853 | 12.814 | 0.958 | 0.166 |
| d7 | 10.1 | 1.253 | 30.446 | 0.536 | 0.016 |

FIG. 16B (Cont. 1)
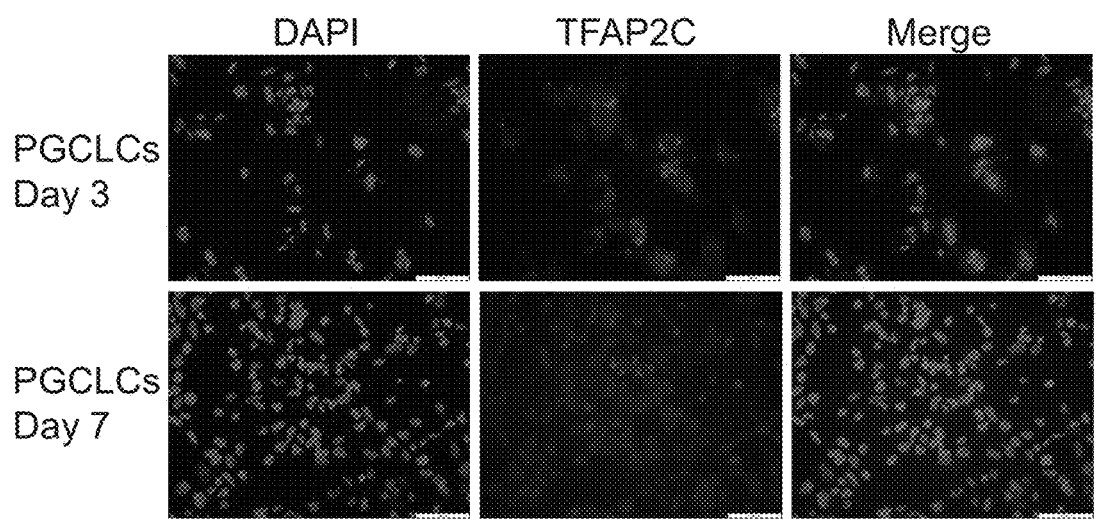

|        | LN111 | rhLN521 |
|--------|-------|---------|
| Oct4   | 1     | 0.999   |
| Nanog  | 1     | 0.905   |
| SOX2   | 1     | 1.219   |
| OTX2   | 1     | 0.758   |
| FOXD3  | 1     | 0.5     |
| ZIC3   | 1     | 1.486   |
| SFRP2  | 1     | 0.773   |
| LIN28A | 1     | 1.518   |

SEQUENCE LISTING

```
<160> NUMBER OF SEQ ID NOS: 24

<210> SEQ ID NO 1
<211> LENGTH: 27
<212> TYPE: DNA
<213> ORGANISM: Artificial sequence
<220> FEATURE:
<223> OTHER INFORMATION: Single strand DNA oligonucleotide

<400> SEQUENCE: 1
cggaattctt gctttcctgg ctgggag                                        27

<210> SEQ ID NO 2
<211> LENGTH: 27
<212> TYPE: DNA
<213> ORGANISM: Artificial sequence
<220> FEATURE:
<223> OTHER INFORMATION: Single strand DNA oligonucleotide

<400> SEQUENCE: 2
cagggcccag cctcggggaa gagaagg                                        27

<210> SEQ ID NO 3
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 3
gacaacagcc tcaagatc                                                  18

<210> SEQ ID NO 4
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 4
gtccaccact gacacgtt                                                  18

<210> SEQ ID NO 5
<211> LENGTH: 19
<212> TYPE: DNA
<213> ORGANISM: Artificial sequence
<220> FEATURE:
<223> OTHER INFORMATION: Single strand DNA oligonucleotide
```

<400> SEQUENCE: 5
agtgagaggc aacctggag                                                    19

<210> SEQ ID NO 6
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 6
gtgaagtgag ggctcccata                                                   20

<210> SEQ ID NO 7
<211> LENGTH: 23
<212> TYPE: DNA
<213> ORGANISM: Artificial sequence
<220> FEATURE:
<223> OTHER INFORMATION: Single strand DNA oligonucleotide

<400> SEQUENCE: 7
cgaagaatag caatggtgtg acg                                               23

<210> SEQ ID NO 8
<211> LENGTH: 21
<212> TYPE: DNA
<213> ORGANISM: Artificial sequence
<220> FEATURE:
<223> OTHER INFORMATION: Single strand DNA oligonucleotide

<400> SEQUENCE: 8
ttccaaagca gcctccaagt c                                                 21

<210> SEQ ID NO 9
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 9
gccctgcagt acaactccat                                                   20

<210> SEQ ID NO 10
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 10
ggtagtgctg ggacatgtga                                                   20

<210> SEQ ID NO 11
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 11
gatcccacga agccaata                                                     18

<210> SEQ ID NO 12

```
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 12
gctccgactg cttgaatc                                                     18

<210> SEQ ID NO 13
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 13
ggacccggtg tacattcc                                                     18

<210> SEQ ID NO 14
<211> LENGTH: 18
<212> TYPE: DNA
<213> ORGANISM: Artificial sequence
<220> FEATURE:
<223> OTHER INFORMATION: Single strand DNA oligonucleotide

<400> SEQUENCE: 14
ctctggcatg caggaacc                                                     18

<210> SEQ ID NO 15
<211> LENGTH: 21
<212> TYPE: DNA
<213> ORGANISM: Artificial sequence
<220> FEATURE:
<223> OTHER INFORMATION: Single strand DNA oligonucleotide

<400> SEQUENCE: 15
aatgttgccg tgaagatctt c                                                 21

<210> SEQ ID NO 16
<211> LENGTH: 21
<212> TYPE: DNA
<213> ORGANISM: Artificial sequence
<220> FEATURE:
<223> OTHER INFORMATION: Single strand DNA oligonucleotide

<400> SEQUENCE: 16
ctgagaacca tctgttgggt a                                                 21

<210> SEQ ID NO 17
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 17
cacgtgtgag acagatggg                                                    19

<210> SEQ ID NO 18
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 18
```

```
ggcggttgtg atagacacg                                            19

<210> SEQ ID NO 19
<211> LENGTH: 21
<212> TYPE: DNA
<213> ORGANISM: Artificial sequence
<220> FEATURE:
<223> OTHER INFORMATION: Single strand DNA oligonucleotide

<400> SEQUENCE: 19
aaccatggct agaggattgg c                                         21

<210> SEQ ID NO 20
<211> LENGTH: 22
<212> TYPE: DNA
<213> ORGANISM: Artificial sequence
<220> FEATURE:
<223> OTHER INFORMATION: Single strand DNA oligonucleotide

<400> SEQUENCE: 20 cttttcaccta cacatccagc tg                                       22

<210> SEQ ID NO 21
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 21
caccatcgag ctcgtgaag                                            19

<210> SEQ ID NO 22
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 22
gagcccttgt catggaagg                                            19

<210> SEQ ID NO 23
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 23
cttgaagaag agacccgat                                            19

<210> SEQ ID NO 24
<211> LENGTH: 19
<212> TYPE: DNA
<213> ORGANISM: Artificial sequence
<220> FEATURE:
<223> OTHER INFORMATION: Single strand DNA oligonucleotide

<400> SEQUENCE: 24
cttctgcacg ctccaccac                                            19
```

METHODS OF CULTURING HUMAN PLURIPOTENT CELLS

RELATED APPLICATIONS

This application is a National Phase of PCT Patent Application No. PCT/IL2020/050566 having International filing date of May 22, 2020, which claims the benefit of priority under 35 USC § 119 (e) of U.S. Provisional Patent Application No. 62/851,121 filed on May 22, 2019. The contents of the above applications are all incorporated by reference as if fully set forth herein in their entirety.

SEQUENCE LISTING STATEMENT

The ASCII file, entitled 90197Sequence-Listing.txt, created on Nov. 22, 2021, comprising 5,256 bytes, submitted concurrently with the filing of this application is incorporated herein by reference. The sequence listing submitted herewith is identical to the sequence listing forming part of the international application.

FIELD AND BACKGROUND OF THE INVENTION

The present invention, in some embodiments thereof, relates to methods of culturing human pluripotent stem cells having formative-like properties.

Pluripotent stem cells (PSCs) are defined by their unique ability to self-renew while maintaining their potential to differentiate into any cell type of the body. In the mammalian embryo PSCs exist transiently for several days, arising at the pre-implantation inner cell mass (ICM) and persisting in the post-implantation epiblast until gastrulation. Two distinct PSC populations can be derived from the mouse embryo: mouse ES cells (mESCs), derived from E3.5-4.5 pre-implantation ICM cells (1, 2), and mouse epiblast stem cells (mEpiSCs) derived from E5.5-8.0 post-implantation epiblast cells (3, 4). Both PSC populations share the hallmark features of pluripotency, but use different signaling pathways for their self-renewal, and exhibit distinct transcriptome, and epigenome. Accordingly, two phases of pluripotency were defined: a ground "naïve" phase that is established at the ICM and a "primed" phase that is established at the post-implantation epiblast, when it becomes primed for lineage specification (5). Lately, it was hypothesized that pluripotent cells progress from the naïve to the primed phase through an intermediate "formative" phase, required to remodel the naïve cells to become a substrate for lineage specification (7). The formative phase is thought to exist in the early post-implantation epiblast (E5.5-6.5), and may be represented by mouse epiblast-like cells (mEpiLCs), that are transiently formed when mESCs are cultured in the presence of Activin A and bFGF. mEpiLCs exhibit unique transcriptome that is similar to the early post-implantation epiblast, and can form primordial germ cells (PGCs) while mEpiSCs lose their potential to generate PGCs (8).

Human embryonic stem cells (hESCs) are PSCs derived from the ICM (9, 10) and were therefore thought to represent the pluripotent cells of the pre-implantation human embryo. Surprisingly, though conventional hESCs are similar to mESCs in many aspects, they share some features with mEpiSCs, in particular, their colony morphology and growth factor requirements. It was proposed that although hESCs were derived from the naïve ICM, they may progress in culture to a more primed pluripotency state reflecting the post-implantation epiblast (5, 11). In support of this hypothesis, transcriptome analyses of hESCs showed that their gene expression profiles differed significantly from pre-implantation human ICMs (12-16), but were similar to post-implantation epiblasts of cynomolgus monkeys (17). Several groups have developed culture conditions supporting a naïve pre-implantation human pluripotency state (18-21). The transcriptome of naïve hPSC more closely resembles the pre-implantation human epiblast (16, 22).

Rostovskaya et al Development (2019) 146, dev172916. doi:10.1242/dev.172916 teaches human pluripotent stem cells having some characteristics of formative pluripotent stem cells.

SUMMARY OF THE INVENTION

According to an aspect of the present invention there is provided a culture of human pluripotent stem cells (hPSCs), wherein more than 50% of the hPSCs are formative hPSCs and are capable of renewing.

According to an aspect of the present invention there is provided a method of enriching for a population of formative hPSCs comprising culturing non-formative hPSCs on an adherent surface which comprises a laminin coating under conditions that enrich for hPSCs in the formative phase, thereby enriching for the population of formative hPSCs.

According to an aspect of the present invention there is provided a method of generating lineage-specific cells from hPSCs comprising differentiating formative hPSCs from the culture described herein under conditions suitable for generating lineage specific cells, thereby generating lineage-specific cells.

According to an aspect of the present invention there is provided a method of generating embryoid bodies from hPSCs, the method comprising culturing formative hPSCs from the culture described herein under conditions suitable for differentiating the hPSCs into embryoid bodies, thereby generating the embryoid bodies from the hPSCs.

According to an aspect of the present invention there is provided a method of generating primordial germ cells from hPSCs comprising culturing formative hPSCs from the culture described herein under conditions suitable for generating primordial germ cells, thereby generating the primordial germ cells.

According to embodiments of the present invention, the formative hPSCs are derived from embryonic stem cells (ESCs).

According to embodiments of the present invention, the ESCs are commercially available ESCs.

According to embodiments of the present invention, the formative hPSCs are derived from induced pluripotent stem cells (iPSCs).

According to embodiments of the present invention, the formative hPSCs are derived directly from an embryo.

According to embodiments of the present invention, the formative hPSCs are reprogrammed from somatic cells.

According to embodiments of the present invention, the formative hPSCs express FGF5.

According to embodiments of the present invention, the formative hPSCs express OTX2.

According to embodiments of the present invention, the formative hPSCs express at least one marker selected from the group consisting of OCT4, NANOG, SOX2, TRA-1-60, SSEA3, SSEA4 and TRA-1-81.

According to embodiments of the present invention, the formative hPSCs co-express at least two markers selected from the group consisting of OCT4, NANOG, SOX2, TRA-1-60 and TRA-1-81.

According to embodiments of the present invention, the formative hPSCs express at less 50% less somatic lineage specific marker as compared to a somatic cell, as measured by immunostaining.

According to embodiments of the present invention, the formative hPSCs express at least one marker selected from the group consisting of OTX2, ZIC3, FOXD3 and LIN28A/B and SFRP2.

According to embodiments of the present invention, the majority of the formative hPSCs express WNT receptors but do not express nuclear B-catenin, as measured by immunostaining.

According to embodiments of the present invention, the formative hPSCs are capable of giving rise to primordial germ cells (PGCs).

According to embodiments of the present invention, the formative hPSCs are genetically modified.

According to embodiments of the present invention, the formative hPSCs are non-genetically modified.

According to embodiments of the present invention, the culture is feeder-free.

According to embodiments of the present invention, the formative hPSCs are attached to a solid surface which comprises a coating of laminin.

According to embodiments of the present invention, the coating is present in an amount of about 20 μg per $cm^2$.

According to embodiments of the present invention, the coating comprises between 50-500 μg of the laminin per 9.6 cm well.

According to embodiments of the present invention, the laminin is selected from the group consisting of laminin 111, laminin 211, laminin 221, laminin 511, laminin 521, laminin 332 and recombinant E8 fragment of laminin 511 or laminin 521.

According to embodiments of the present invention, the laminin is mouse laminin.

According to embodiments of the present invention, the culture further comprises a culture medium which comprises fibroblast growth factor 2 (FGF2).

According to embodiments of the present invention, the culture medium comprises at least one of the following components:
 (i) B27 supplement;
 (ii) N2 supplement;
 (iii) L-glutamine; and
 (iv) antibiotic.

According to embodiments of the present invention, the culture medium comprises each of the following components:
 (i) B27 supplement;
 (ii) N2 supplement;
 (iii) L-glutamine; and
 (iv) antibiotic.

According to embodiments of the present invention, the concentration of the FGF2 is between 5-50 ng/ml.

According to embodiments of the present invention, the concentration of the FGF2 is about 20 ng/ml.

According to embodiments of the present invention, the medium comprises DMEMF12.

According to embodiments of the present invention, the culture is devoid of xeno-contaminants.

According to embodiments of the present invention, the formative hPSCs express at least twice the amount of FGF5 as expressed by naive hPSCs that are cultured on mouse feeder cells, as measured by RT-PCR.

According to embodiments of the present invention, the formative hPSCs express at least 25% less NANOG as compared with naive hPSCs that are cultured on mouse feeder cells, as measured by RT-PCR.

According to embodiments of the present invention, the medium further comprises a ROCK inhibitor.

According to embodiments of the present invention, the non-formative hPSCs comprise human ESCs or induced pluripotent stem cells (iPSCs).

According to embodiments of the present invention, the coating is present in an amount of about 20 μg per $cm^2$.

According to embodiments of the present invention, the coating comprises between 50-500 μg of the laminin per 9.6 cm well.

According to embodiments of the present invention, the conditions comprise in a culture medium which comprises FGF2.

According to embodiments of the present invention, the concentration of the FGF2 is between 5-50 ng/ml.

According to embodiments of the present invention, the concentration of the FGF2 is about 20 ng/ml.

According to embodiments of the present invention, the medium comprises DMEMF12.

According to embodiments of the present invention, the expanding is effected in a medium which is devoid of xeno-contaminants.

According to embodiments of the present invention, the formative hPSCs express FGF5, as measured by immunostaining.

According to embodiments of the present invention, the formative hPSCs express at least one marker selected from the group consisting of OCT4, NANOG, SOX2, TRA-1-60, SSEA3, SSEA4 and TRA-1-81.

According to embodiments of the present invention, the formative hPSCs co-express at least two markers selected from the group consisting of OCT4, NANOG, SOX2, TRA-1-60, SSEA3, SSEA4 and TRA-1-81.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1A:
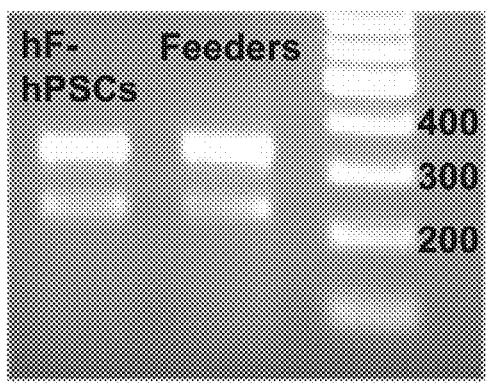
FIGS. 1A-F. hPSCs cultured on human feeders, in suspension, or in naïve conditions express heterogeneous levels of FGF5

(A) RT-PCR analysis of FGF5 expression in hF-hPSCs and their feeders. (B) An image of immunofluorescence staining of hFGF5 (Red) in hF-hPSC colony. Nuclei are counterstained with DAPI (Blue). Bar indicates 100 µm. (C) FACS analyses of FGF5-GFP expression in the three hPSC-FGF5 reporter clones cultured on human feeders, during their spontaneous differentiation in EBs or directed differentiation in NPs. Data are mean±SEM; n≥3 for all experiments. (D) FACS analyses of FGF5-GFP expression in the three hPS-FGF5 reporter clones cultured on human feeders, in suspension, and in naïve conditions. Data are mean±SEM; n≥4 for all experiments. (E) FACS analyses of the co-expression of FGF5-GFP and TRA-1-60 in hPS-FGF5 reporter cells cultured in the three culture systems. Data are mean±SEM; n≥4 for all experiments. (F) Representative FACS analyses of the expression of FGF5-GFP and TRA-1-60 hPS-FGF5 reporter cells cultured in the three culture systems. x-axis-FGF5-GFP, y-axis TRA-1-60.

Abbreviations: hF-hPSCs—hPSCs cultured on human feeders, EBs—Embryoid Bodies, NPs—Neural Progenitors, S-hPSCs—hPSCs cultured in suspension, N-hPSCs—5iLFA naïve hPSCs; *p≤0.05, p≤0.01, *p<0.001.

FIGS. 2A-H. LN111-based culture system promotes the self-renewal of undifferentiated hPSC cultures highly enriched for FGF5-expressing cells.

(A) RT-PCR analysis of FGF5 expression in LN-hPSCs. (B) Real-Time PCR analysis of the relative expression levels of FGF5 in LN-hPSCs compared with hF-hPSCs, S-hPSCs, and N-hPSCs. Data are mean±SEM; n≥5 for all experiments, except for hF-hPSCs (n=2). (C) Images of immunofluorescence staining of FGF5 (Red) in LN-hPSCs. Nuclei are counterstained with DAPI (Blue). Bars indicate 100 µm. (D) FACS analyses of FGF5-GFP expression in the hPS-FGF5 reporter clones cultured on LN111, on human feeders, in suspension, and in 5iLFA naïve conditions. Data are mean±SEM; n≥3 for all experiments. (E) FACS analyses of the expression of FGF5-GFP and the pluripotency cell surface marker TRA-1-60 in hPS-FGF5 reporter cells cultured on LN111. Data are mean±SEM; N=14 for all experiments. (F) Representative FACS analyses of the expression of FGF5-GFP, TRA-1-60 and TRA-1-81 in hPS-FGF5 reporter cells cultured on LN111. x-axis-FGF5-GFP, y-axis TRA-1-60/81. (G) Real-Time PCR analysis of the relative expression levels of KLF2 and KLF4 in LN-hPSCs compared with S-hPSCs. Data are mean±SEM; n≥6 for all experiments. (H) Real-Time PCR analysis of the relative expression levels of FGF5, Oct4 and Nanog in LN-hPSCs 48 hours after transient transfection with a control plasmid (LV-control), or a plasmid expressing KLF4 (LV-KLF4). N≥3 for all experiments. In Real-Time experiments expression levels were normalized to the expression of β-actin.

FIGS. 3A-F. The gene expression profile of LN-hPSCs resembles a more advanced post-implantation formative-like pluripotency state compared with hF-hPSCs, and S-hPSCs.

(A) A heat map presenting the expression of genes present in the Applied Biosystems™ TaqMan™ Human Stem Cell Pluripotency gene expression Array, in HADC100 and HADC102 cells, cultured in suspension or on LN111 (HADC100-S/LN, HADC102-S/LN), and HES-1 cells cultured on human feeders or LN111 (HES-1-hF/LN). Gene expression is presented as Delta-Ct value (the Ct value of each gene normalized to the endogenous 18S control gene). Red color in the heat map represents high expression levels (low DeltaCt), whereas green color represents low expression levels (high DeltaCt). HES-1 samples data is the average of two experiments. (B) The relative expression levels of Nanog, Sox2, and Oct4 in the HADC100-S/LN, HADC102-S/LN, and HES-1-hF/LN samples. Expression levels are normalized to the expression of 18S. HES-1 samples data is the average of two experiments. (C) Real-Time PCR analysis of the relative expression levels of Nanog, SOX2, and Oct4 in HES-1 cells cultured on LN111, on human feeders, in suspension, and in 5iLFA naïve conditions. Expression levels are normalized to the expression of β-actin. Data are mean±SEM; n≥3 for all experiments. (D) Pairwise correlation coefficient (r) of the expression of Nanog with all pluripotency-associated genes expressed in the HADC100-S/LN, HADC102-S/LN, and HES-1-hF/LN samples. (E-F) RNA seq. analysis of the relative expression levels of naïve-associated genes (E) and primed and formative-associated genes (F) in LN-hPSCs vs. hF-hiPSCs. Data are mean of three independent samples.

FIGS. 4A-E. The gene expression profile of LN-hPSCs corresponds to an early post-implantation, formative-like pluripotency state between naïve and conventional/primed hPSCs.

(A) Clustering by dendogram of RNA-seq. data of LN-hPSCs with published RNA-seq. data of conventional/primed hPSCs cultured on MEFs [Takashima, 2014 Cell 158, 1254-1269; Irie, 2015 Cell 160, 253-268; Ji, 2016 Cell Stem Cell 18, 262-275], or on Matrigel [Chan, 2013 Cell 13, 663-675], and naïve hPSCs cultured in 5iLFA [Ji, 2016 Cell Stem Cell 18, 262-275], or in 2tiLGo conditions [Takashima, 2014 Cell 158, 1254-1269; Guo, 2016 Stem Cell Reports 6, 437-446]. (B) Heatmap of RNA-seq. data presenting the expression of selected naïve-associated (a-b), formative-associated (c) and primed-associated pluripotency genes in LN-hPSCs vs. naïve and conventional/primed hPSCs. Data are mean of three independent samples. (C) Clustering by dendogram of RNA-seq. data of LN-hPSCs with published RNA-seq. data of "epiblast"-defined cells in pre-implantation human embryos [Yan, 2013 Nat Struct Mol Biol 20, 1131-1139; Blakeley, 2015, Development 142, 3151-3165; Petropoulos, 2016 Cell 165, 1012-1026; Stirparo, 2018, Development 145]. LB_1, LB_2-late blastocyst cells-Yan et. Al., EPI_I, EPI_2—epiblast cells—Blakeley et al, E6_1,2, 3,4 and E7_1,2,3,4-pooled samples of E6 and E7 epiblast cells-Petropoulos et al. (D) Heatmap of the correlation efficiencies of RNA-seq. data of LN-hPSCs and published RNA-seq. data of epiblast-defined cells in pre-implantation human embryos. Clustering was based on the expression of genes that were differentially expressed between naïve and conventional/primed hPSC samples [Stirparo, 2018, Development, 145]. (E) RRBS analysis of global methylation in of HES-1 and HES-2 hPSC lines cultured on LN111 compared with published RRBS data of conventional/primed and naïve hPSCs.

FIGS. 5A-G. The FGF and TGFβ/activin dependent signaling pathways are required for the self-renewal of LN-hPSCs.

(A) Phase-contrast images of LN-hPSC colonies cultured in the basic medium (DMEM/F12 containing N2/B27 and FGF2), or in the absence of FGF2. Bars indicate 200 µm. (B) FACS analysis of TRA-1-60 expression in LN-hPSCs cultured in the presence or absence of FGF2. Data are mean±SEM. n=3. (C,E,F) Phase-contrast images of LN-hPSC colonies cultured in the presence of (C) PD, or LY (E) SB (F) PD, LY, and SB. Bars indicate 200 µm. (D) RT-PCR analysis of the expression of components of the TGFβ/activin signaling pathway in LN-hPSCs. (G) Real-Time PCR analysis of the relative expression levels of Nanog and Oct4 in LN-hPSCs cultured in the basic medium and in the presence of the various inhibitors. Expression levels are normalized to the expression of β-actin. Data are mean±SEM; n≥3 for all experiments except −F+SB+PD+LY, n=2; Abbreviations: F—FGF2, PD—PD032590, LY—LY294002, SB—SB431542.

FIGS. 6A-H. LN-hPSCs respond to WNT stimulation by upregulation of PS (primitive streak) markers, and initiate PGC specification upon BMP induction.

(A) Images of immunofluorescence staining of β-catenin (green) in LN-hPSCs and naïve 5iLFA. Nuclei are counterstained with DAPI (Blue). Bars indicate 50 μm. (B) Phase-contrast images LN-hPSC colonies cultured in the basic medium supplemented with FGF2, or in the presence of XAV. Bars indicate 200 μm. (C) FACS analyses of the expression of TRA-1-60 in LN-hPSCs cultured as in (B). Data are mean±SEM; N=5 (D) Phase-contrast image of LN-hPSC colony cultured in the basic medium supplemented with FGF2, in the presence of CHIR. Bars indicate 200 μm. (E-F) Real-Time PCR analyses of the relative expression levels of pluripotency markers (E), and PS and mesendodermal markers (F), in LN-hPSCs cultured in the basic medium supplemented with FGF2, and in the presence of CHIR. Expression levels are normalized to the expression of GusB. Data are mean±SEM; n≥3 for all experiments.

FIGS. 7A-H. Characterization of HES-1 cells cultured on LN111.

(A) Phase contrast image of HES-1 colony on LN111. Bar indicates 100 μm. (B) HES-1 cells propagated on LN111 for 10 passages maintain a normal karyotype (46,XY). (C) Immunofluorescence staining images of HES-1 cells cultured on LN111 and differentiated in vitro into ectodermal (β-Tubulin-III), mesodermal (muscle actin) and endodermal (FOXA2) cells. Nuclei are counterstained with DAPI (Blue). Bars indicate 100 μm. (D) Histological analysis of teratomas generated after subcutaneous transplantation of HES-1 cells cultured on LN111 into NOD/SCID mice showing in vivo differentiation into all three lineages. Bars indicate 200 μm (E) RT-PCR analysis showing that hESCs cultured on LN111 express the key pluripoency transcription factors Oct4, Nanog, and SOX2. (F) Immunofluorescence staining image showing that the majority of the hESCs cultured on LN111 express Oct4. Nuclei are counterstained with DAPI (Blue). Bars indicate 50 μm. (G) FACS analysis showing that ≥90% of the cells express the pluripotency associated cell-surface markers TRA-1-60 (n=8) and TRA-1-81 (n=6). Data are mean±SEM. (H) Image of HES-1 colonies expressing Alkaline Phosphatase. Bar indicates 1 mm.

Figure 8A:
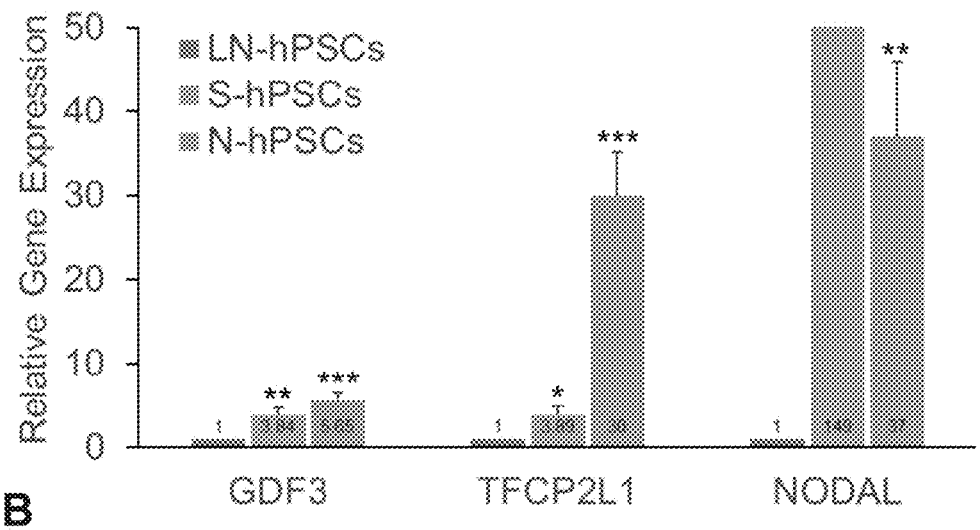
Figure 8B:
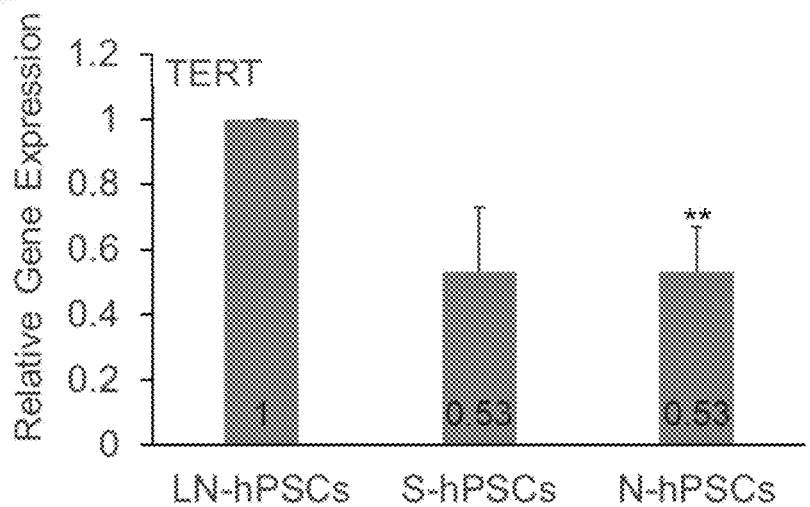
Figure 8C:
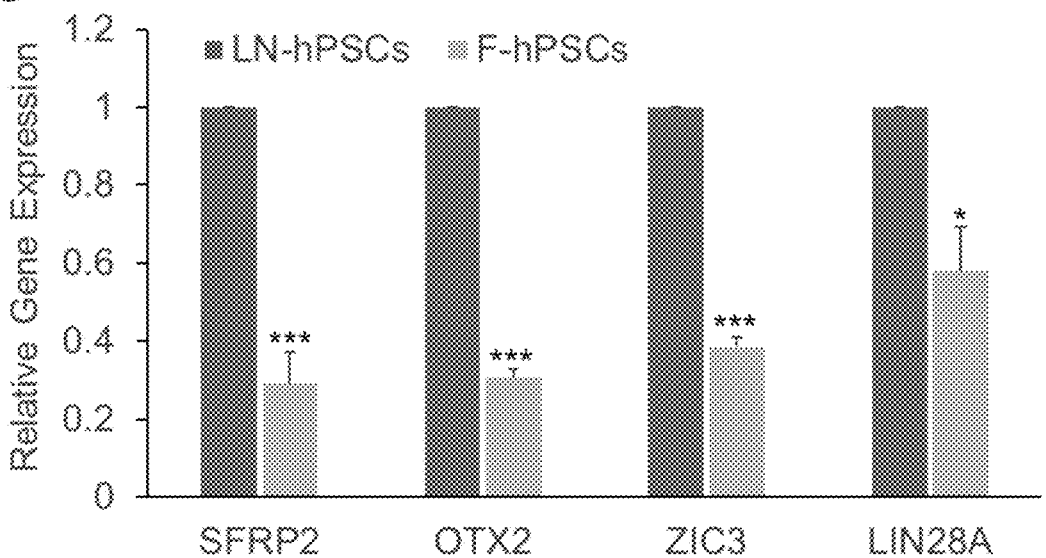

FIGS. 8A-C. HES-1 cells cultured on LN111 and in suspension exhibit differential gene expression.

(A-B) Real-Time PCR analysis of the relative expression levels of "naïve" pluripotency-associated genes (A) and TERT (B) in HES-1 cells cultured on LN111 and in suspension shows higher expression of these genes in cells cultured in suspension. Expression levels are normalized to the expression of β-actin. Data are mean±SEM; *—p≤0.05, p≤0.01, *p≤0.001; n≥3. (C) Real-Time PCR analysis of the relative expression levels of "formative" pluripotency-associated genes in LN-hPSCs vs. F-hiPSCs. Data are mean±SEM; n≥3 for all experiments; *p≤0.05, p≤0.01, *p<0.001.

Figure 9A:
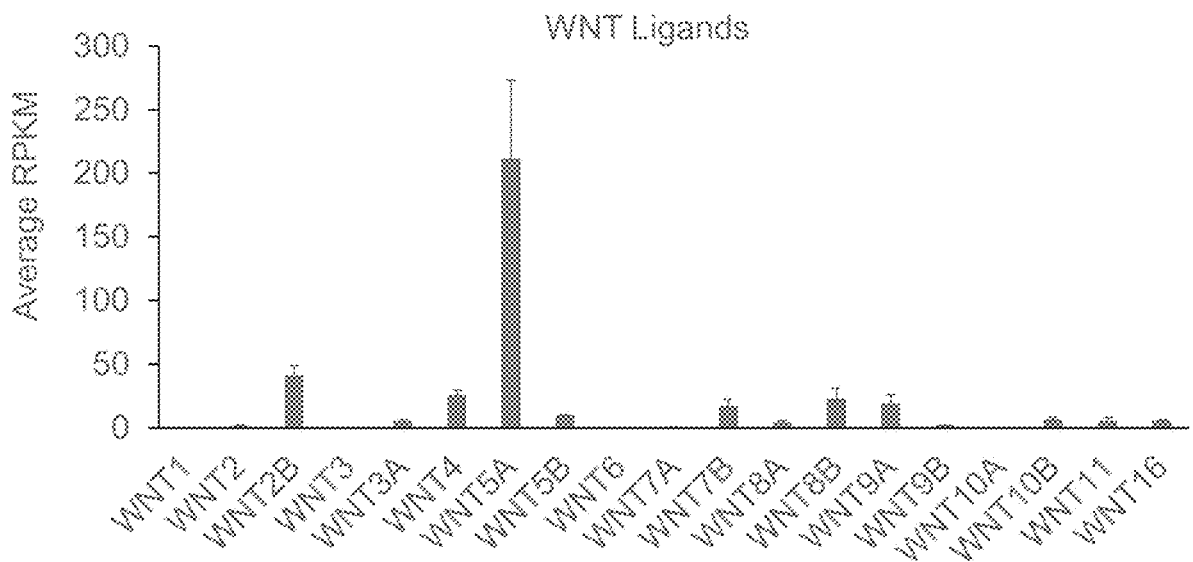
Figure 9A:
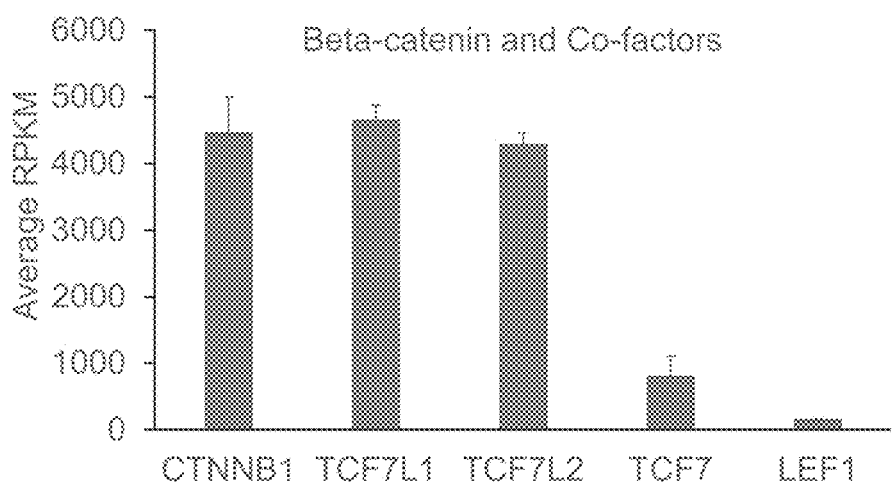
Figure 9B:
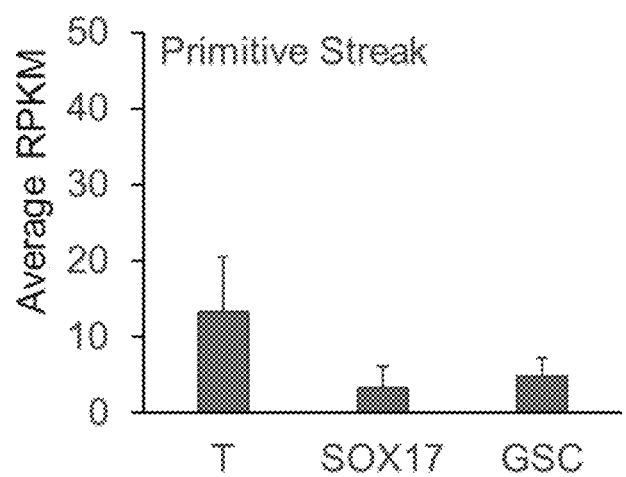
Figure 10A:
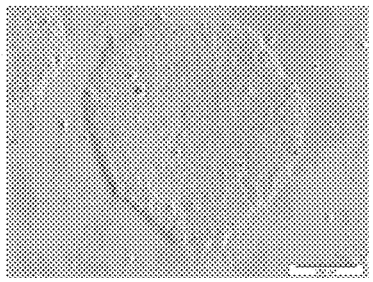
Figure 10A:
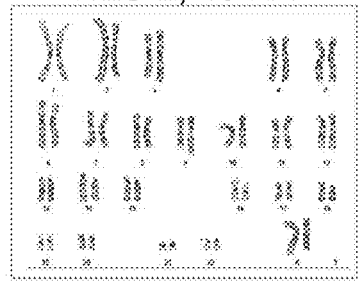
Figure 10C:
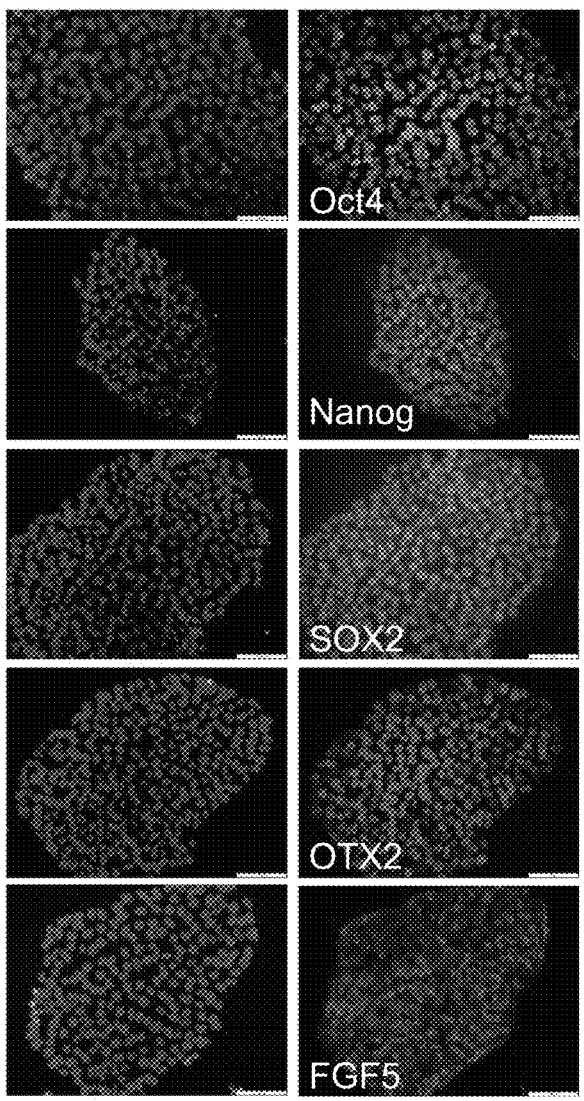
Figure 10D:
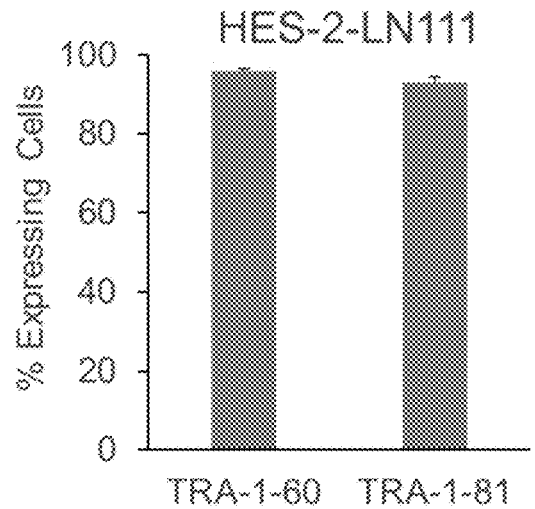
Figure 10E:
Figure 11A:
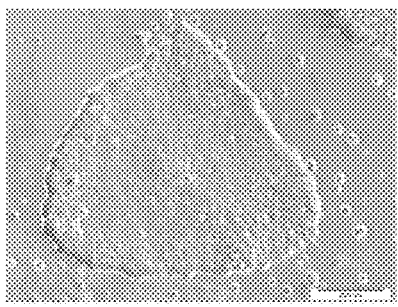
Figure 11A:
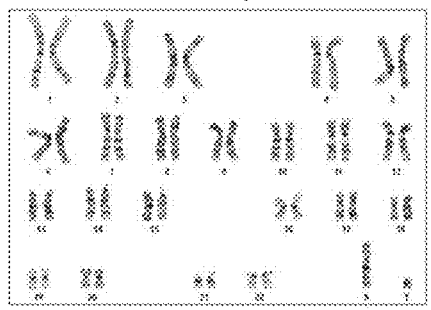
Figure 11C:
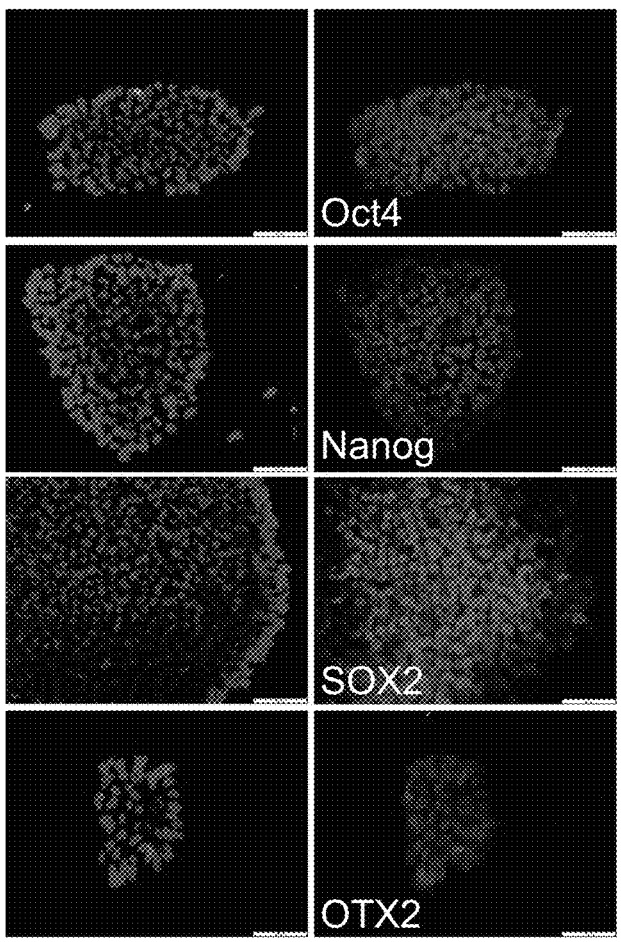
Figure 11D:
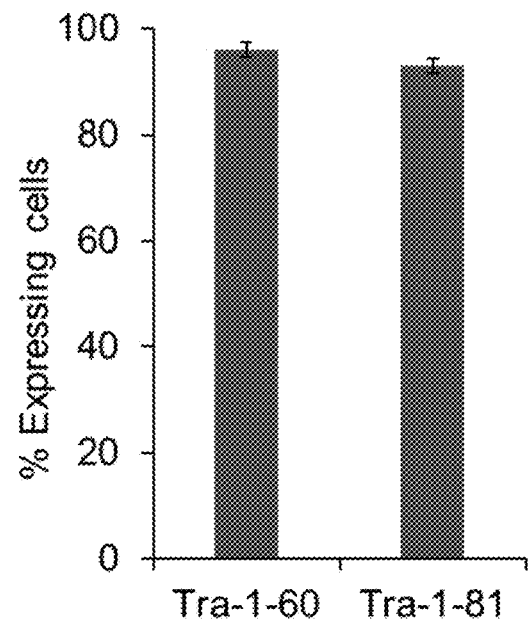
Figure 11E:
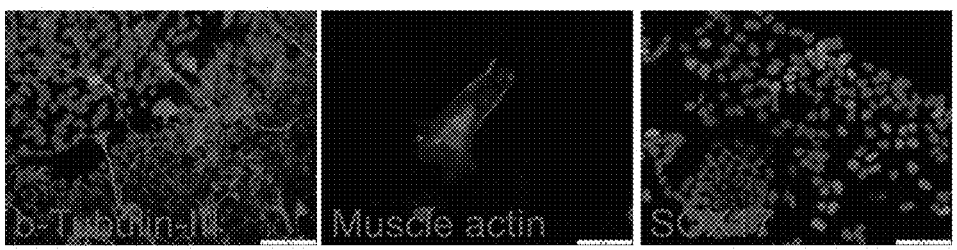

FIGS. 9A-B. RNA-seq. analysis of the expression of various components of the canonical WNT signaling in LN-hPSCs.

RNA seq. analysis of (A) WNT ligands, β-catenin and its co-factors, WNT receptors and their co-receptors, and WNT signaling antagonists, and (B) The early primitive markers T, SOX17, and GSC. Data are mean±SEM for three independent biological samples.

FIGS. 10A-E. Laminin 111-based culture system supports prolonged self-renewal of genetically stable HES-2 hPSCs, retaining their pluripotent potential (A) Phase-contrast image of HES-2 colony on LN111. Bar indicates 200 μm. (B) Karyotype analysis of HES-2 hPSCs propagated on LN111 for 10 passages. (C) Images of immunofluorescence staining of the key pluripotency transcription factors Oct4, Nanog, and SOX2, and the post-implantation markers OTX2 and FGF5, in HES-2 hPSCs cultured on LN111. Nuclei are counterstained with DAPI (Blue). Bars indicate 100 μm. (D) FACS analyses of the expression of the pluripotency-associated cell-surface markers TRA-1-60 and TRA-1-81 (n=3) in HES-2 hPSCs cultured on LN111. Data are mean±SEM. (E) Immunofluorescence staining images of HES-2 hPSCs cultured on LN111 and differentiated in vitro into ectodermal (b-Tubulin-III), mesodermal (muscle actin) and endodermal (SOX17) cells. Nuclei are counterstained with DAPI (Blue). Bars indicate 100 μm.

FIGS. 11A-E—Laminin 111-based culture system supports prolonged self-renewal of genetically stable HADC100 hPSCs, retaining their pluripotent potential (A) Phase-contrast image of HADC100 colony on LN111. Bar indicates 200 μm. (B) Karyotype analysis of HADC100 hPSCs propagated on LN111 for 10 passages. (C) Images of immunofluorescence staining of the key pluripotency transcription factors Oct4, Nanog, and SOX2, and the post-implantation marker OTX2, in HHADC100 hPSCs cultured on LN111. Nuclei are counterstained with DAPI (Blue). Bars indicate 100 μm. (D) FACS analyses of the expression of the pluripotency-associated cell-surface markers TRA-1-60 and TRA-1-81 (n=3) in HADC100 hPSCs cultured on LN111. Data are mean±SEM. (E) Immunofluorescence staining images of HADC100 hPSCs cultured on LN111 and differentiated in vitro into ectodermal (b-Tubulin-III), mesodermal (muscle actin) and endodermal (SOX17) cells. Nuclei are counterstained with DAPI (Blue). Bars indicate 100 μm.

Figure 12A:
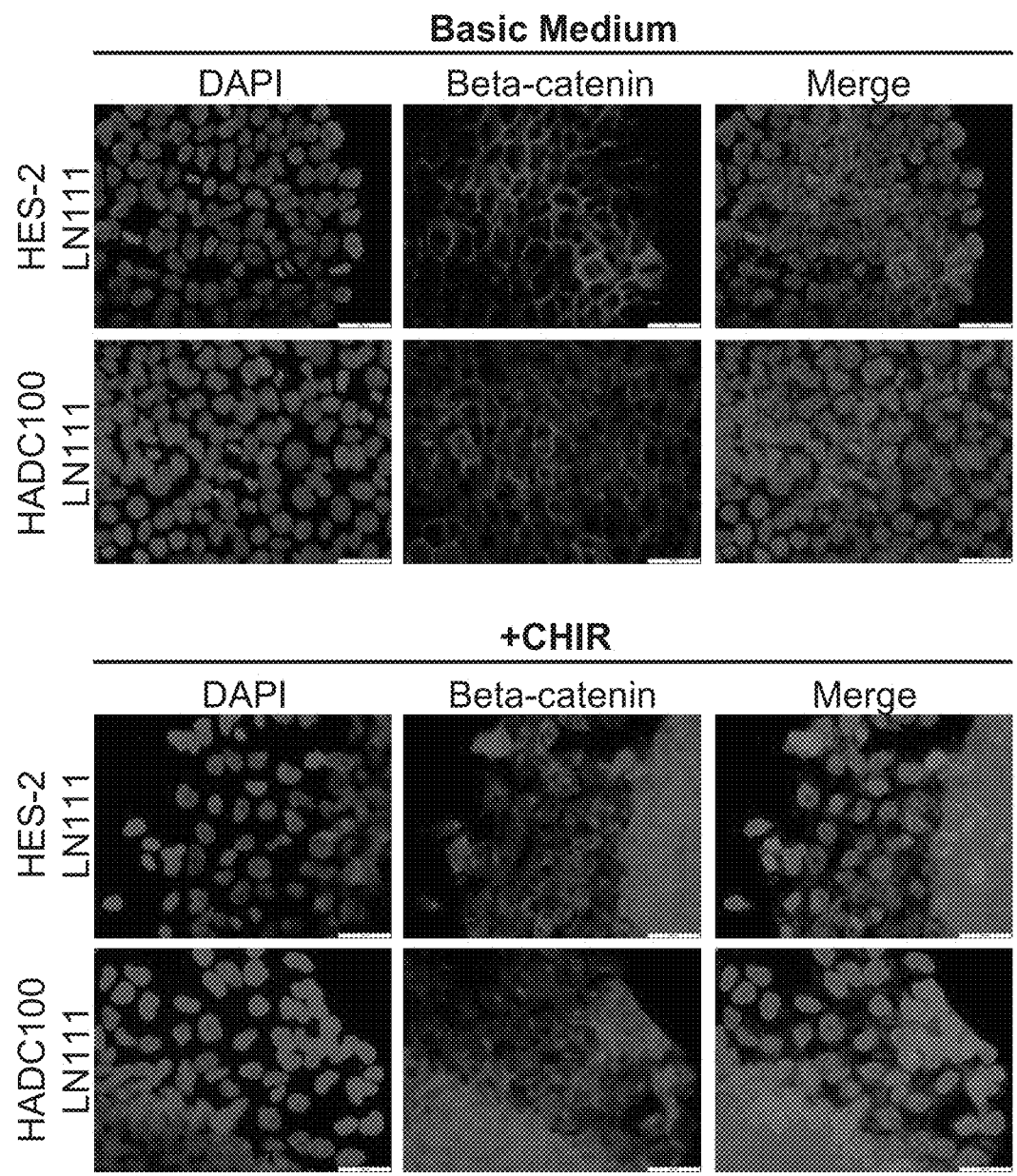
Figure 12B:
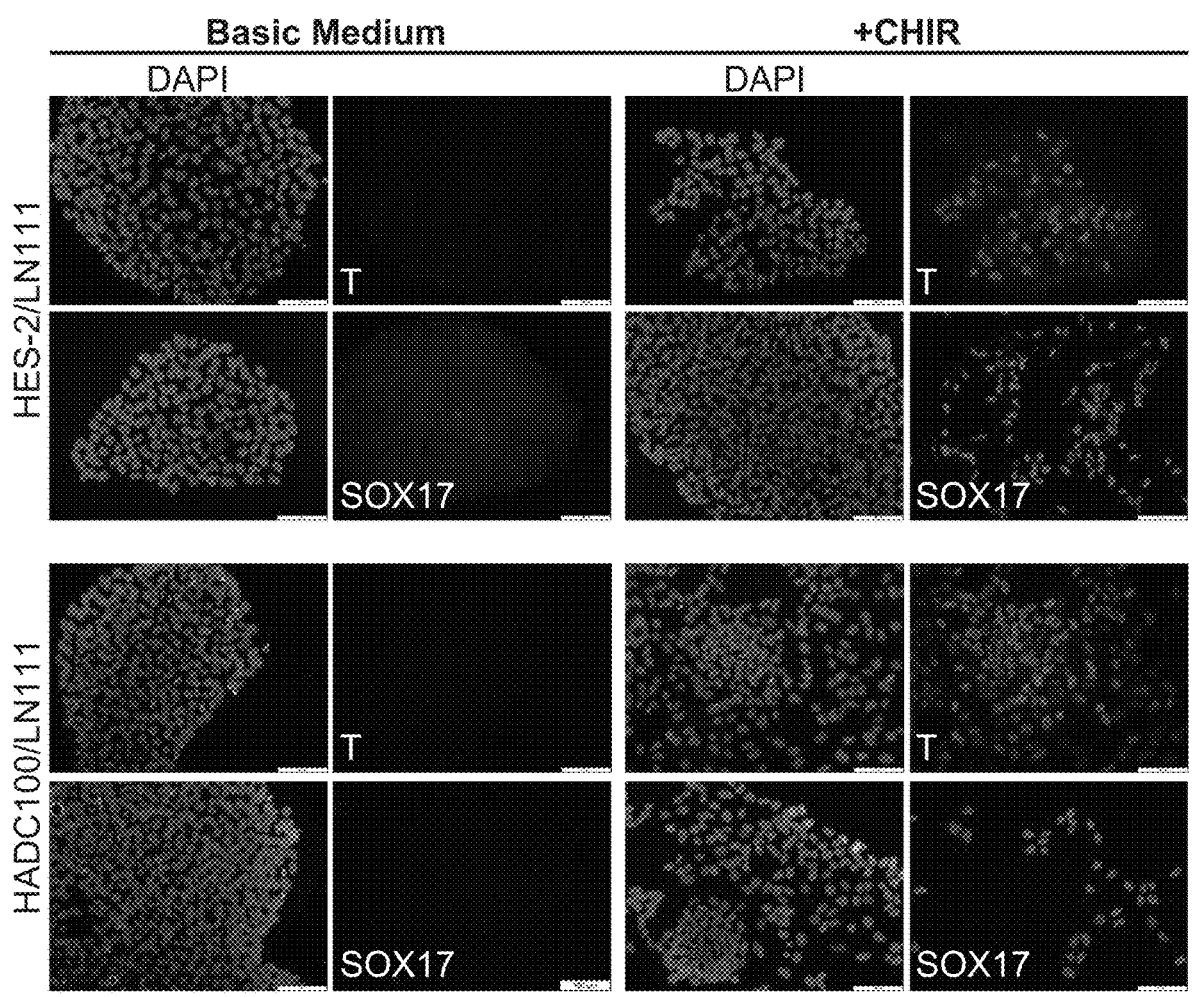

FIGS. 12A-B. The canonical WNT signaling is inactive in HES-2 and HADC100 hPSCs cultured on LN111, and its induction up-regulates primitive streak and mesendodermal markers (A) Images of immunofluorescence staining of b-catenin (Red) in HES-2 and HADC100 hPSCs cultured on LN111 in the basic medium containing FGF2, and in the presence of the canonical WNT signaling agonist, CHIR99021 (CHIR). Nuclei are counterstained with DAPI (Blue). Bars indicate 50 μm. (B) Images of immunofluorescence staining of the primitive streak and mesendodermal markers T (Brachyury) and SOX17, in HES-2 and HADC100 hPSCs cultured on LN111 in the basic medium containing FGF2, and in the presence of CHIR. Nuclei are counterstained with DAPI (Blue). Bars indicate 100 μm.

Figure 13A:
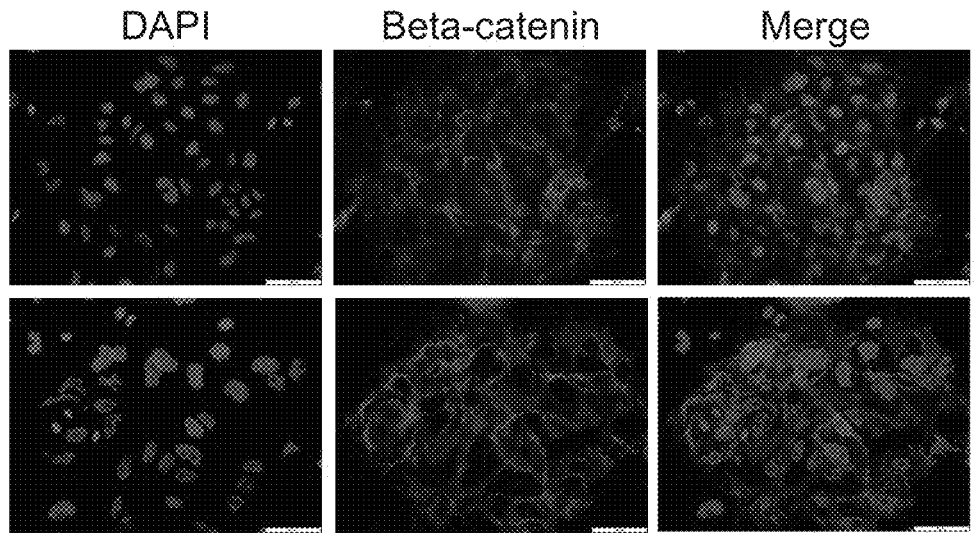
Figure 13B:
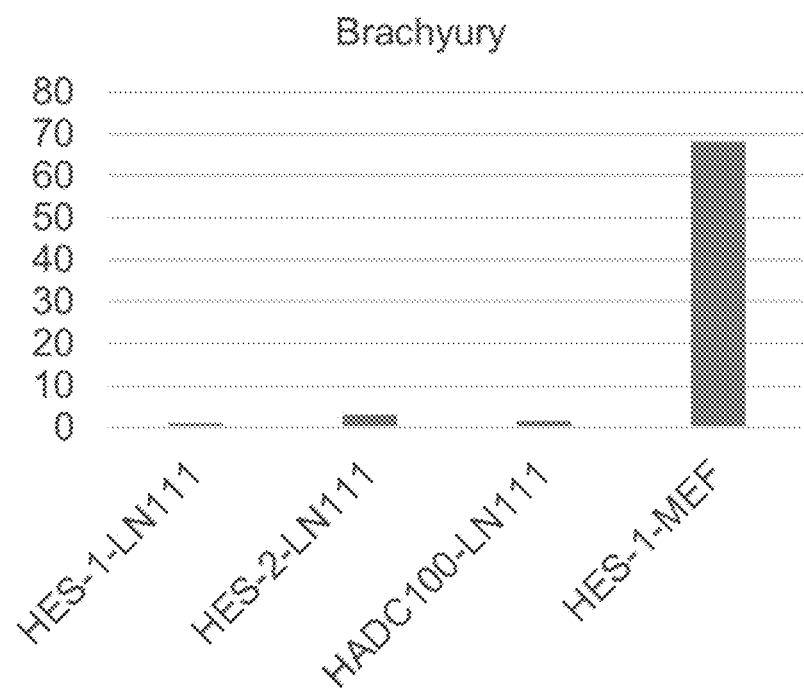

FIGS. 13A-B—The canonical WNT signaling is partially active in conventional/primed HES-1 hPSCs cultured on MEFs (A) Images of immunofluorescence staining of b-catenin (Red) in HES-1 hPSCs cultured on MEFs. Nuclei are counterstained with DAPI (Blue). Bars indicate 50 μm. (B) Real-time PCR analysis of the relative expression levels of T (brachyury) in hPSC (HES-1, HES-2, and HADC100) cultured on LN111, and HES-1 PSCs cultured on MEFs. Expression levels are normalized to the expression of GusB.

FIGS. 14A-D—Global Methylation analysis of the autosomal chromosomes of HES-1 and HES-2 hPSCs cultured on LN111, shows intermediate methylation levels between Naïve and conventional/primed hPSCs, that are more similar to primed hPSCs. Reduced representation bisulphite sequencing (RRBS) analysis of the global methylation of the autosomal chromosomes of HES-1 and HES-2 hPSC lines cultured on LN111 compared with published RRBS data of primed and naïve hPSCs (Theunissen et al., 2016). (A) Mean Global CpG methylation percentages (B) Globl CpG methylation distribution (C-D) Differentially methylated regions (Methylation cutoff 30%) between hPSCs cultured on LN111 and naïve hPSCs (C) and conventional/primed hPSCs (D).

Figure 15A:
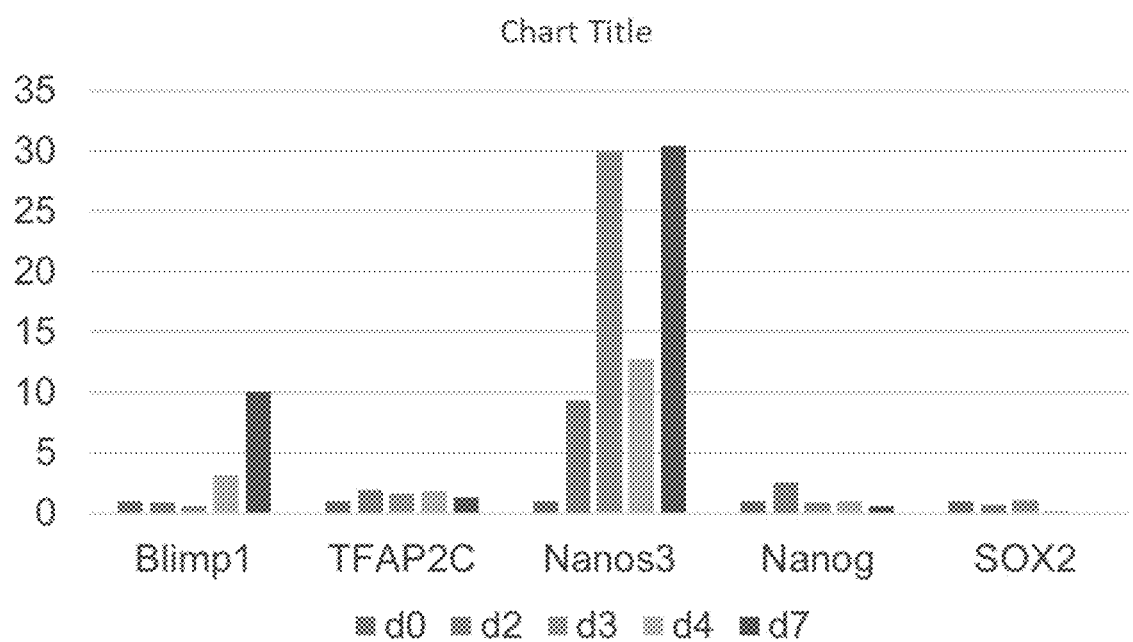
Figure 15B:
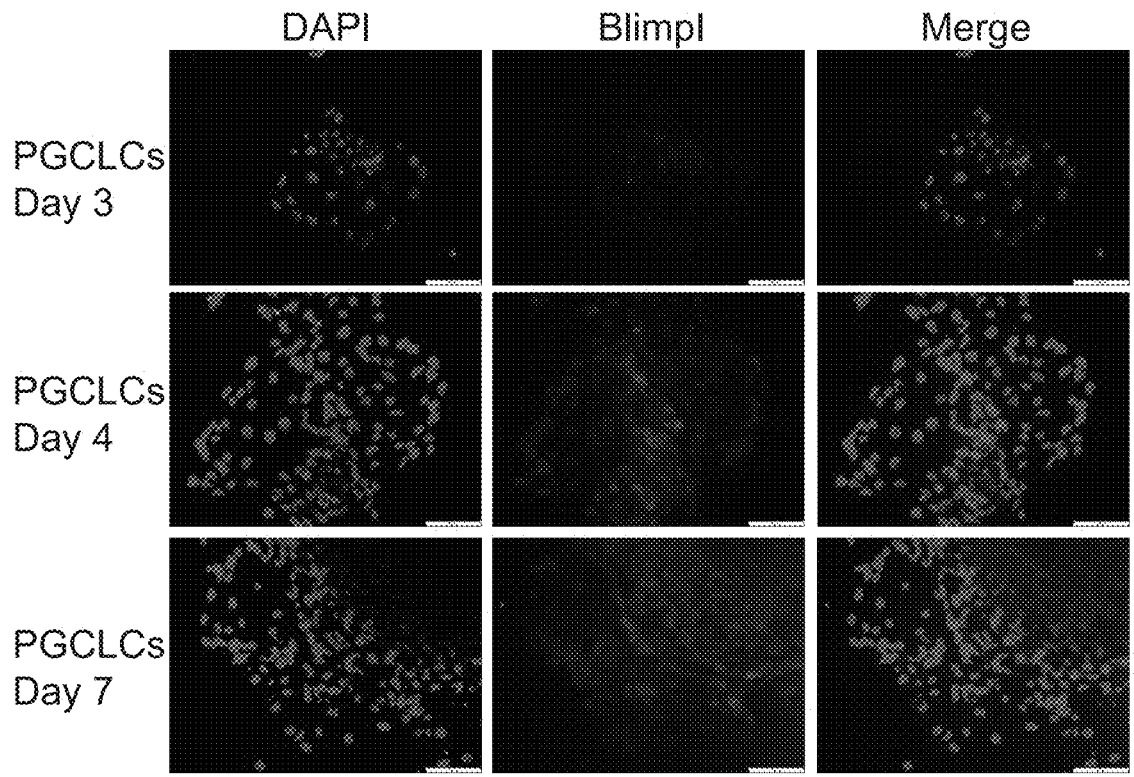
Figure 15B:
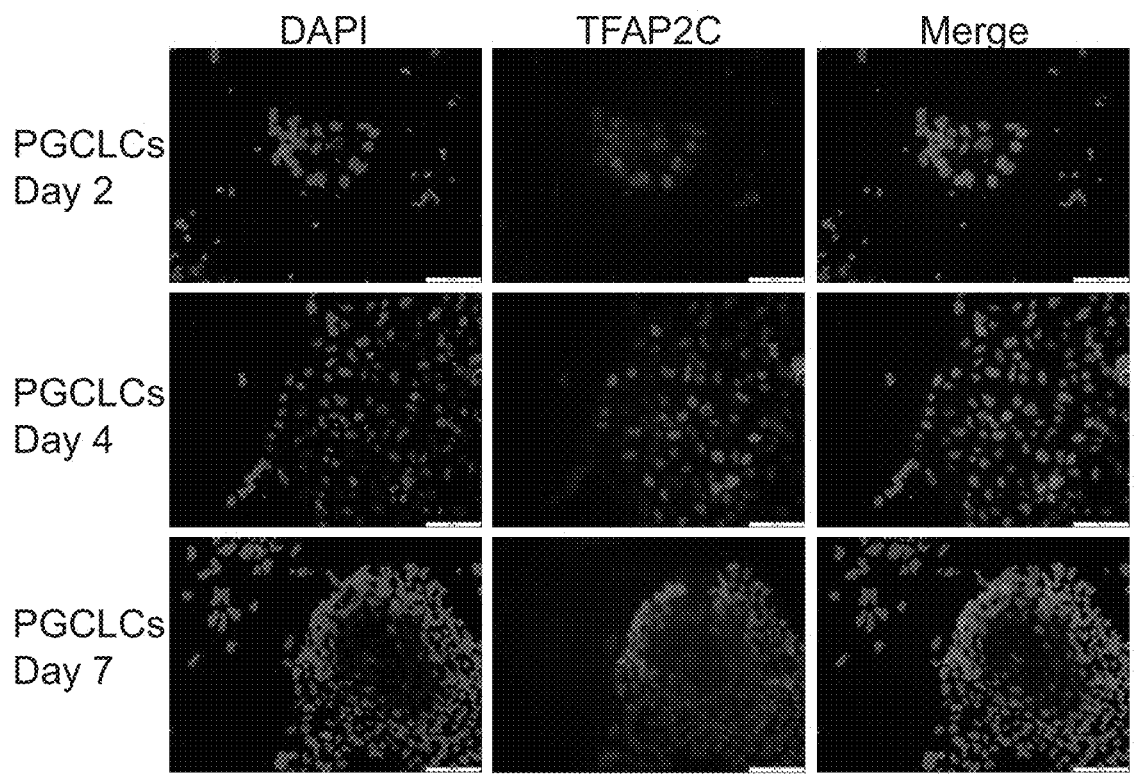

FIGS. 15A-B—HES-2 hPSCs cultured on LN111 are competent to initiate germ cell specification (A) Real-time PCR analysis of the relative expression levels of pluripotency markers and the PGC markers Blimp1, TFAP2C and Nanos3, in HES-2 hPSCs cultured on LN111 in the basic medium containing FGF2 (day 0), and as Embryoid Bodies (EBs), in a medium without FGF2, and in the presence of BMP4, LIF, SCF and EGF. (B) Images of immunofluorescence staining of early PGC markers in HES2-LN111 hPSCs cultured as EBs. Nuclei are counterstained with DAPI (Blue). Bars indicate 100 µm. In the Real-time experiment, expression levels are normalized to the expression of GusB.

Figure 16A:
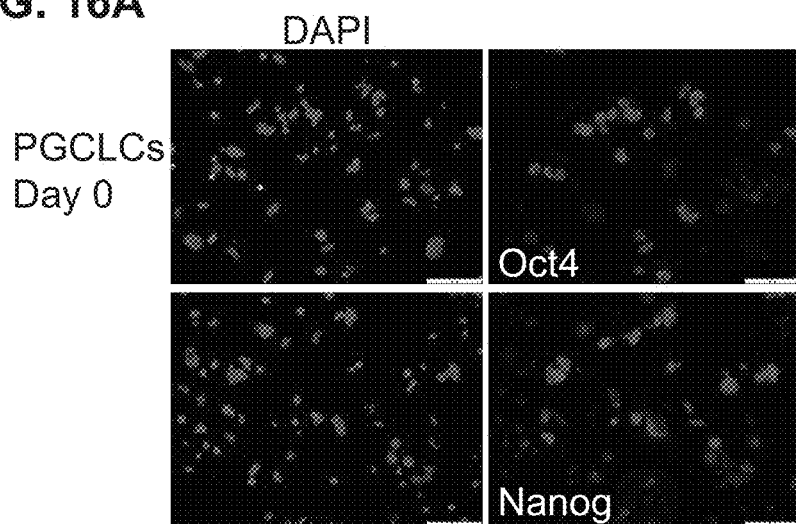
Figure 16B:
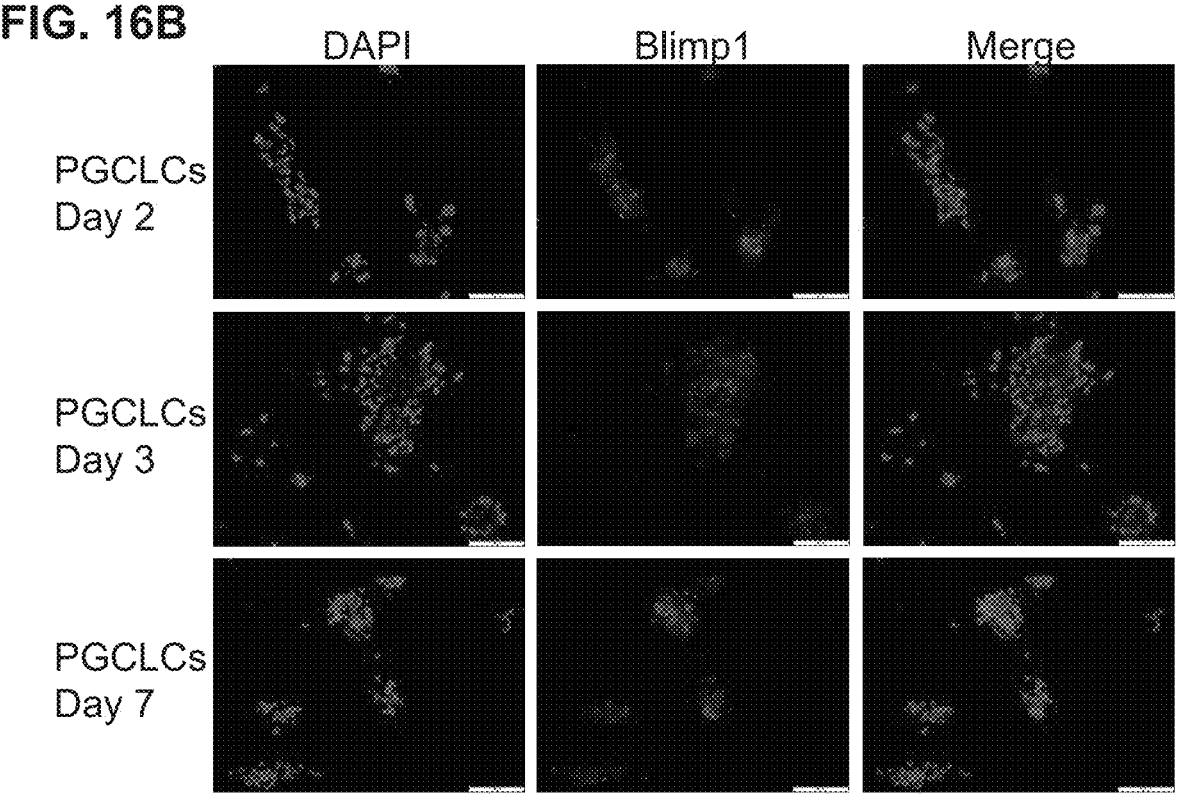

FIGS. 16A-B—HES-1 hPSCs cultured on MEFs do not express PGC markers upon PGC induction (A-B) Images of immunofluorescence staining of pluripotency markers (A) and early PGC markers (B) in HES1-MEFs hPSCs cultured as EBs. Nuclei are counterstained with DAPI (Blue). Bars indicate 100 µm. In the Real-time experiment, expression levels are normalized to the expression of GusB.

Figure 17A:
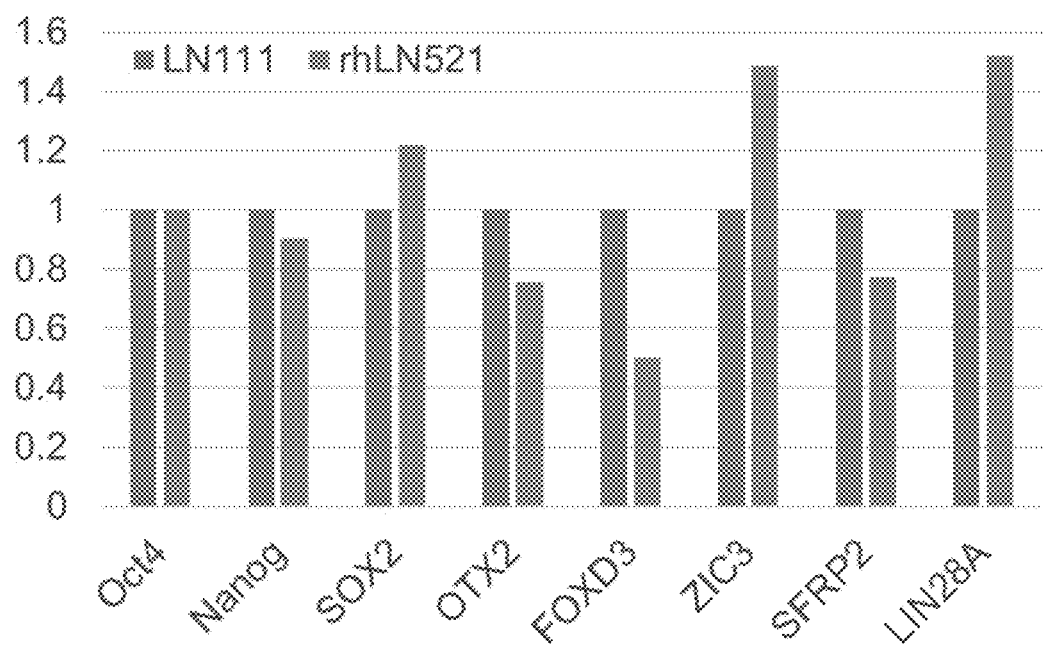
Figure 17B:
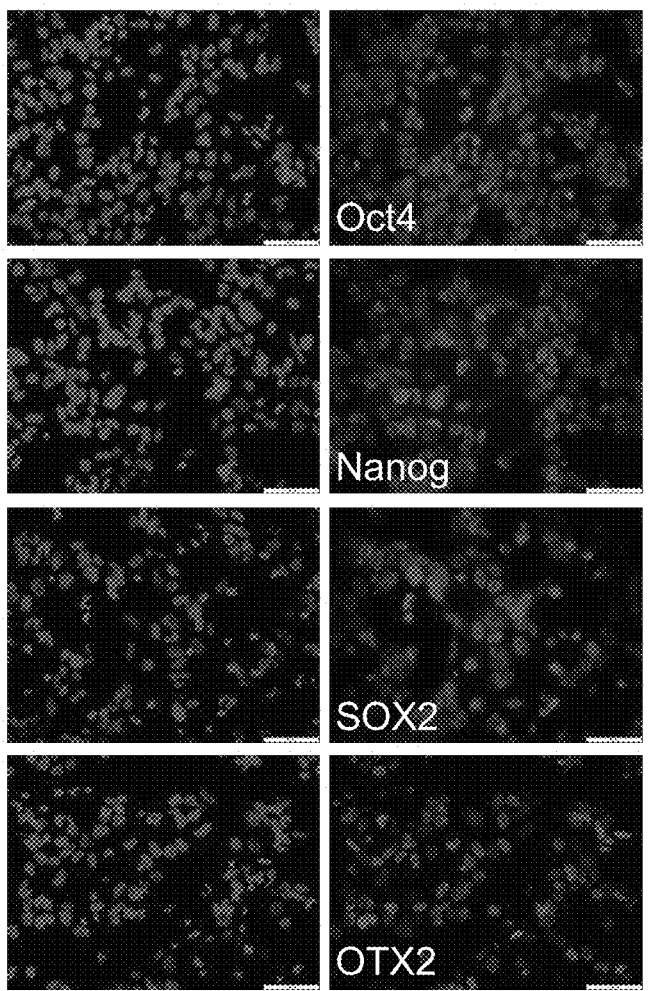

FIGS. 17A-B—rhLN521 based system supports the undifferentiated propagation of HES-1 hPSCs expressing markers of pluripotency and early post-implantation epiblast (A) Real-time PCR analysis of the relative expression levels of pluripotency and early post-implantation markers, in HES-1 hPSCs cultured on LN111 and rhLN521 in the basic medium containing FGF2. (B) Images of immunofluorescence staining of pluripotency and post-implantation markers in HES1-rhLN521 hPSCs cultured in the basic medium containing FGF2. Nuclei are counterstained with DAPI (Blue). Bars indicate 100 µm. In the Real-time experiment, expression levels are normalized to the expression of GusB.

Figure 18A:
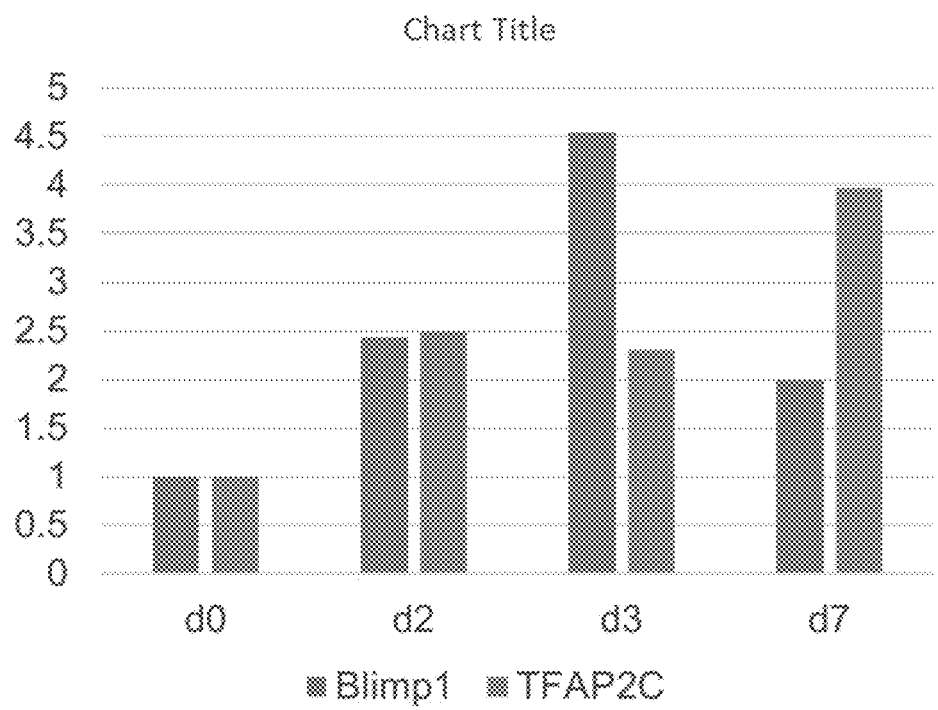
Figure 18B:
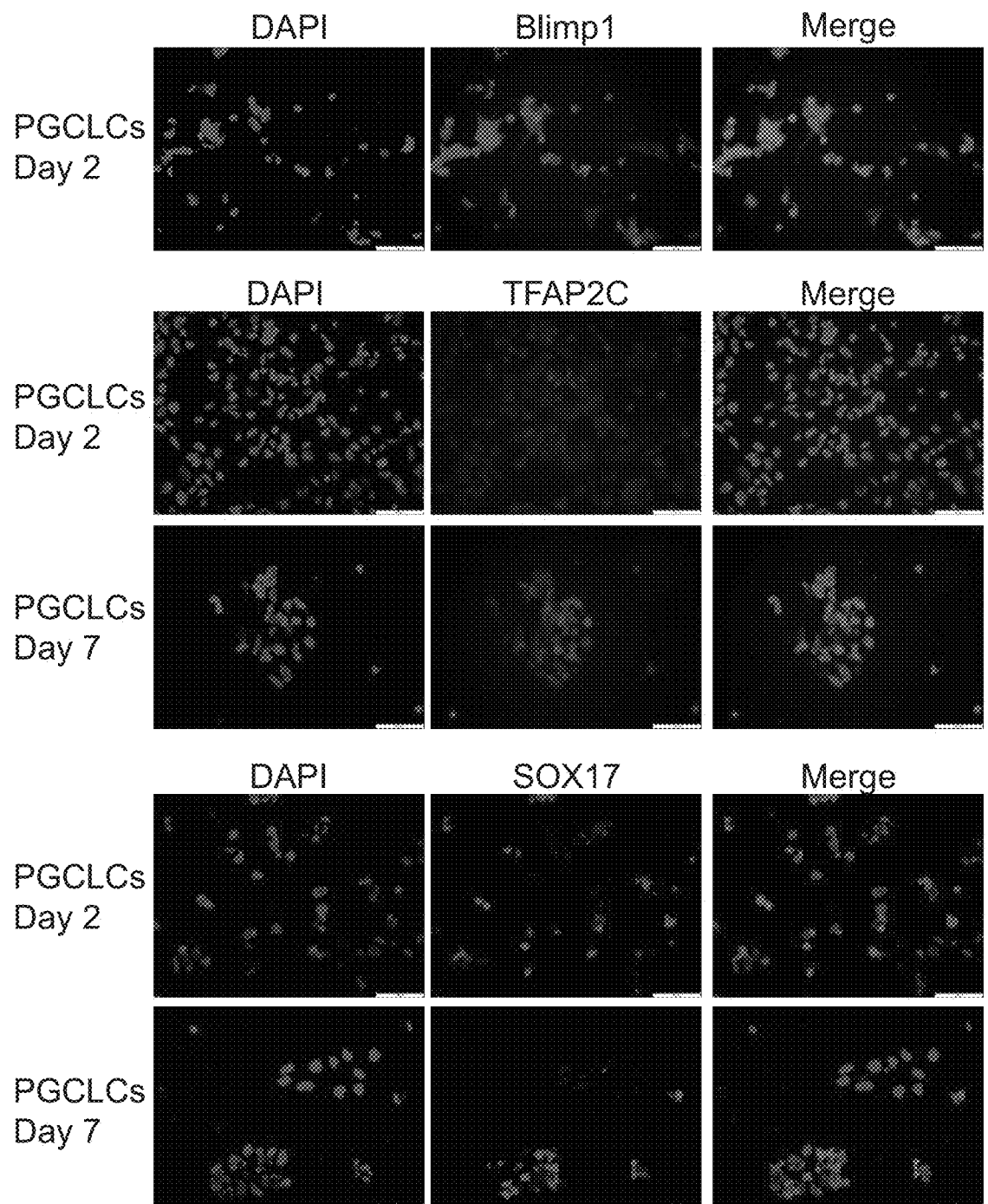

FIGS. 18A-B—HES-1 hPSCs cultured on rhLN521 are competent to initiate germ cell specification (A) Real-time PCR analysis of the relative expression levels of the PGC markers Blimp1, TFAP2C and Nanos3, in HES-1 hPSCs cultured on rhLN521 in the basic medium containing FGF2 (day 0), and as Embryoid Bodies (EBs), in a medium without FGF2, and in the presence of BMP4, LIF, SCF and EGF. (B) Images of immunofluorescence staining of and early PGC markers in HES1-rhLN521 hPSCs cultured as EBs. Nuclei are counterstained with DAPI (Blue). Bars indicate 100 µm. In the Real-time experiment, expression levels are normalized to the expression of GusB.

Figure 19:
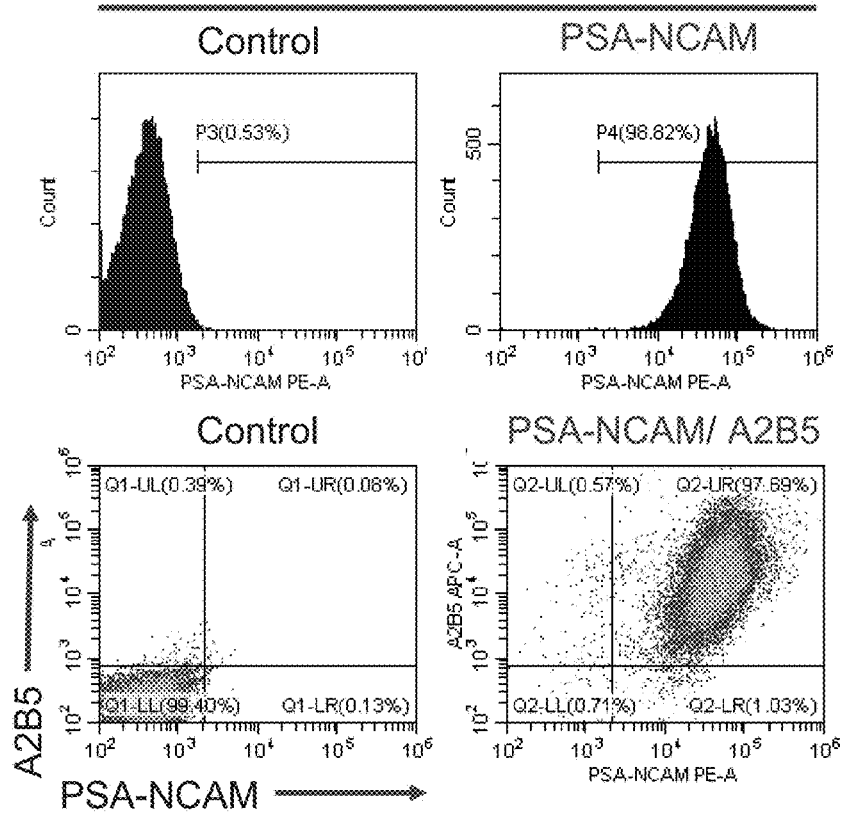
Figure 19:
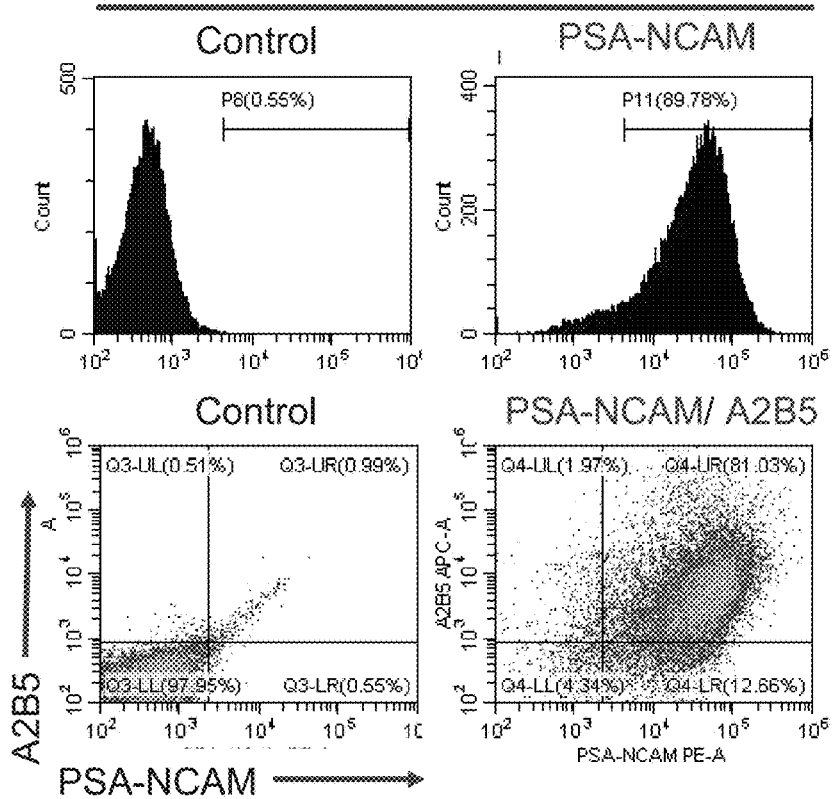

FIG. 19—FACS analysis of day 7 neural progenitors (NPs) for the expression of the early neural cell-surface markers PSA-NCAM and A2B5. NPs were generated from HES2 hPSCs cultured on LN111 or MEFs, and cultured in suspension as neural spheres for 2 days in growth factor-free NutriStem medium, supplemented with FGF2 (20 ng/ml), ROCK inhibitor (Y-276325, 10 mM), TGF-beta inhibitor (SB431542, 5 mM), and BMP4 inhibitor (LDN193189, 10 mM). After 3 days the medium was replaced with the same medium containing FGF2 and LDN193189, and the NPs were further cultured for 4 days.

DESCRIPTION OF SPECIFIC EMBODIMENTS OF THE INVENTION

The present invention, in some embodiments thereof, relates to methods of culturing human pluripotent stem cells having formative-like properties.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The present inventors sought to characterize the pluripotency states of hPSCs and in particular to concentrate on post-implantation pluripotent phases. They used the expression of the fibroblast growth factor 5 (fgf5) gene as a marker of the post-implantation phases in culture. In the developing mouse embryo, FGF5 expression is restricted to the post-implantation pluripotent epiblast cells, and declines at the onset of gastrulation. FGF5 expression is observed in mouse EpiSCs and EpiLCs; the two pluripotent cell populations representing the mouse post-implantation phase. FGF5 expression was not detected in pre-implantation human embryos and in human ICMs.

Whilst carrying out investigations on human PSCs, the present inventors showed that hPSCs cultured on Laminin-111 (LN-hPSCs) in the presence of FGF2 are near homogenous for FGF5 expressing cells. This feature was shown for three independent human pluripotent cell lines—HES-1, HES-2 and HADC100.

The present inventors further showed that hPSCs cultured on Laminin-521 in the presence of FGF2 express markers of pluripotency and early post-implantation epiblast (FIGS. 17A-B). Moreover, HES-1 hPSCs cultured on hrLN521 are competent to initiate germ cell specification (FIGS. 18A-B). The results demonstrate that LN-hPSCs are capable of self-renewal and exhibit properties of formative pluripotent cells. Their gene expression profile resembles the profile of formative-like mouse PSCs (8). FGF/TGFβ mediated signaling is required for LN-hPSC self-renewal. While the canonical WNT signaling is inactive in LN-hPSCs, they rapidly respond to WNT stimulation by suppression of pluripotency genes and activation of primitive streak markers. Finally, the present inventors showed that LN-hPSCs are competent to initiate PGC specification. These results suggest that LN-hPSCs may represent an early post-implantation formative-like pluripotency phase.

The cells can also be used as a starting material to generate cell populations of particular lineages. As illustrated in FIG. 19, neural spheres generated from LN-hPSCs express higher levels of early neural markers, and are more homogenous, compared with neural spheres generated from primed hPSCs.

The present inventors propose that the cells could potentially be used as a starting material for efficient generation of primordial germ cells (PGSc) as well as for homogeneous differentiation into somatic lineages.

Thus, according to an aspect of the present invention there is provided a culture of human pluripotent stem cells (hPSCs), wherein more than 50% of the hPSCs are formative hPSCs and are capable of renewing.

As used herein the phrase "pluripotent stem cells" refers to cells which are capable of differentiating into cells of all three embryonic germ layers (i.e., endoderm, ectoderm and mesoderm). The formative hPSCS of this aspect of the present invention may be derived from embryonic stem cells (ESCs), induced pluripotent stem cells (iPS cells), may be derived directly from an embryo or may be reprogrammed from somatic cells.

According to a particular embodiment, the formative hPSCs are derived from ESCs.

The phrase "embryonic stem cells" as used herein refers to cells which are obtained from the embryonic tissue formed after gestation (e.g., blastocyst) before implantation (i.e., a pre-implantation blastocyst); extended blastocyst cells (EBCs) which are obtained from a post-implantation/pre-gastrulation stage blastocyst (see WO2006/040763]; and/or embryonic germ (EG) cells which are obtained from the genital tissue of a fetus any time during gestation, preferably before 10 weeks of gestation.

According to some embodiments of the invention, the pluripotent stem cells of the invention are embryonic stem cells, such as from a human or primate (e.g., monkey) origin.

The embryonic stem cells of some embodiments of the invention can be obtained using well-known cell-culture methods. For example, human embryonic stem cells can be isolated from human blastocysts. Human blastocysts are typically obtained from human in vivo preimplantation embryos or from in vitro fertilized (IVF) embryos. Alternatively, a single cell human embryo can be expanded to the blastocyst stage. For the isolation of human ES cells the zona pellucida is removed from the blastocyst and the inner cell mass (ICM) is isolated by immunosurgery, in which the trophectoderm cells are lysed and removed from the intact ICM by gentle pipetting. The ICM is then plated in a tissue culture flask containing the appropriate medium which enables its outgrowth. Following 9 to 15 days, the ICM derived outgrowth is dissociated into clumps either by a mechanical dissociation or by an enzymatic degradation and the cells are then re-plated on a fresh tissue culture medium. Colonies demonstrating undifferentiated morphology are individually selected by micropipette, mechanically dissociated into clumps, and re-plated. Resulting ES cells are then routinely split every 4-7 days. For further details on methods of preparation human ES cells see Thomson et al., [U.S. Pat. No. 5,843,780; Science 282: 1145, 1998; Curr. Top. Dev. Biol. 38: 133, 1998; Proc. Natl. Acad. Sci. USA 92: 7844, 1995]; Bongso et al., [Hum Reprod 4: 706, 1989]; and Gardner et al., [Fertil. Steril. 69: 84, 1998].

It will be appreciated that commercially available stem cells can also be used according to some embodiments of the invention. Human ES cells can be purchased from the NIH human embryonic stem cells registry [Hypertext Transfer Protocol://grants (dot) nih (dot) gov/stem_cells/registry/current (dot) htm]. Non-limiting examples of commercially available embryonic stem cell lines are BG01, BG02, BG03, BG04, CY12, CY30, CY92, CY10, TE03, TE32, CHB-4, CHB-5, CHB-6, CHB-8, CHB-9, CHB-10, CHB-11, CHB-12, HUES 1, HUES 2, HUES 3, HUES 4, HUES 5, HUES 6, HUES 7, HUES 8, HUES 9, HUES 10, HUES 11, HUES 12, HUES 13, HUES 14, HUES 15, HUES 16, HUES 17, HUES 18, HUES 19, HUES 20, HUES 21, HUES 22, HUES 23, HUES 24, HUES 25, HUES 26, HUES 27, HUES 28, CyT49, RUES3, WA01, UCSF4, NYUES1, NYUES2, NYUES3, NYUES4, NYUES5, NYUES6, NYUES7, UCLA 1, UCLA 2, UCLA 3, WA077 (H7), WA09 (H9), WA13 (H13), WA14 (H14), HUES 62, HUES 63, HUES 64, CT1, CT2, CT3, CT4, MA135, Eneavour-2, WIBR1, WIBR2, WIBR3, WIBR4, WIBR5, WIBR6, HUES 45, Shef 3, Shef 6, BJNhem19, BJNhem20, SA001, SA001.

Extended blastocyst cells (EBCs) can be obtained from a blastocyst of at least nine days post fertilization at a stage prior to gastrulation. Prior to culturing the blastocyst, the zona pellucida is digested [for example by Tyrode's acidic solution (Sigma Aldrich, St Louis, Mo., USA)] so as to expose the inner cell mass. The blastocysts are then cultured as whole embryos for at least nine and no more than fourteen days post fertilization (i.e., prior to the gastrulation event) in vitro using standard embryonic stem cell culturing methods.

Another method for preparing ES cells is described in Chung et al., Cell Stem Cell, Volume 2, Issue 2, 113-117, 7 Feb. 2008. This method comprises removing a single cell from an embryo during an in vitro fertilization process. The embryo is not destroyed in this process.

EG cells are prepared from the primordial germ cells obtained from fetuses of about 8-11 weeks of gestation (in the case of a human fetus) using laboratory techniques known to anyone skilled in the arts. The genital ridges are dissociated and cut into small chunks which are thereafter disaggregated into cells by mechanical dissociation. The EG cells are then grown in tissue culture flasks with the appropriate medium. The cells are cultured with daily replacement of medium until a cell morphology consistent with EG cells is observed, typically after 7-30 days or 1-4 passages. For additional details on methods of preparation human EG cells see Shamblott et al., [Proc. Natl. Acad. Sci. USA 95: 13726, 1998] and U.S. Pat. No. 6,090,622.

Embryonic stem cells (e.g., human ESCs) originating from an unfertilized ova stimulated by parthenogenesis (parthenotes) are known in the art (e.g., Zhenyu Lu et al., 2010. J. Assist Reprod. Genet. 27:285-291; "Derivation and long-term culture of human parthenogenetic embryonic stem cells using human foreskin feeders", which is fully incorporated herein by reference). Parthenogenesis refers to the initiation of cell division by activation of ova in the absence of sperm cells, for example using electrical or chemical stimulation. The activated ovum (parthenote) is capable of developing into a primitive embryonic structure (called a blastocyst) but cannot develop to term as the cells are pluripotent, meaning that they cannot develop the necessary extra-embryonic tissues (such as amniotic fluid) needed for a viable human foetus.

The phrase "induced pluripotent stem (iPS) cell" (or embryonic-like stem cell) as used herein refers to a proliferative and pluripotent stem cell which is obtained by de-differentiation of a somatic cell (e.g., an adult somatic cell).

According to some embodiments of the invention, the iPS cell is characterized by a proliferative capacity which is similar to that of ESCs and thus can be maintained and expanded in culture for an almost unlimited time.

IPS cells can be endowed with pluripotency by genetic manipulation which re-program the cell to acquire embryonic stem cells characteristics. For example, the iPS cells of the invention can be generated from somatic cells by induction of expression of Oct-4, Sox2, Kfl4 and c-Myc in a somatic cell. Additionally or alternatively, the iPS cells of the invention can be generated from somatic cells by induction of expression of Oct4, Sox2, Nanog and Lin28. It should be noted that the genetic manipulation (re-programming) of the somatic cells can be performed using any known method such as using plasmids or viral vectors, or by derivation without any integration to the genome.

The iPS cells of the invention can be obtained by inducing de-differentiation of embryonic fibroblasts, fetal fibroblasts, foreskin fibroblast, adult dermal and skin tissues, b-lymphocytes and adult liver and stomach.

IPS cell lines are also available via cell banks such as the WiCell bank. Non-limiting examples of commercially available iPS cell lines include the iPS foreskin clone 1 [WiCell Catalogue No. iPS(foreskin)-1-DL-1], the iPSIMR90 clone 1 [WiCell Catalogue No. iPS(IMR90)-1-DL-1], and the iPSIMR90 clone 4 [WiCell Catalogue No. iPS(IMR90)-4-DL-1].

According to some embodiments of the invention, the induced pluripotent stem cells are human induced pluripotent stem cells.

As mentioned, the cell culture of this aspect of the present invention comprises human pluripotent stem cells.

In one embodiment, at least 80%, 81%, 82%, 83%, 84%, 85%, 86%, 87%, 88%, 89%, 90%, 91%, 92%, 93%, 94%, 95%, 96%, 97%, 98%, 99% or even 100% of the cells of the cell culture are pluripotent stem cells.

As mentioned, at least 50%, at least 60%, at least 70%, at least 80%, at least 90%, at least 95%, at least 98% of the pluripotent stem cells of the culture are in a formative state.

Preferably, at least 50%, at least 60%, at least 70%, at least 80%, at least 90%, at least 95%, at least 98% of the cells of the culture are pluripotent stem cells in a formative state.

The term formative state refers to a state that is a stage between a naive state and a primed state.

The term "naïve state" refers to a state that mirrors the pre-implantation ICM. Primed pluripotent stem cells represent the phase that is established at the post-implantation epiblast, when it becomes primed for lineage specification. Both naïve and primed cell populations share the hallmark features of pluripotency, but use different signaling pathways for their self-renewal, and exhibit distinct transcriptome, and epigenome.

According to a specific embodiment of the invention, the formative hPSCs are positive for one or more marker. Positive is also abbreviated by (+). Positive for a marker means that at least about 70%, 80%, 85%, 90%, 95%, or 100% of the cells in the population present detectable levels of the marker (e.g., FGF5) assayed by a method known to those of skill in the art (e.g. immunofluorescence). Thus, for example, the cells stain positively with anti FGF5 antibody as determined by a reporter system as described in the examples section herein below or stained positive by immunofluorescence or immunohistochemistry using the FGF5 antibody (goat polyclonal IgG anti-human FGF5 (1:250; Cat. No. AF-237-NA, R&D Systems, Minneapolis, Minn., USA). The FGF5-positive cells according to this embodiment, may stain negatively to one or more marker e.g., NANOG. Negative is also abbreviated by (−). Negative for a marker means that no more than about 5%, 10%, 20%, 25%, or 30% of the cells in the population present detectable levels of the marker (e.g., NANOG) assayed by a method known to those of skill in the art such as immunostaining. Such a marker presentation either of a single cell or an isolated population of cells is also referred to as a signature.

Methods for analyzing marker expression are known in the art and can be conducted on the RNA and/or protein level.

Methods of Detecting the Expression Level of RNA

The expression level of the RNA in the cells of some embodiments of the invention can be determined using methods known in the arts.

Northern Blot analysis: This method involves the detection of a particular RNA in a mixture of RNAs. An RNA sample is denatured by treatment with an agent (e.g., formaldehyde) that prevents hydrogen bonding between base pairs, ensuring that all the RNA molecules have an unfolded, linear conformation. The individual RNA molecules are then separated according to size by gel electrophoresis and transferred to a nitrocellulose or a nylon-based membrane to which the denatured RNAs adhere. The membrane is then exposed to labeled DNA probes. Probes may be labeled using radio-isotopes or enzyme linked nucleotides. Detection may be using autoradiography, colorimetric reaction or chemiluminescence. This method allows both quantitation of an amount of particular RNA molecules and determination of its identity by a relative position on the membrane which is indicative of a migration distance in the gel during electrophoresis.

RT-PCR analysis: This method uses PCR amplification of relatively rare RNAs molecules. First, RNA molecules are purified from the cells and converted into complementary DNA (cDNA) using a reverse transcriptase enzyme (such as an MMLV-RT) and primers such as, oligo dT, random hexamers or gene specific primers. Then by applying gene specific primers and Taq DNA polymerase, a PCR amplification reaction is carried out in a PCR machine. Those of skills in the art are capable of selecting the length and sequence of the gene specific primers and the PCR conditions (i.e., annealing temperatures, number of cycles and the like) which are suitable for detecting specific RNA molecules. It will be appreciated that a semi-quantitative RT-PCR reaction can be employed by adjusting the number of PCR cycles and comparing the amplification product to known controls.

RNA in situ hybridization stain: In this method DNA or RNA probes are attached to the RNA molecules present in the cells. Generally, the cells are first fixed to microscopic slides to preserve the cellular structure and to prevent the RNA molecules from being degraded and then are subjected to hybridization buffer containing the labeled probe. The hybridization buffer includes reagents such as formamide and salts (e.g., sodium chloride and sodium citrate) which enable specific hybridization of the DNA or RNA probes with their target mRNA molecules in situ while avoiding non-specific binding of probe. Those of skills in the art are capable of adjusting the hybridization conditions (i.e., temperature, concentration of salts and formamide and the like) to specific probes and types of cells. Following hybridization, any unbound probe is washed off and the bound probe is detected using known methods. For example, if a radio-labeled probe is used, then the slide is subjected to a photographic emulsion which reveals signals generated using radio-labeled probes; if the probe was labeled with an enzyme then the enzyme-specific substrate is added for the formation of a colorimetric reaction; if the probe is labeled using a fluorescent label, then the bound probe is revealed using a fluorescent microscope; if the probe is labeled using a tag (e.g., digoxigenin, biotin, and the like) then the bound probe can be detected following interaction with a tag-specific antibody which can be detected using known methods.

In situ RT-PCR stain: This method is described in Nuovo G J, et al. [Intracellular localization of polymerase chain reaction (PCR)-amplified hepatitis C cDNA. Am J Surg Pathol. 1993, 17: 683-90] and Komminoth P, et al. [Evaluation of methods for hepatitis C virus detection in archival liver biopsies. Comparison of histology, immunohistochemistry, in situ hybridization, reverse transcriptase polymerase chain reaction (RT-PCR) and in situ RT-PCR. Pathol Res Pract. 1994, 190: 1017-25]. Briefly, the RT-PCR reaction is performed on fixed cells by incorporating labeled nucleotides to the PCR reaction. The reaction is carried on using a specific in situ RT-PCR apparatus such as the laser-capture microdissection PixCell I LCM system available from Arcturus Engineering (Mountainview, Calif.).

DNA Microarrays/DNA Chips:

The expression of thousands of genes may be analyzed simultaneously using DNA microarrays, allowing analysis of the complete transcriptional program of an organism during specific developmental processes or physiological responses. DNA microarrays consist of thousands of individual gene sequences attached to closely packed areas on the surface of a support such as a glass microscope slide. Various methods have been developed for preparing DNA microarrays. In one method, an approximately 1 kilobase segment of the coding region of each gene for analysis is individually PCR amplified. A robotic apparatus is employed to apply each amplified DNA sample to closely spaced zones on the surface of a glass microscope slide, which is subsequently processed by thermal and chemical treatment to bind the DNA sequences to the surface of the support and denature them. Typically, such arrays are about 2×2 cm and contain about individual nucleic acids 6000 spots. In a variant of the technique, multiple DNA oligonucleotides, usually 20 nucleotides in length, are synthesized from an initial nucleotide that is covalently bound to the surface of a support, such that tens of thousands of identical oligonucleotides are synthesized in a small square zone on the surface of the support. Multiple oligonucleotide sequences from a single gene are synthesized in neighboring regions of the slide for analysis of expression of that gene. Hence, thousands of genes can be represented on one glass slide. Such arrays of synthetic oligonucleotides may be referred to in the art as "DNA chips", as opposed to "DNA microarrays", as described above [Lodish et al. (eds.). Chapter 7.8: DNA Microarrays: Analyzing Genome-Wide Expression. In: Molecular Cell Biology, 4th ed., W. H. Freeman, New York. (2000)].

Oligonucleotide microarray—In this method oligonucleotide probes capable of specifically hybridizing with the polynucleotides of some embodiments of the invention are attached to a solid surface (e.g., a glass wafer). Each oligonucleotide probe is of approximately 20-25 nucleic acids in length. To detect the expression pattern of the polynucleotides of some embodiments of the invention in a specific cell sample (e.g., blood cells), RNA is extracted from the cell sample using methods known in the art (using e.g., a TRIZOL solution, Gibco BRL, USA). Hybridization can take place using either labeled oligonucleotide probes (e.g., 5'-biotinylated probes) or labeled fragments of complementary DNA (cDNA) or RNA (cRNA). Briefly, double stranded cDNA is prepared from the RNA using reverse transcriptase (RT) (e.g., Superscript II RT), DNA ligase and DNA polymerase I, all according to manufacturer's instructions (Invitrogen Life Technologies, Frederick, Md., USA). To prepare labeled cRNA, the double stranded cDNA is subjected to an in vitro transcription reaction in the presence of biotinylated nucleotides using e.g., the BioArray High Yield RNA Transcript Labeling Kit (Enzo, Diagnostics, Affymetix Santa Clara Calif.). For efficient hybridization the labeled cRNA can be fragmented by incubating the RNA in 40 mM Tris Acetate (pH 8.1), 100 mM potassium acetate and 30 mM magnesium acetate for 35 minutes at 94° C. Following hybridization, the microarray is washed and the hybridization signal is scanned using a confocal laser fluorescence scanner which measures fluorescence intensity emitted by the labeled cRNA bound to the probe arrays.

For example, in the Affymetrix microarray (Affymetrix®, Santa Clara, Calif.) each gene on the array is represented by a series of different oligonucleotide probes, of which, each probe pair consists of a perfect match oligonucleotide and a mismatch oligonucleotide. While the perfect match probe has a sequence exactly complimentary to the particular gene, thus enabling the measurement of the level of expression of the particular gene, the mismatch probe differs from the perfect match probe by a single base substitution at the center base position. The hybridization signal is scanned using the Agilent scanner, and the Microarray Suite software subtracts the non-specific signal resulting from the mismatch probe from the signal resulting from the perfect match probe.

Methods of Detecting Expression and/or Activity of Proteins

Expression and/or activity level of proteins expressed in the cells of the cultures of some embodiments of the invention can be determined using methods known in the arts.

Enzyme linked immunosorbent assay (ELISA): This method involves fixation of a sample (e.g., fixed cells or a proteinaceous solution) containing a protein substrate to a surface such as a well of a microtiter plate. A substrate specific antibody coupled to an enzyme is applied and allowed to bind to the substrate. Presence of the antibody is then detected and quantitated by a colorimetric reaction employing the enzyme coupled to the antibody. Enzymes commonly employed in this method include horseradish peroxidase and alkaline phosphatase. If well calibrated and within the linear range of response, the amount of substrate present in the sample is proportional to the amount of color produced. A substrate standard is generally employed to improve quantitative accuracy.

Western blot: This method involves separation of a substrate from other protein by means of an acrylamide gel followed by transfer of the substrate to a membrane (e.g., nylon or PVDF). Presence of the substrate is then detected by antibodies specific to the substrate, which are in turn detected by antibody binding reagents. Antibody binding reagents may be, for example, protein A, or other antibodies. Antibody binding reagents may be radiolabeled or enzyme linked as described hereinabove. Detection may be by autoradiography, colorimetric reaction or chemiluminescence. This method allows both quantitation of an amount of substrate and determination of its identity by a relative position on the membrane which is indicative of a migration distance in the acrylamide gel during electrophoresis.

Radio-immunoassay (RIA): In one version, this method involves precipitation of the desired protein (i.e., the substrate) with a specific antibody and radiolabeled antibody binding protein (e.g., protein A labeled with $I^{125}$) immobilized on a precipitable carrier such as agarose beads. The number of counts in the precipitated pellet is proportional to the amount of substrate.

In an alternate version of the RIA, a labeled substrate and an unlabelled antibody binding protein are employed. A sample containing an unknown amount of substrate is added in varying amounts. The decrease in precipitated counts from the labeled substrate is proportional to the amount of substrate in the added sample.

Fluorescence activated cell sorting (FACS): This method involves detection of a substrate in situ in cells by substrate specific antibodies. The substrate specific antibodies are linked to fluorophores. Detection is by means of a cell sorting machine which reads the wavelength of light emitted from each cell as it passes through a light beam. This method may employ two or more antibodies simultaneously.

Immunohistochemical analysis: This method involves detection of a substrate in situ in fixed cells by substrate specific antibodies. The substrate specific antibodies may be enzyme linked or linked to fluorophores. Detection is by microscopy and subjective or automatic evaluation. If enzyme linked antibodies are employed, a colorimetric reaction may be required. It will be appreciated that immunohistochemistry is often followed by counterstaining of the cell nuclei using for example Hematoxyline or Giemsa stain.

According to a particular embodiment, a formative state can be defined by the ability to express FGF5 (and optionally co-expressing OTX2), as further described herein below.

Preferably, the formative hPSCs of the present invention express WNT receptors (e.g. FZD1-10 and their LRP5/6 co-receptors) but lack active canonical WNT signaling. Typically, the formative hPSCs of the present invention lack nuclear β-catenin expression (as measured by immunostaining) and do not express WNT3. In addition, the cell morphology of formative hPSCs of the present invention is immune to the presence of stimulators of β-catenin degradation. Thus, for example the cell morphology of the formative hPSCs does not change in the presence of XAV939, a tankyrase 1/2 inhibitor that stimulates β-catenin degradation.

Preferably, the formative hPSCs can be expanded for at least 6 passages, 7 passages, 8 passages, 9 passages, 10 passages, 11 passages, 12 passages, 13 passages, 14 passages, 15 passages, 16 passages, 17 passages, 18 passages, 19 passages, 20 passages or more, whilst maintaining their formative state and maintaining a normal karotype.

The ability to generate lineage specific cells is a hallmark of the formative cells of the present invention. Thus, the formative cells of the present invention are capable of differentiating into cells that express β-Tubulin-III, muscle actin and FOXA2 cells (see FIG. 7C). The formative cells are also capable of generating teratomas which comprise lineage specific cells (see FIG. 7D).

Figure 6A:
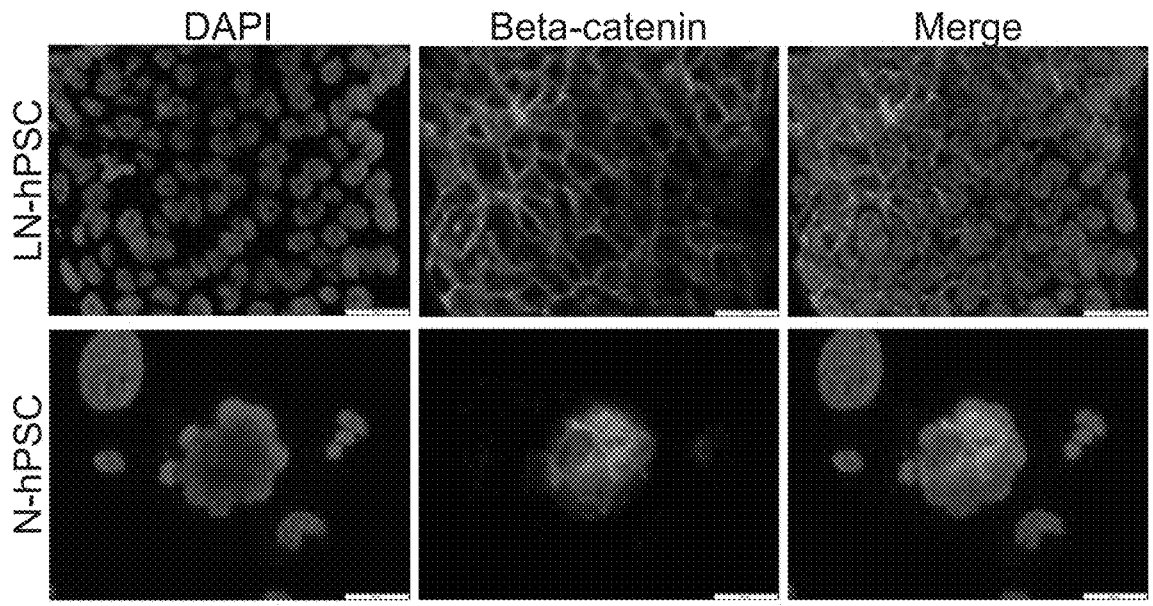
Figure 6B:
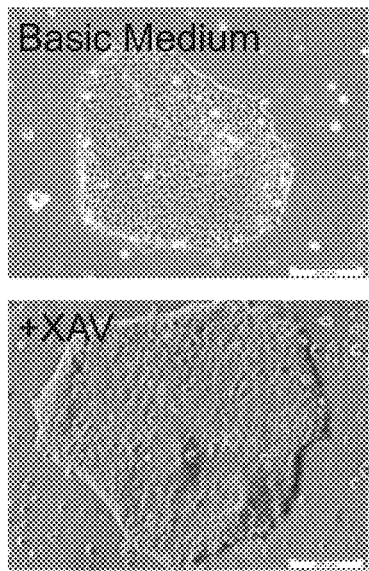
Figure 6C:
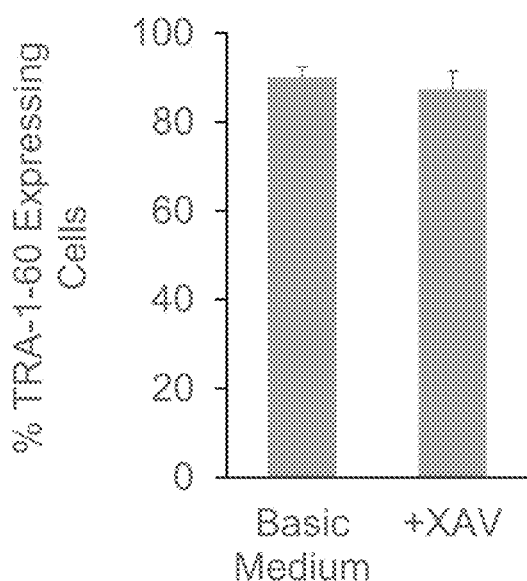
Figure 6D:
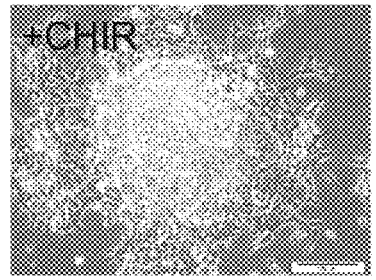
Figure 6E:
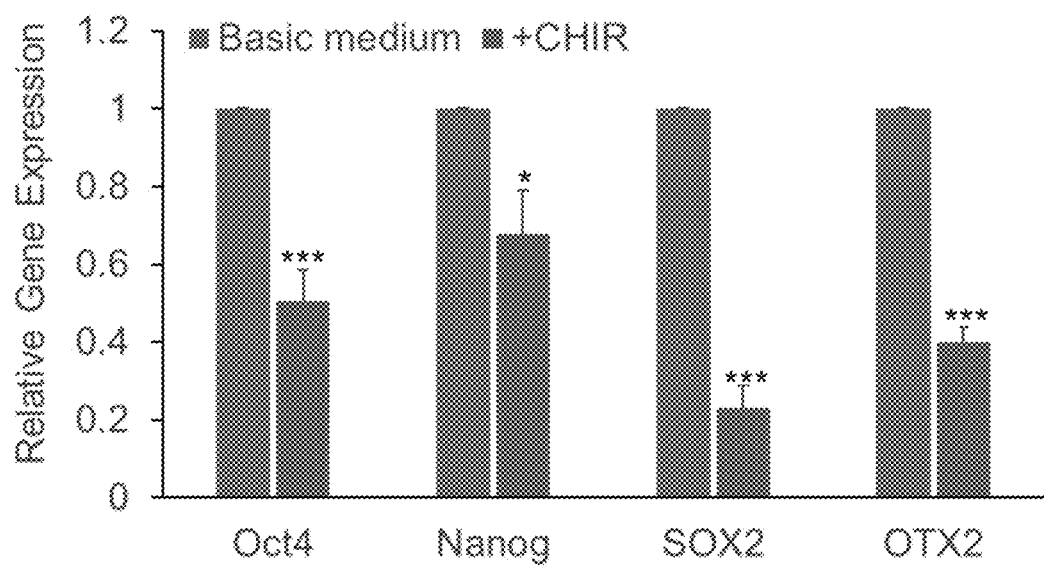
Figure 6F:
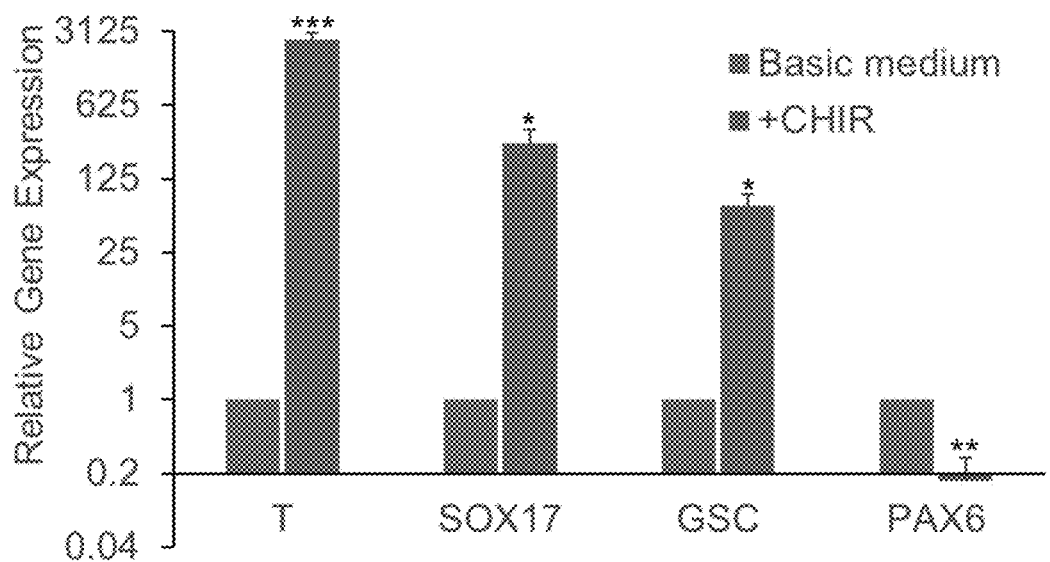
Figure 6G:
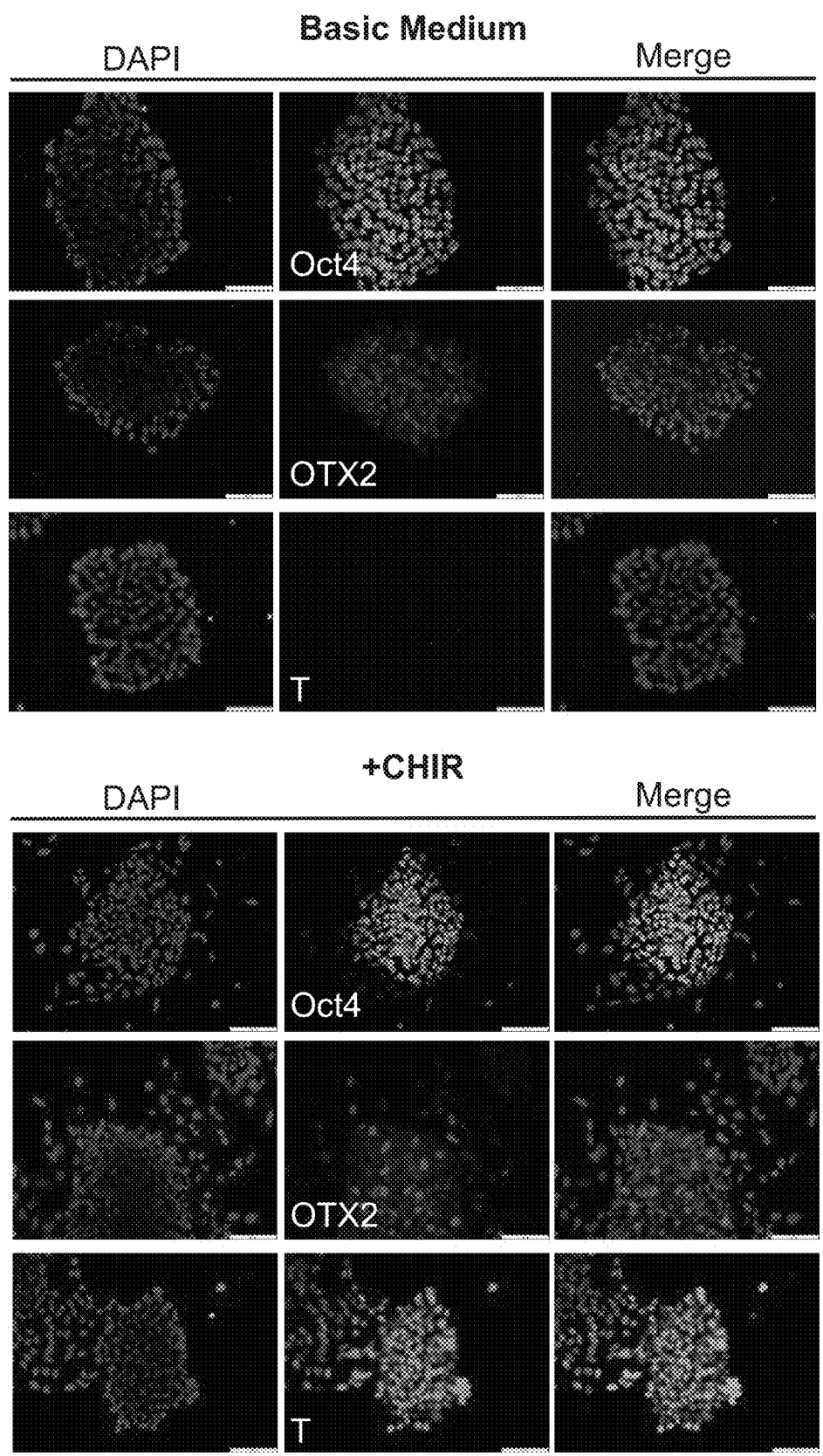
Figure 6H:
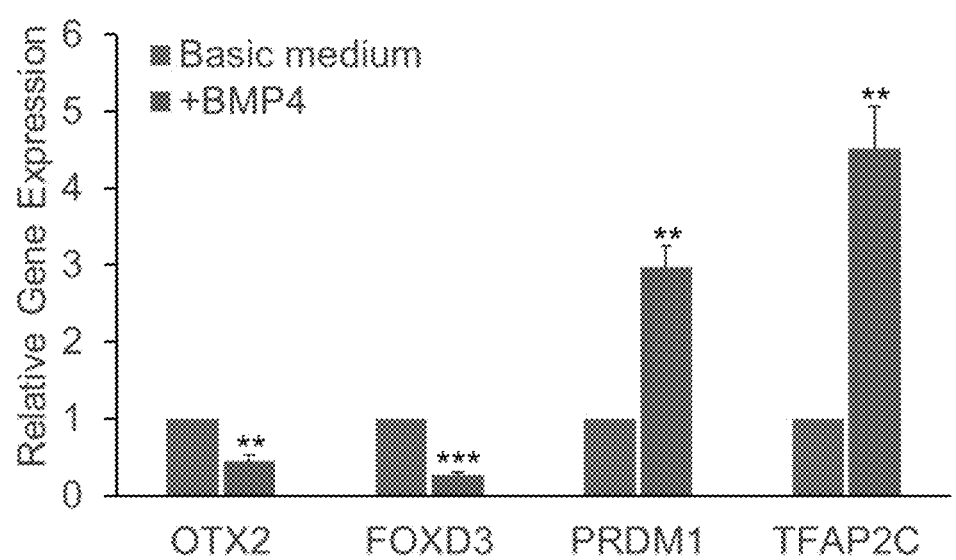

Primordial germ cells can be generated from the human formative pluripotent stem cells of the present invention. In one embodiment, primordial germ cells can be generated by culturing in BMP4. Following culture in BMP4, the cells express an upregulated amount of the transcription factors PRDM1 (BLIMP1) and TFAP2C, concomitant with a down-regulated amount of the formative pluripotency transcription factors OTX2 and FOXD3 (FIG. 6H).

As mentioned, the formative cells of this aspect of the present invention express FGF5 (as measured by immunochemistry and/or RT-PCR). Preferably, at least 80% of the pluripotent stem cells in the culture express FGF5, at least 85% of the pluripotent stem cells in the culture express FGF5, at least 90% of the pluripotent stem cells in the culture express FGF5, at least 95% of the pluripotent stem cells in the culture express FGF5.

Preferably at least 80% of the pluripotent stem cells in the culture express OTX2, at least 85% of the pluripotent stem cells in the culture express OTX2, at least 90% of the pluripotent stem cells in the culture express OTX2, at least 95% of the pluripotent stem cells in the culture express OTX2.

Preferably at least 80% of the pluripotent stem cells in the culture co-express OTX2 and FGF5, at least 85% of the pluripotent stem cells in the culture co-express OTX2 and FGF5, at least 90% of the pluripotent stem cells in the culture co-express OTX2 and FGF5, at least 95% of the pluripotent stem cells in the culture co-express OTX2 and FGF5.

The amount of FGF5 that is expressed is typically greater than the amount of FGF5 that is expressed in naive hPSCs that are cultured on mouse feeder cells (e.g. as measured by RT-PCR). Typically, the amount is at least twice, at least three times the amount, at least four times the amount, at least five times the amount of FGF5 that is expressed in naive hPSCs that are cultured on mouse feeder cells.

The formative hPSCs typically express at least 25% less, at least 30% less, at least 40% less, at least 50% less NANOG as compared with naive hPSCs that are cultured on mouse feeder cells (e.g. as measured by RT-PCR).

The pluripotency of the formative hPSCs is mirrored by the expression of pluripotency markers. Thus, the formative hPSCs express at least one of, or co-express at least two of, at least three of, at least four or, at least five or, at least six of or all of the following markers: OCT4, NANOG, SOX2, TRA-1-60, SSEA3, SSEA4 and TRA-1-81.

Additional markers expressed by the formative hPSCs include, but are not limited to ZIC3, FOXD3, LIN28A/B and SFRP2.

The cell culture of some embodiments of the invention, or the lineage-specific cells generated therefrom (as further described herein below) can be subject to genetic manipulation by using either infection or transfection of a polynucleotide of interest. The polynucleotide may be included in a nucleic acid construct under the regulation of a promoter.

Methods of introducing the polynucleotide into cells are described in Sambrook et al., [Molecular Cloning: A Laboratory Manual, Cold Springs Harbor Laboratory, New York (1989, 1992)]; Ausubel et al., [Current Protocols in Molecular Biology, John Wiley and Sons, Baltimore, Md. (1989)]; Chang et al., [Somatic Gene Therapy, CRC Press, Ann Arbor, Mich. (1995)]; Vega et al., [Gene Targeting, CRC Press, Ann Arbor Mich. (1995)]; Vectors [A Survey of Molecular Cloning Vectors and Their Uses, Butterworths, Boston Mass. (1988)] and Gilboa et al. [Biotechniques 4 (6): 504-512 (1986)] and include, for example, stable or transient transfection, lipofection, electroporation and infection with recombinant viral vectors [e.g., using retrovirus, adenovirus (e.g., adenovirus-derived vector Ad-TK, Sandmair et al., 2000. Hum Gene Ther. 11:2197-2205), a chimeric adenovirus/retrovirus vector which combines retroviral and adenoviral components (Pan et al., Cancer Letters 184: 179-188, 2002). See also U.S. Pat. No. 4,866,042 for vectors involving the central nervous system and also U.S. Pat. Nos. 5,464,764 and 5,487,992 for positive-negative selection methods for inducing homologous recombination.

According to some embodiments of the invention cell culture is feeder cell free (devoid of feeder cell support).

The phrase "feeder cell support" as used herein refers to the ability of a feeder cell (e.g., fibroblasts) to maintain pluripotent stem cells in a proliferative and undifferentiated state when the pluripotent stem cells are co-cultured on the feeder cells or when the pluripotent stem cells are cultured on a matrix (e.g., an extracellular matrix, a synthetic matrix) in the presence of a conditioned medium generated by the feeder cells. The support of the feeder cells depends on the structure of the feeder cells while in culture (e.g., the three dimensional matrix formed by culturing the feeder cells in a tissue culture plate), function of the feeder cells (e.g., the secretion of growth factors, nutrients and hormones by the feeder cells, the growth rate of the feeder cells, the expansion ability of the feeder cells before senescence) and/or the attachment of the pluripotent stem cells to the feeder cell layer(s).

The phrase "absence of feeder cell support" as used herein refers to a culture medium and/or a cell culture being devoid of feeder cells (or trace amounts of feeder cells) and/or a conditioned medium generated thereby.

In one embodiment, the culture of this aspect of the present invention is an adherent culture. Preferably, the solid surface on which the cells are cultured are coated with a protein that is known to enhance adherence of pluripotent stem cells. For example, the solid surface may be coated with an extracellular protein (or fragments thereof) such as collagen I, collagen IV, fibronectin or laminin.

In one embodiment, the coating comprises a single protein. Preferably, the coating comprises no more than 2, 3 or 4 extracellular proteins.

In another embodiment, the coating consists of a single extracellular protein (e.g. recombinant laminin).

According to a particular embodiment, the extracellular protein (e.g. laminin) is not comprised in Matrigel™.

The coating (e.g. mouse laminin 111) is present in an amount of about 20 µg per cm$^2$.

In an exemplary embodiment, the coating (e.g. mouse laminin 111) comprises between 50-500 µg of laminin per 9.6 cm$^2$ well.

According to a particular embodiment, the laminin is recombinant laminin.

Any laminin is contemplated by the present inventors including, but not limited to laminin 111, laminin 211, laminin 221, laminin 511, laminin 521, laminin 332 and recombinant E8 fragment of laminin 511 or laminin 521.

According to a particular embodiment the laminin is mouse laminin (e.g. mouse laminin 111.

According to a particular embodiment the laminin is human laminin (e.g. human recombinant laminin 521.

The cells are typically cultured in a medium that allows expansion of the cells. As used herein the phrase "culture medium" refers to a liquid substance used to support the growth of pluripotent stem cells and maintain them in a formative state. The culture medium used by the invention according to some embodiments can be a water-based medium which includes a combination of substances such as salts, nutrients, minerals, vitamins, amino acids, nucleic acids, proteins such as cytokines, growth factors and hormones, all of which are needed for cell proliferation and are capable of maintaining the pluripotent stem cells in an undifferentiated state. For example, a culture medium according to an aspect of some embodiments of the invention can be a synthetic tissue culture medium such as the Ko-DMEM (Gibco-Invitrogen Corporation products, Grand Island, N.Y., USA), DMEM/F12 (Biological Industries, Biet HaEmek, Israel), Mab ADCB medium (HyClone, Utah, USA), Nutristem™ (Biological Industries, Beit HaEmek, Israel; also known as Stemedia™ NutriStem™ XF/FF Culture Medium, STEMGENT, USA), TeSR™ (StemCell Technologies) and TeSR2™ (StemCell Technologies) supplemented with the necessary additives as is further described hereinunder.

According to a particular embodiment, the culture medium comprises DMEM/F12.

According to some embodiments of the invention, the culture medium is serum free.

As used herein the phrase "serum-free" refers to being devoid of a human or an animal serum.

It should be noted that the function of serum in culturing protocols is to provide the cultured cells with an environment similar to that present in vivo (i.e., within the organism from which the cells are derived, e.g., a blastocyst of an embryo). However, the use of serum, which is derived from either an animal source (e.g., bovine serum) or a human source (human serum), is limited by the significant variations in serum components between the donor individuals (from which the serum is obtained) and the risk of having xeno contaminants (in case of an animal serum is used).

According to some embodiments of the invention, the serum-free culture medium does not comprise serum or portions thereof.

According to some embodiments of the invention, the serum-free culture medium of the invention is devoid of serum albumin (e.g., albumin which is purified from human serum or animal serum).

According to some embodiments of the invention the culture medium comprises serum replacement.

As used herein the phrase "serum replacement" refers to a defined formulation, which substitutes the function of serum by providing pluripotent stem cells with components needed for growth and viability.

Various serum replacement formulations are known in the art and are commercially available.

For example, GIBCO™ Knockout™ Serum Replacement (Gibco-Invitrogen Corporation, Grand Island, N.Y. USA, Catalogue No. 10828028) is a defined serum-free formulation optimized to grow and maintain undifferentiated ES cells in culture. It should be noted that the formulation of GIBCO™ Knockout™ Serum Replacement includes Albumax (Bovine serum albumin enriched with lipids) which is from an animal source (International Patent Publication No. WO 98/30679 to Price, P. J. et al). However, a recent publication by Crook et al., 2007 (Crook J M., et al., 2007, Cell Stem Cell, 1: 490-494) describes six clinical-grade hESC lines generated using FDA-approved clinical grade foreskin fibroblasts in cGMP-manufactured Knockout™ Serum Replacement (Invitrogen Corporation, USA, Catalogue No. 04-0095).

Another commercially available serum replacement is the B27 supplement without vitamin A which is available from Gibco-Invitrogen, Corporation, Grand Island, N.Y. USA, Catalogue No. 12587-010. The B27 supplement is a serum-free formulation which includes d-biotin, fatty acid free fraction V bovine serum albumin (BSA), catalase, L-carnitine HCl, corticosterone, ethanolamine HCl, D-galactose (Anhyd.), glutathione (reduced), recombinant human insulin, linoleic acid, linolenic acid, progesterone, putrescine-2-HCl, sodium selenite, superoxide dismutase, T-3/albumin complex, DL alpha-tocopherol and DL alpha tocopherol acetate. However, the use of B27 supplement is limited since it includes albumin from an animal source.

According to some embodiments of the invention, the serum replacement is devoid of (completely free of) animal contaminants. Such contaminants can be pathogens which can infect human cells, cellular components or a-cellular components (e.g., fluid) of animals.

It should be noted that when an animal-contaminant-free serum replacement is used to culture human cells, then the serum replacement is referred to as being "xeno-free".

The term "xeno" is a prefix based on the Greek word "Xenos", i.e., a stranger. As used herein the phrase "xeno-free" refers to being devoid of any components/contaminants which are derived from a xenos (i.e., not the same, a foreigner) species.

For example, a xeno-free serum replacement for use with human cells (i.e., an animal contaminant-free serum replacement) can include a combination of insulin, transferrin and selenium. Additionally or alternatively, a xeno-free serum replacement can include human or recombinantly produced albumin, transferrin and insulin.

Non-limiting examples of commercially available xeno-free serum replacement compositions include the premix of ITS (Insulin, Transferrin and Selenium) available from Invitrogen corporation (ITS, Invitrogen, Catalogue No. 51500-056); Serum replacement 3 (SR3; Sigma, Catalogue No. 52640) which includes human serum albumin, human transferring and human recombinant insulin and does not contain growth factors, steroid hormones, glucocorticoids, cell adhesion factors, detectable Ig and mitogens; Knock-Out™ SR XenoFree [Catalogue numbers A10992-01, A10992-02, part Nos. 12618-012 or 12618-013, Invitrogen GIBCO] which contains only human-derived or human recombinant proteins.

In one embodiment, the medium comprises:
(i) B27 supplement;
(ii) N2 supplement;
(iii) L-glutamine; and
(iv) antibiotic.

The medium which cultures the formative human PSCs typically comprises Basic fibroblast growth factor (bFGF).

Basic fibroblast growth factor (also known as bFGF, FGF2 or FGF-β) is a member of the fibroblast growth factor family. bFGF [(e.g., human bFGF polypeptide GenBank Accession No. NP_001997.5; human bFGF polynucleotide GenBank Accession No. NM_002006.4 can be obtained from various commercial sources such as Cell Sciences®, Canton, Mass., USA (e.g., Catalogue numbers CRF001A and CRF001B), Invitrogen Corporation products, Grand Island N.Y., USA (e.g., Catalogue numbers: PHG0261, PHG0263, PHG0266 and PHG0264), ProSpec-Tany TechnoGene Ltd. Rehovot, Israel (e.g., Catalogue number: CYT-218), and Sigma, St Louis, Mo., USA (e.g., catalogue number: F0291).

The concentration of bFGF in the culture medium is typically between 1-100 ng/ml, more preferably between 5-50 ng/ml, for example about 20 ng/ml.

According to another aspect of the present invention there is provided a method of enriching for a population of formative hPSCs comprising culturing non-formative hPSCs on an adherent surface which comprises a laminin coating under conditions that enrich for hPSCs in the formative phase, thereby enriching for the population of formative hPSCs.

The non-formative hPSCs may be embryonic stem cells or induced pluripotent stem cells as further described herein above.

The non-formative hPSCs may be in a naïve state or a primed state.

In one embodiment, the hPSCs are derived from an embryonic stem cell line e.g. HES-1, HES-2, HADC100, HADC102 or H7.

Preferably, the solid surface on which the cells are cultured include cell culture plates/dishes. The culture dishes are coated with laminin. A typical concentration of laminin which can be used for coating is between 0.5 mg-3 mg/ml for example about 1 mg/ml. For a 9.6 cm well, typically about 100-500 µg, 150-500 µg, 100-200 µg (for example about 175 µg) are used to coat the well. Preferably, the tissue culture dishes are coated with the laminin, incubated overnight at about 37° C. to promote matrix gelling, and washed with a buffer (e.g. PBS).

The cells are cultured in medium which promotes expansion. Exemplary media and growth factors that can be added to the media are provided herein above. The cells are typically cultured in 5% $CO_2$, 5% $O_2$ incubator. Preferably, the cells are passaged every 3-10 days, e.g. every 7 days.

As described hereinabove, passaging of the pluripotent stem cells can be effected using mechanical dissociation of cell clumps.

Additionally and/or alternatively, passaging of pluripotent stem cells in a suspension culture can be performed using an enzymatic digestion with or without a subsequent mechanical dissociation.

Enzymatic digestion of pluripotent stem cells clump(s) can be performed by subjecting the clump(s) to an enzyme such as type IV Collagenase (Worthington biochemical corporation, Lakewood, N.J., USA) and/or Dispase (Invitrogen Corporation products, Grand Island N.Y., USA). The time of incubation with the enzyme depends on the size of cell clumps present in the suspension culture. Typically, when pluripotent stem cells cell clumps are dissociated every 5-7 days in culture, incubation of 20-60 minutes with 1.5 mg/ml type IV Collagenase results in small cell clumps which can be further cultured in the formative state. Alternatively, pluripotent stem cells clumps can be subjected to incubation of about 25 minutes with 1.5 mg/ml type IV Collagenase followed by five minutes incubation with 1 mg/ml Dispase. It should be noted that passaging of human ESCs with trypsin may result in chromosomal instability and abnormalities (see for example, Mitalipova M M., et al., Nature Biotechnology, 23: 19-20, 2005 and Cowan C A et al., N. Engl. J. of Med. 350: 1353-1356, 2004). According to some embodiments of the invention, passaging hESC or iPS cell with trypsin should be avoided.

According to some embodiments of the invention, following enzymatic or mechanical dissociation of the large cell clumps, the dissociated pluripotent stem cells clumps are further broken to small clumps using 200 µl Gilson pipette tips (e.g., by pipetting up and down the cells).

The cells may be passaged in a medium containing a ROCK inhibitor (e.g. Y-27632) (and left in the presence of the ROCK inhibitor for no more than 48 hours or no more than 24 hours).

The formative hPSCs cultured according to the teachings of the present invention can be used as a source for generating differentiated, lineage-specific cells. Such cells can be obtained directly from the formative hPSCs by subjecting them to various differentiation signals (e.g., cytokines, hormones, growth factors) or indirectly, via the formation of embryoid bodies and the subsequent differentiation of cells of the EBs to lineage-specific cells.

Thus, according to an aspect of the some embodiments of the invention there is provided a method of generating embryoid bodies from formative hPSCs. The method is effected by (a) culturing the formative hPSCs to thereby obtain expanded, formative hPSCs; and (b) subjecting the expanded, formative hPSCs to culturing conditions suitable for differentiating the formative hPSCs to embryoid bodies, thereby generating the embryoid bodies from the formative hPSCs.

As used herein the phrase "embryoid bodies" refers to morphological structures comprised of a population of ESCs, extended blastocyst cells (EBCs), embryonic germ cells (EGCs) and/or induced pluripotent stem cells which have undergone differentiation. EBs formation initiates following the removal of differentiation blocking factors from the pluripotent stem cell cultures. In the first step of EBs formation, the pluripotent stem cells proliferate into small masses of cells which then proceed with differentiation. In the first phase of differentiation, following 1-4 days in culture for either human ESCs or human iPS cells, a layer of endodermal cells is formed on the outer layer of the small mass, resulting in "simple EBs". In the second phase, following 3-20 days post-differentiation, "complex EBs" are formed. Complex EBs are characterized by extensive differentiation of ectodermal and mesodermal cells and derivative tissues.

Thus, the method according to some embodiments of the invention involves the culturing of the formative hPSCs of some embodiments of the invention in order to obtain expanded, formative hPSCs and then subjecting the expanded, formative hPSCs to culturing conditions suitable for differentiating the formative hPSCs to embryoid bodies. Such differentiation-promoting culturing conditions are substantially devoid of differentiation inhibitory factors which are employed when pluripotent stem cells are to be expanded in an undifferentiated state, such as TGFβ1, TGFβ3, ascorbic acid, IL-11, CNTF, oncostatin, bFGF and/or the IL6RIL6 chimera.

For EBs formation, the formative hPSCs are transferred to a suspension culture in the presence of a culture medium containing serum or serum replacement and being devoid of differentiation-inhibitory factors. For example, a culture medium suitable for EBs formation may include a basic culture medium (e.g., Ko-DMEM or DMEM/F12) supplemented with 20% FBSd (HyClone, Utah, USA), 1 mM L-glutamine, 0.1 mM β-mercaptoethanol, and 1% non-essential amino acid stock.

Monitoring the formation of EBs is within the capabilities of those skilled in the art and can be effected by morphological evaluations (e.g., histological staining) and determination of expression of differentiation-specific markers [e.g., using immunological techniques or RNA-based analysis (e.g., RT-PCR, cDNA microarray)].

It will be appreciated that in order to obtain lineage-specific cells from the EBs, cells of the EBs can be further subjected to culturing conditions suitable for lineage-specific cells.

According to some embodiments of the invention, for generating lineage-specific cells from the formative hPSCs, the method the method further includes step (c) of subjecting cells of the embryoid bodies to culturing conditions suitable for differentiating and/or expanding lineage specific cells; thereby generating the lineage-specific cells from the formative hPSCs.

As used herein the phrase "culturing conditions suitable for differentiating and/or expanding lineage specific cells" refers to a combination of culture system, e.g., feeder-free matrix or a suspension culture and a culture medium which are suitable for the differentiation and/or expansion of specific cell lineages derived from cells of the EBs. Non-limiting examples of such culturing conditions are further described hereinunder.

According to some embodiments of the invention, the method of this aspect of the invention further includes isolating lineage specific cells following step (b).

As used herein, the phrase "isolating lineage specific cells" refers to the enrichment of a mixed population of cells in a culture with cells predominantly displaying at least one characteristic associated with a specific lineage phenotype. It will be appreciated that all cell lineages are derived from the three embryonic germ layers. Thus, for example, hepatocytes and pancreatic cells are derived from the embryonic endoderm, osseous, cartilaginous, elastic, fibrous connective tissues, myocytes, myocardial cells, bone marrow cells, vascular cells (namely endothelial and smooth muscle cells), and hematopoietic cells are differentiated from embryonic mesoderm and neural, retina and epidermal cells are derived from the embryonic ectoderm.

According to some preferred embodiments of the invention, isolating lineage specific cells is effected by sorting of cells of the EBs via fluorescence activated cell sorter (FACS).

Methods of isolating EB-derived-differentiated cells via FACS analysis are known in the art. According to one method, EBs are disaggregated using a solution of Trypsin and EDTA (0.025% and 0.01%, respectively), washed with 5% fetal bovine serum (FBS) in phosphate buffered saline (PBS) and incubated for 30 min on ice with fluorescently-labeled antibodies directed against cell surface antigens characteristics to a specific cell lineage. For example, endothelial cells are isolated by attaching an antibody directed against the platelet endothelial cell adhesion molecule-1 (PECAM1) such as the fluorescently-labeled PECAM1 antibodies (30884X) available from PharMingen (PharMingen, Becton Dickinson Bio Sciences, San Jose, Calif., USA) as described in Levenberg, S. et al., (Endothelial cells derived from human embryonic stem cells. Proc. Natl. Acad. Sci. USA. 2002. 99: 4391-4396). Hematopoietic cells are isolated using fluorescently-labeled antibodies such as CD34-FITC, CD45-PE, CD31-PE, CD38-PE, CD90-FITC, CD117-PE, CD15-FITC, class I-FITC, all of which IgG1 are available from PharMingen, CD133/1-PE (IgG1) (available from Miltenyi Biotec, Auburn, Calif.), and glycophorin A-PE (IgG1), available from Immunotech (Miami, Fla.). Live cells (i.e., without fixation) are analyzed on a FACScan (Becton Dickinson Bio Sciences) by using propidium iodide to exclude dead cells with either the PC-LYSIS or the CELLQUEST software. It will be appreciated that isolated cells can be further enriched using magnetically-labeled second antibodies and magnetic separation columns (MACS, Miltenyi) as described by Kaufman, D. S. et al., (Hematopoietic colony-forming cells derived from human embryonic stem cells. Proc. Natl. Acad. Sci. USA. 2001, 98: 10716-10721).

According to some embodiments of the invention, isolating lineage specific cells is effected by a mechanical separation of cells, tissues and/or tissue-like structures contained within the EBs.

For example, beating cardiomyocytes can be isolated from EBs as disclosed in U.S. Pat. Appl. No. 20030022367 to Xu et al. Four-day-old EBs of the present invention are transferred to gelatin-coated plates or chamber slides and are allowed to attach and differentiate. Spontaneously contracting cells, which are observed from day 8 of differentiation, are mechanically separated and collected into a 15-mL tube containing low-calcium medium or PBS. Cells are dissociated using Collagenase B digestion for 60-120 minutes at 37° C., depending on the Collagenase activity. Dissociated cells are then resuspended in a differentiation KB medium (85 mM KCl, 30 mM $K_2HPO_4$, 5 mM $MgSO_4$, 1 mM EGTA, 5 mM creatine, 20 mM glucose, 2 mM $Na_2ATP$, 5 mM pyruvate, and 20 mM taurine, buffered to pH 7.2, Maltsev et al., Circ. Res. 75:233, 1994) and incubated at 37° C. for 15-30 min. Following dissociation cells are seeded into chamber slides and cultured in the differentiation medium to generate single cardiomyocytes capable of beating.

According to some embodiments of the invention, isolating lineage specific cells is effected by subjecting the EBs to differentiation factors to thereby induce differentiation of the EBs into lineage specific differentiated cells.

Following is a non-limiting description of procedures and approaches for inducing differentiation of EBs to lineage specific cells.

To differentiate the EBs of some embodiments of the invention into neural precursors, four-day-old EBs are cultured for 5-12 days in tissue culture dishes including DMEM/F-12 medium with 5 mg/ml insulin, 50 mg/ml transferrin, 30 nM selenium chloride, and 5 mg/ml fibronectin (ITSFn medium, Okabe, S. et al., 1996, Mech. Dev. 59: 89-102). The resultant neural precursors can be further transplanted to generate neural cells in vivo (Brüstle, O. et al., 1997. In vitro-generated neural precursors participate in mammalian brain development. Proc. Natl. Acad. Sci. USA. 94: 14809-14814). It will be appreciated that prior to their transplantation, the neural precursors are trypsinized and triturated to single-cell suspensions in the presence of 0.1% DNase.

EBs of some embodiments of the invention can differentiate to oligodendrocytes and myelinate cells by culturing the cells in modified SATO medium, i.e., DMEM with bovine serum albumin (BSA), pyruvate, progesterone, putrescine, thyroxine, triiodothryonine, insulin, transferrin, sodium selenite, amino acids, neurotrophin 3, ciliary neurotrophic factor and Hepes (Bottenstein, J. E. & Sato, G. H., 1979, Proc. Natl. Acad. Sci. USA 76, 514-517; Raff, M. C., Miller, R. H., & Noble, M., 1983, Nature 303: 390-396]. Briefly, EBs are dissociated using 0.25% Trypsin/EDTA (5 min at 37° C.) and triturated to single cell suspensions. Suspended cells are plated in flasks containing SATO medium supplemented with 5% equine serum and 5% fetal calf serum (FCS). Following 4 days in culture, the flasks are gently shaken to suspend loosely adhering cells (primarily oligodendrocytes), while astrocytes are remained adhering to the flasks and further producing conditioned medium. Primary oligodendrocytes are transferred to new flasks containing SATO medium for additional two days. Following a total of 6 days in culture, oligospheres are either partially dissociated and resuspended in SATO medium for cell transplantation, or completely dissociated and a plated in an oligosphere-conditioned medium which is derived from the previous shaking step [Liu, S. et al., (2000). Embryonic stem cells differentiate into oligodendrocytes and myelinate in culture and after spinal cord transplantation. Proc. Natl. Acad. Sci. USA. 97: 6126-6131].

For mast cell differentiation, two-week-old EBs of some embodiments of the invention are transferred to tissue culture dishes including DMEM medium supplemented with 10% FCS, 2 mM L-glutamine, 100 units/ml penicillin, 100 mg/ml streptomycin, 20% (v/v) WEHI-3 cell-conditioned medium and 50 ng/ml recombinant rat stem cell factor (rrSCF, Tsai, M. et al., 2000. In vivo immunological function of mast cells derived from embryonic stem cells: An approach for the rapid analysis of even embryonic lethal mutations in adult mice in vivo. Proc Natl Acad Sci USA. 97: 9186-9190). Cultures are expanded weekly by transferring the cells to new flasks and replacing half of the culture medium.

To generate hemato-lymphoid cells from the EBs of some embodiments of the invention, 2-3 days-old EBs are transferred to gas-permeable culture dishes in the presence of 7.5% $CO_2$ and 5% $O_2$ using an incubator with adjustable oxygen content. Following 15 days of differentiation, cells are harvested and dissociated by gentle digestion with Collagenase (0.1 unit/mg) and Dispase (0.8 unit/mg), both are available from F.Hoffman-La Roche Ltd, Basel, Switzerland. CD45-positive cells are isolated using anti-CD45 monoclonal antibody (mAb) M1/9.3.4.HL.2 and paramagnetic microbeads (Miltenyi) conjugated to goat anti-rat immunoglobulin as described in Potocnik, A. J. et al., (Immunology Hemato-lymphoid in vivo reconstitution potential of subpopulations derived from in vitro differentiated embryonic stem cells. Proc. Natl. Acad. Sci. USA. 1997, 94: 10295-10300). The isolated CD45-positive cells can be further enriched using a single passage over a MACS column (Miltenyi).

It will be appreciated that the culturing conditions suitable for the differentiation and expansion of the isolated lineage specific cells include various tissue culture media, growth factors, antibiotic, amino acids and the like and it is within the capability of one skilled in the art to determine which conditions should be applied in order to expand and differentiate particular cell types and/or cell lineages.

As mentioned above, lineage specific cells can be obtained by directly inducing the expanded, formative hPSCs to culturing conditions suitable for the differentiation of specific cell lineage—see for example FIG. 19.

According to an aspect of some embodiments of the invention there is provided a method of generating lineage-specific cells from formative hPSCs. The method is effected by (a) culturing the formative hPSCs according to the method of some embodiments of the invention, to thereby obtain expanded, formative hPSCs; and (b) subjecting the formative hPSCs to culturing conditions suitable for differentiating and/or expanding lineage specific cells, thereby generating the lineage-specific cells from the formative hPSCs.

Following are non-limiting examples of culturing conditions which are suitable for differentiating and/or expanding lineage specific cells from formative hPSCs.

Mesenchymal stromal cells which are CD73-positive and SSEA-4-negative can be generated from hESCs by mechanically increasing the fraction of fibroblast-like differentiated cells formed in cultures of hESCs, essentially as described in Trivedi P and Hematti P. Exp Hematol. 2008, 36(3):350-9. Briefly, to induce differentiation of hESC the intervals between medium changes are increased to 3-5 days, and the cells at the periphery of the ESC colonies become spindle-shaped fibroblast-looking cells. After 9-10 days under these conditions when about 40-50% of the cells in the culture acquire the fibroblast-looking appearance, the undifferentiated portions of ESC colonies are physically removed and the remaining differentiated cells are passaged to new culture plates under the same conditions.

To induce differentiation of formative hPSCs into dopaminergic (DA) neurons, the cells can be co-cultured with the mouse stromal cell lines PA6 or MS5, or can be cultured with a combination of stromal cell-derived factor 1 (SDF-1/CXCL12), pleiotrophin (PTN), insulin-like growth factor 2 (IGF2) and ephrin B1 (EFNB1) essentially as described in Vazin T, et al., PLoS One. 2009 Aug. 12; 4(8):e6606; and in Elkabetz Y., et al., Genes Dev. 2008 Jan. 15; 22: 152-165.

To generate mesencephalic dopamine (mesDA) neurons, formative hPSCs can be genetically modified to express the transcription factor Lmx1a (e.g., using a lentiviral vector with the PGK promoter and Lmx1a) essentially as described in Friling S., et al., Proc Natl Acad Sci USA. 2009, 106: 7613-7618.

To generate lung epithelium (type II pneumocytes) from formative hPSCs, the formative hPSCs can be cultured in the presence of a commercially available cell culture medium (Small Airway Growth Medium; Cambrex, College Park, Md.), or alternatively, in the presence of a conditioned medium collected from a pneumocyte cell line (e.g., the A549 human lung adenocarcinoma cell line) as described in Rippon H J., et al., Proc Am Thorac Soc. 2008; 5: 717-722.

To induce differentiation of formative hPSCs into neural cells, the formative hPSCs can be cultured for about 5 days in the presence of a serum replacement medium supplemented with TGF-b inhibitor (SB431542, Tocris; e.g., 10 nM) and Noggin (R&D; e.g., 500 ng/ml), following which the cells are cultured with increasing amounts (e.g., 25%, 50%, 75%, changed every two days) of N2 medium (Li X J., et al., Nat Biotechnol. 2005, 23:215-21) in the presence of 500 ng/mL Noggin, essentially as described in Chambers S M., et al., Nat Biotechnol. 2009, 27: 275-280.

To induce differentiation of formative hPSCs into neural progenitors, the cells are cultured in suspension, following which the differentiation inhibition factors are removed from the culture medium and $5\times10^{-5}$ M Retinoic acid is added for 21 Days. The cells are then transferred to fibronectin coated plates and cultured for additional 5 days before harvesting the cells for analysis. Q-PCR and immunostainings confirm the presence of neuronal progenitor cells.

To induce differentiation of formative hPSCs into endoderm cells (including insulin producing cells) the differentiation inhibition factors are removed from the culture medium of the formative hPSCs and the cells are exposed to 10 ng/ml Activin for 48 hours, in medium containing cAMP increasers such as forskolin, 8-bromocAMP, GABA, IBMX and DBC. Ten days later the cells are analyzed for endodermal markers. Q-PCR for Sox17 demonstrate significant increase in Sox17 expression in treated cells in compare to none treated controls.

To induce differentiation of formative hPSCs into mesenchymal stem cells (MSCs) the formative hPSCs are transferred to serum containing medium for 14 days and then plated on either gelatin or Matrigel. 7-14 days later the cells are differentiated into MSCs, which can be either frozen or passaged while using trypsin.

In addition to the lineage-specific primary cultures, formative hPSCs of the invention can be used to generate lineage-specific cell lines which are capable of unlimited expansion in culture.

Cell lines of the present invention can be produced by immortalizing the formative hPSC-derived cells by methods known in the art, including, for example, expressing a telomerase gene in the cells (Wei, W. et al., 2003. Mol Cell Biol. 23: 2859-2870) or co-culturing the cells with NIH 3T3 hph-HOX11 retroviral producer cells (Hawley, R. G. et al., 1994. Oncogene 9: 1-12).

It will be appreciated that since the lineage-specific cells or cell lines obtained according to the teachings of the invention are developed by differentiation processes similar to those naturally occurring in the human embryo they can be further used for human cell-based therapy and tissue regeneration.

Thus, the invention envisages the use of the expanded and/or differentiated lineage-specific cells or cell lines of some embodiments of the invention for treating a disorder requiring cell replacement therapy (cell based therapy).

For example, oligodendrocyte precursors can be used to treat myelin disorders (Repair of myelin disease: Strategies and progress in animal models. Molecular Medicine Today. 1997. pp. 554-561), chondrocytes or mesenchymal cells can be used in treatment of bone and cartilage defects (U.S. Pat. No. 4,642,120) and cells of the epithelial lineage can be used in skin regeneration of a wound or burn (U.S. Pat. No. 5,716,411).

For certain disorders, such as genetic disorders in which a specific gene product is missing [e.g., lack of the CFTR gene-product in cystic fibrosis patients (Davies J C, 2002. New therapeutic approaches for cystic fibrosis lung disease. J. R. Soc. Med. 95 Suppl 41:58-67)], ESC-derived cells or iPS cells-derived cells are preferably manipulated to over-express the mutated gene prior to their administration to the individual. It will be appreciated that for other disorders, the ESC-derived cells or iPS-derived cells should be manipulated to exclude certain genes.

Over-expression or exclusion of genes can be effected using knock-in and/or knock-out constructs [see for example, Fukushige, S. and Ikeda, J. E.: Trapping of mammalian promoters by Cre-lox site-specific recombination. DNA Res 3 (1996) 73-50; Bedell, M. A., Jerkins, N. A. and Copeland, N. G.: Mouse models of human disease. Part I: Techniques and resources for genetic analysis in mice. Genes and Development 11 (1997) 1-11; Bermingham, J. J., Scherer, S. S., O'Connell, S., Arroyo, E., Kalla, K. A., Powell, F. L. and Rosenfeld, M. G.: Tst-1/Oct-6/SCIP regulates a unique step in peripheral myelination and is required for normal respiration. Genes Dev 10 (1996) 1751-62].

The lineage specific cells of some embodiments of the invention can be utilized to produce high amounts (massive production) of proteins such as hormones, cytokines, growth factors and drugs. For example, to produce the proteins the cells should be induced to over-express the protein by transfection for example, and after expansion the protein could be isolated from the culture medium.

The lineage specific cells of some embodiments of the invention can be utilized to prepare a cDNA library. mRNA is prepared by standard techniques from the lineage specific cells and is further reverse transcribed to form cDNA. The cDNA preparation can be subtracted with nucleotides from embryonic fibroblasts and other cells of undesired specificity, to produce a subtracted cDNA library by techniques known in the art.

The lineage specific cells of some embodiments of the invention can be used to screen for factors (such as small molecule drugs, peptides, polynucleotides, and the like) or conditions (such as culture conditions or manipulation) that affect the differentiation of lineage precursor to terminally differentiated cells (e.g., for drug screening). For example, growth affecting substances, toxins or potential differentiation factors can be tested by their addition to the culture medium.

The lineage specific cells of some embodiments of the invention can be used to prepare a vaccine. For example, the pluripotent stem cells, or cells differentiated therefrom, can be inoculated with viral particles and further cultured in a suitable medium until cell lysis occurs and newly produced viral particles are released in the medium. The cells can be used for production of attenuated virus belonging to the family of poxvirus, in particular canarypoxvirus, fowlpoxvirus and vaccinia virus such as native or recombinant vaccinia virus [for example, Modified Vaccinia virus Ankara such as MVA available under ATCC Number VR-1508) or other orthopoxviruses]. For additional description see U.S. Patent Application No. 20040058441 which is fully incorporated herein by reference.

As mentioned the formative hPSCs of the present invention can also be used to generate primordial germ cells. Exemplary methods for preparing PGCs include, are disclosed in Hayashi, K., (2011) Cell 146, 519-532; Sasaki, K., (2015) Cell Stem Cell 17, 178-194; and Irie, N., (2015) Cell 160, 253-268, the contents of which are incorporated herein by reference.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements. Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Md. (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, Conn. (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, Calif. (1990); Marshak et al., "Strategies for Protein Purification and Characterization—A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Example 1

Materials and Methods hPSC culture—hPSC culture—hPSC lines HES-1, HES-2 (10), HADC100, HADC102 (36) and H7 (9) were cultured on human foreskin feeders in serum free medium as described (30, 87). hPSC culturing in suspension was performed as reported (31) with minor modifications of the culture medium that was composed of Neurobasal medium, 14% KO-SR, L-glutamine 2 mM, 50 units/ml penicillin, 50 µg/ml streptomycin, 1% nonessential amino acids (all from Invitrogen, Carlsbad, Calif., USA). The medium was supplemented with FGF2 20 ng/ml, and activin A 25 ng/ml (both from Peprotech, Rocky Hill, N.J., USA), and laminin 0.5 µg/ml (Sigma-Aldrich, St. Louis, Mo., USA). For hPSC culturing on mouse LN111, 3-D Culture Matrix Laminin I (CULTREX, TREVIGEN, #3446-005-01, Gaithersburg, Md., USA) was diluted to a concentration of 1 mg/ml. Tissue culture dishes were coated with LN111, incubated overnight at 37° C. to promote matrix gelling, and washed with PBS. hPSCs were cultured on LN111 in a chemically defined medium composed of DMEM/F12, B27 supplement (1:50), N2 supplement (1:100) 2 mM L-glutamine, 50 units/ml penicillin, 50 µg/ml streptomycin (all from Invitrogen), and supplemented with 20 ng/ml bFGF (Peprotech). The cells were cultured in 5% $CO_2$, 5% $O_2$ incubator They were passed every 7 days as small clusters by treatment with 1 mg/ml collagenase type IV (Invitrogen), and plated in a medium containing 5 µM ROCK inhibitor. hPSC culture under naïve conditions was performed using the 5iLFA protocol (20).

Signaling pathways analysis—hPSCs were cultured on LN111 for 2 days in complete medium, and then for additional 3-5 days in a medium+/−FGF2 in the presence of the following small molecules: PD032590 1 µM (Peprotech), LY294002 10 µM, SB431542 10 µM, CHIR99021 3 µM (all from Cayman Chemical, Michigan, USA), XAV939 2.5 µM (Peprotech), BMP4 50 ng/ml (Biogems-Peprotech).

Generation of FGF5 reporter cell lines—a 3 kb fragment of human FGF5 promoter (GeneBank accession number NT_016354) was amplified from HES-1 genomic DNA using Expand High Fidelity PCR System (Roche Applied Science, Penzberg, Germany) with primers CGGAATTC TTGCTTTCCTGGCTGGGAG (SEQ ID NO: 1) (EcoRI) and CAGGGCCC AGCCTCGGG-GAAGAGAAGG (SEQ ID NO: 2) (ApaI). The PCR product was first cloned into the pGEM®-T Easy Vector System (Promega, Madison Wis., USA), and then re-cloned into pEGFP-1 (clontech, Madison Wis., USA) using the EcoRI and ApaI sites. The resulting reporter vector, pFGF5-GFP, harboring the EGFP reporter gene under the control of the human FGF5 promoter as well as a neomycin-resistance cassette (Ned), was linearized using Eco47III, and transfected into HES-1 cells using Amaxa™ Nucleofector™ Technology (Amaxa GmbH, Lonza Group AG, Cologne, Germany). Before nucleoporation HES-1 cells were dissociated into a single cell suspension by 0.05% EDTA solution (Biological Industries, Beit-Haemek, Israel). $5×10^5-1×10^6$ dissociated hESCs were combined with 5 µg linearized reporter vector, and nucleoporation was performed using Mouse ES Cell Nucleofector® Solution, and program A-23. The transfected cells were plated in 6-cm tissue culture dishes on fresh foreskin feeders expressing the neomycin-resistance gene, in the presence of 10 µM of the ROCK inhibitor Y-27632 (Peprotech), and incubated at 37° C., 5% CO2 incubator. 48 h post transfection antibiotic selection was started by replacing the medium with fresh hESC culture medium containing 35-50 µg/ml G418 (Calbiotech, Merck Millipore, MA, USA), and continued for 6-7 days until the emergence of G418 resistant hES colonies. Single colonies were picked, replated, and analyzed for the integrity of the integrated reporter vector. Three reporter clones were chosen for further analysis (#1, #2, #3). Immunostaining of these clones for FGF5 demonstrated that a high percentage of the reporter cells (84%) co-expressed GFP together with FGF5, confirming their reliability as monitors of FGF5 expression.

Immunofluorescence staining: 4-6 day hESC colonies were fixed with 4% paraformaldehyde for 20 min at RT, permeabilized and blocked with 0.2% Triton X100 (Sigma-Aldrich), 5% normal goat/donkey serum (Biological industries, Beit Haemek, Israel) in PBS for 45 min, and incubated 1 hour at RT with the following primary antibodies: mouse IgG2b anti-human Oct4 (1:50; Cat. No. SC5279, Santa Cruz Biotechnology Inc., USA), goat polyclonal IgG anti-human FGF5 (1:250; Cat. No. AF-237-NA, R&D Systems, Minneapolis, Minn., USA), Rabbit polyclonal IgG anti-GFP (1:250; Cat. No. A11122, Invitrogen), goat polyclonal IgG anti-Brachyury (1:150; Cat. No. AF-2085, R&D Systems), and goat polyclonal IgG anti-human OTX2 (1:50; Cat. No. AF-1979, R&D Systems). Following washes with PBS the cells were incubated 45 min at RT with the corresponding secondary antibodies: Alexa 488 Donkey anti-Rabbit IgG (1:200; Cat. No. A21206, Invitrogen), Alexa 488-conjugated Donkey anti-Mouse IgG (1:200; Cat. No. A21202, Invitrogen), Alexa 488-conjugated Donkey anti-Goat IgG (1:200; Cat. No. A11055 Invitrogen), or Rhodamine Red-X-AffiniPure Donkey Anti-Goat IgG (1:300; Cat. No. 705-295-147, Jackson, West Grove, PN). Stained cells were mounted with Vectashield mounting medium containing DAPI for nuclei counterstaining (Cat. No. H-1200, Vector Laboratories, CA, USA), and staining was visualized with a Nikon E600 fluorescent microscope.

FACS analysis—FACS analyses were performed using the following primary antibodies: mouse IgM anti-TRA-1-60 (1:100; mab4360, R&D), and mouse IgM anti-TRA-1-81 (1:100; mab4381, R&D), and Rat IgM anti-SSEA-3. Staining with respective isotype control antibodies (all from eBiosciences) served as controls. Detection of primary antibodies was performed using the following secondary antibodies: FITC-conjugated Polyclonal Goat Anti-Mouse Immunoglobulins (1:100; Dako, Glostrup, Denmark), APC-conjugated Goat anti-Mouse IgM/G (1:200; Cat. No. 1020-11, SouthernBiotech, Birmingham, Ala., USA), and APC-conjugated anti-Rat (1:200; eBioscience). FACS analysis was performed on a FACScalibur system (Becton-Dickinson, San Jose, Calif.) using the Cellquest software. A detailed FACS procedure is described elsewhere [36].

RNA isolation and cDNA synthesis—Total RNA was isolated from hPSCs using TRIzol® Reagent (Invitrogen), or using the Quick-RNA microprep kit (Zymo Research (Irvine, Calif., USA). Reverse transcription of full-length cDNA from total RNA was carried out using MMLV reverse transcriptase and random hexamers according to the manufacturer's instructions (Promega, Madison, Wis., USA), or the qScript cDNA synthesis kit (Quanta Biosciences, Beverly, Mass., USA).

RT-PCR analysis—Qualitative expression Analysis of selected genes was carried by PCR amplification of cDNA with specific primers. Taq DNA Polymerase (Cat. No. M186A, Promega) was used for amplification with the following PCR program: 35 cycles of denaturation at 94° C. for 30 s, annealing at 55° C. for 30 s, and extension at 72° C. for 30-45 s. PCR products were resolved on 1% agarose gels.

Real Time PCR analysis—A relative gene expression quantitation assay was performed by amplification of 50 ng cDNA by Real Time PCR, using ABI Prism 7900HT Sequence Detection System (Applied Biosystems (ABI), Foster City, Calif.), specific TaqMan® Gene Expression Assays and TaqMan Fast Universal PCR master Mix. Human β-glucuronidase (gusB) or human β-actin (actB) were used as endogenous gene references. Data was analyzed using the RQ Manager Software v1.2 (ABI). For global expression analysis of pluripotency and differentiation associated genes, 200 ng cDNA were subjected to Real Time PCR amplification using Applied Biosystems® TaqMan® Human Stem Cell Pluripotency Array (Cat. No. 4385344), and Taqman Gene Expression Master Mix. Array data was analyzed using the DataAssist Software v2.0 (ABI).

Alkaline phosphatase activity detection and karyotyping—Detection of alkaline phosphatase activity was performed on hPSC colonies using the Alkaline Phosphatase Staining Kit II (Stemgent, Cambridge, Mass., USA) according to the manufacturer's instructions. Karyotype analysis, was performed on 3-4 day hPSC colonies.

Differentiation of hESCs in vitro for assessment of pluripotency—Adherent colonies of undifferentiated hPSCs cultured on LN111 were dissociated from the matrix using Collagenase type IV (Invirogen), and cultured in suspension as embryoid bodies (EBs) in medium composed of DMEM, 15-20% FCS, 2 mM L-glutamine, 1% nonessential amino acids, 50 U/ml penicillin, 50 µg/ml streptomycin, and 0.1 mM beta-mercaptoethanol (all from Invitrogen), or as neural progenitors (NPs) in DMEM/F12 medium containing B-27 (1:50), 2 mM L-Glutamine, 50 U/ml penicillin, and 50 µg/ml streptomycin (all from Invitrogen), and supplemented with 20 ng/ml bFGF and 500 ng/ml rh-Noggin (both from Peprotech). Following three weeks in culture, the EBs and NPs were further differentiated by partial dissociation, plating on glass coverslips coated with 10 µg/ml poly-d-lysine and 4 µg/ml laminin (both from Sigma), and culturing for additional 5-7 days in the respective culture media without noggin and bFGF. The differentiated cells were fixed with 4% PFA and stained with mouse monoclonal anti-beta-tubulin isotype III (1:2000; Sigma), mouse monoclonal anti-human muscle actin (1:50; Dako), and mouse monoclonal anti-human FOXA2 (1:50; R&D). Detection of the primary antibodies was performed by FITC-conjugated Polyclonal goat anti-mouse immunoglobulins (1:50, Dako).

Teratoma Formation assay—Teratoma formation assay was performed as previously described [87].

TABLE 2

TaqMan ® Gene expression Assays-on-Demand (ABI):

| Gene | assay ID |
| --- | --- |
| ACTB (Endogenous control) | Hs01060665_g1 |
| GusB (Endogenous control) | Hs00939627_m1 |
| Brachyury | Hs00610080_m1* |
| CDX2 | Hs01078080_m1* |
| CGA | Hs00174938_m1* |
| DPPA3 | Hs01657068_g1 |
| FGF4 | Hs00173564_m1* |
| FGF5 | Hs03676587-s1 |
| FOXD3 | Hs00255287_s1* |
| GDF3 | Hs00220998_m1* |
| KLF2 | Hs00360439_g1* |
| KLF4 | Hs00358836_m1* |
| LEFTY2 | Hs00745761_s1* |
| LIN28A | Hs00702808_s1 |
| Nanog | Hs02387400_g1 |
| NODAL | Hs00415443_m1* |
| NR5A2 | Hs00187067_m1* |
| Oct4 | Hs04260367 |
| OTX2 | Hs00222238_m1 |
| SFRP1 | Hs00610060_m1 |
| SFRP2 | Hs00293258_m1 |
| SOX2 | Hs01053049_s1 |
| ZIC3 | Hs00185665_m1 |

TABLE 1

PCR Primer sequences:

| Gene | Forward Primer | Reverse Primer | product length (bp) |
| --- | --- | --- | --- |
| GAPDH NM_002046 | GACAACAGCCTCAAGATC SEQ ID NO: 3 | GTCCACCACTGACACGTT SEQ ID NO: 4 | 311 |
| OCT4 NM_002701 | AGTGAGAGGCAACCTGGAG SEQ ID NO: 5 | GTGAAGTGAGGGCTCCCATA SEQ ID NO: 6 | 273 |
| Nanog NM_024865 | CGAAGAATAGCAATGGTGTGACG SEQ ID NO: 7 | TTCCAAAGCAGCCTCCAAGTC SEQ ID NO: 8 | 328 |
| SOX2 NM_003106 | GCCCTGCAGTACAACTCCAT SEQ ID NO: 9 | GGTAGTGCTGGGACATGTGA SEQ ID NO: 10 | 285 |
| FGF5 NM_004464 NM_033143 | GATCCCACGAAGCCAATA SEQ ID NO: 11 | GCTCCGACTGCTTGAATC SEQ ID NO: 12 | 338 234 |
| KLF4 NM_004235.4 | GGACCCGGTGTACATTCC SEQ ID NO: 13 | CTCTGGCATGCAGGAACC SEQ ID NO: 14 | 500 |
| ACTRIA | AATGTTGCCGTGAAGATCTTC SEQ ID NO: 15 | CTGAGAACCATCTGTTGGGTA SEQ ID NO: 16 | 699 |
| ACTRIB | CACGTGTGAGACAGATGGG SEQ ID NO: 17 | GGCGGTTGTGATAGACACG SEQ ID NO: 18 | 346 |
| ACTRIIA | AACCATGGCTAGAGGATTGGC SEQ ID NO: 19 | CTTTCACCTACACATCCAGCTG SEQ ID NO: 20 | 551 |
| ACTRIIB | CACCATCGAGCTCGTGAAG SEQ ID NO: 21 | GAGCCCTTGTCATGGAAGG SEQ ID NO: 22 | 611 |
| Activin A | CTTGAAGAAGAGACCCGAT SEQ ID NO: 23 | CTTCTGCACGCTCCACCAC SEQ ID NO: 24 | 262 |

Results hPSCs express heterogeneous levels of FGF5 under various culture conditions—To identify putative post-implantation pluripotent stem cells, the present inventors monitored the expression of fgf5 gene. For this purpose, they generated FGF5-GFP hPSC reporter lines by stable transfection of hPSCs (HES-1 cell line (10)) with a plasmid harboring eGFP under the control of a 3 kb fragment of the human fgf5 promoter (see materials and methods). Following antibiotic selection, they isolated three reporter clones for analysis.

Figure 1B:
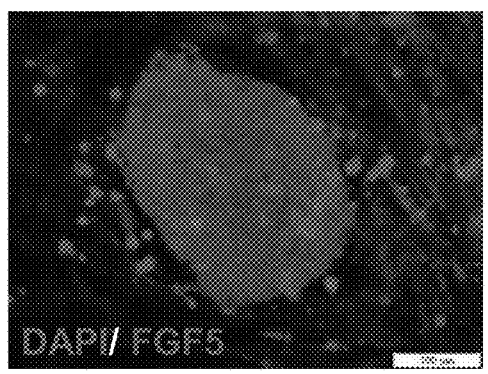
Figure 1C:
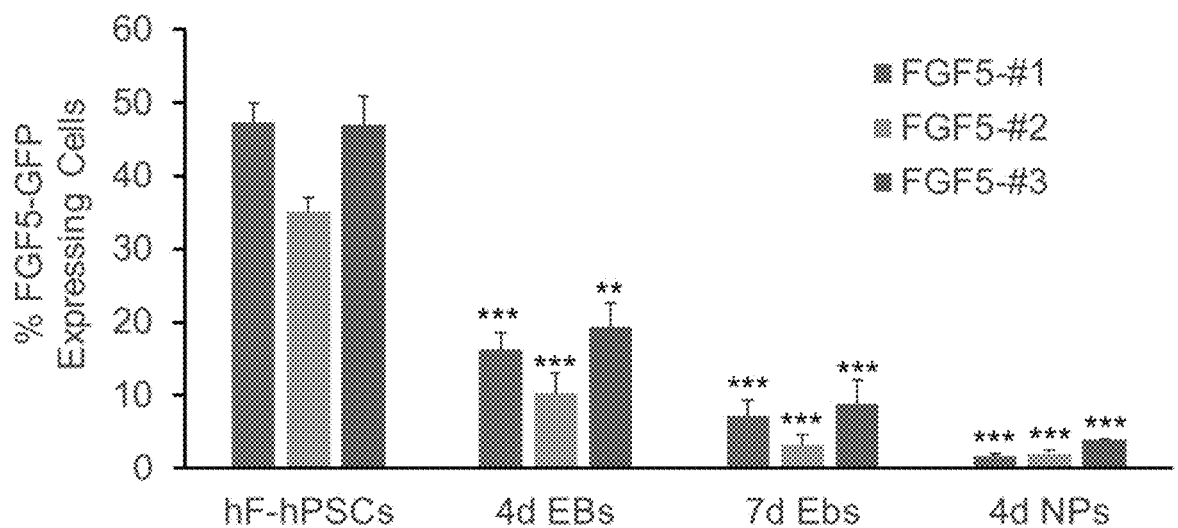

FGF5 expression was assessed in three hPSC culture systems: culturing on human foreskin feeders (hF-hPSCs) (30), feeder-free culturing in suspension (S-hPSCs) (31), and the 5iLFA naïve culture system (N-hPSCs) (20). Analysis of the expression of FGF5 by RT-PCR in hF-hPSCs, after enzymatic separation from the feeders, revealed that the cells expressed both splice variants of FGF5 (32). However, the two variants were also expressed by the feeders (FIG. 1A), and hence potential contamination of the RT-PCR results by feeders' RNA could not be ruled out. Immunofluorescence staining confirmed FGF5 expression by the feeders, and showed heterogeneous expression in the hF-hPSCs (FIG. 1B). To monitor the expression that is exclusive to hF-hPSCs, the FGF5-GFP hPSC reporter line was used. FACS analyses of the hF-hPCS reporter cultures revealed that the average percentages of FGF5-GFP expressing cells in clones #1, #2 and #3 were 47%±3%, 35%±2%, and 47%±4% respectively. Four days following spontaneous differentiation of the reporter clones as Embryoid Bodies (EBs), the percentages of FGF5-GFP positive cells significantly decreased to 16%±2%, 10%±3%, and 19%±3%, and declined to 7%±2%, 3%±1%, and 9%±3% in seven days EBs. The down-regulation in the percentages of FGF5-GFP expressing cells was more rapid when the reporter clones were induced to differentiate into Neural Progenitors (NPs) (33), declining to 2%±0.3%, 2%±0.6%, and 4%±0% respectively after four days of neural differentiation (FIG. 1C). Taken together, these results showed heterogeneous expression of FGF5 in hF-hPSCs that declined following differentiation.

Figure 1D:
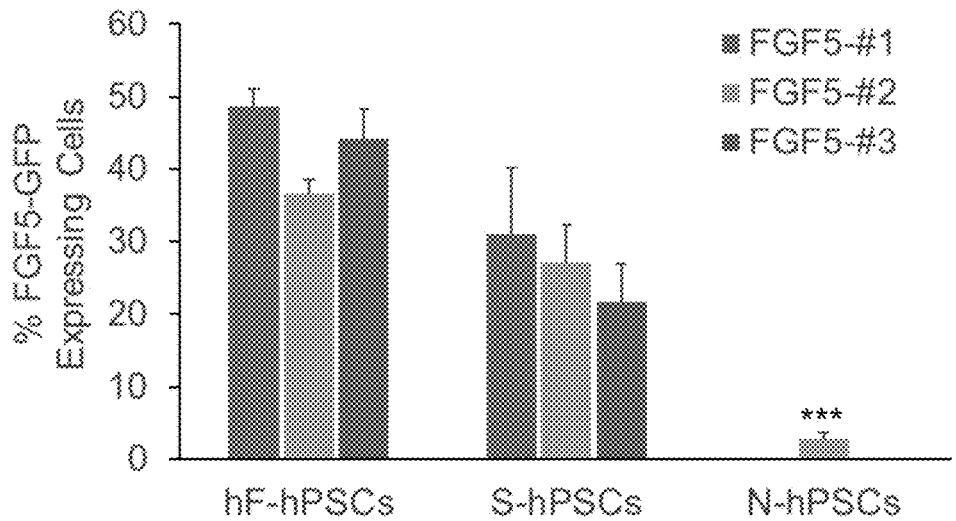

FACS analyses of the three clones cultured in suspension revealed lower average percentages of FGF5-GFP expressing cells (31%±9%, 27%±5%, and 22%±5%, respectively), compared with feeders-dependent cultures, while only a minority of cells of clone #2 reporter cultured in naïve conditions expressed FGF5-GFP (2.7%±1.1%) (FIG. 1D).

Figure 1E:
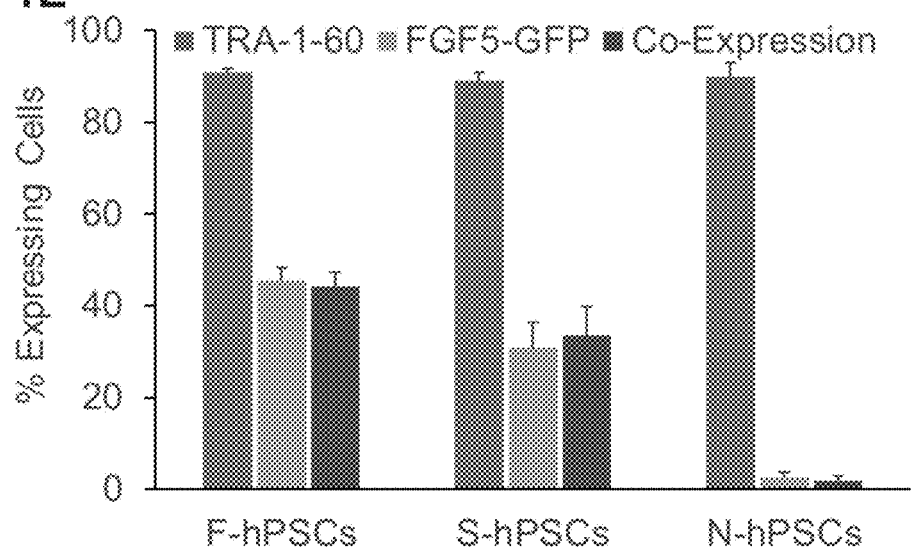
Figure 1F:
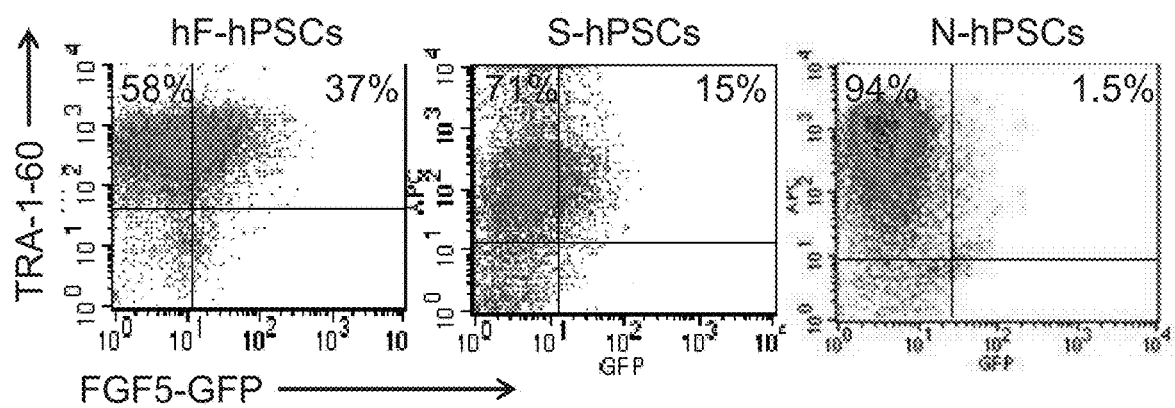

To characterize the population of FGF5-GFP expressing cells in the three culture systems we performed FACS analyses for the co-expression of FGF5-GFP with the pluripotency cell-surface marker TRA-1-60. In all three hPSC culture systems over 90% of the cells expressed TRA-1-60. Moreover, in each system the majority of FGF5-GFP positive cells co-expressed TRA-1-60 (FIGS. 1E-F). These results showed that undifferentiated TRA-1-60 expressing hF-hPSCs and S-hPSCs were heterogeneous with regard to FGF5 expression. Whereas, only a minority of TRA-1-60 expressing N-hPSCs, which represent the preimplantation epiblast expressed FGF5. Given the association of FGF5 expression with the post-implantation epiblast during mouse embryonic development, we hypothesized that the FGF5-expressing cells in our cultures may also represent a post-implantation pluripotency phase.

Development of a culture system promoting self-renewal of FGF5-expressing cells: The present inventors next sought to develop culture conditions that will promote the propagation of homogenous cultures of FGF5-expressing cells. Specifically, the present inventors developed a LN111-based, feeder and serum-free, chemically defined culture system, for the propagation of enriched cultures of FGF5-expressing stem cells.

Figure 7A:
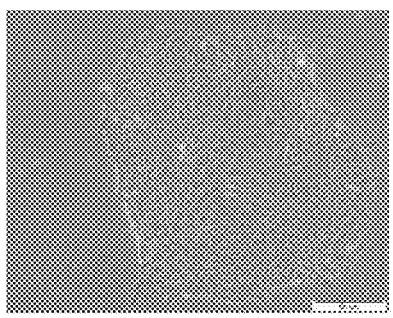
Figure 7B:
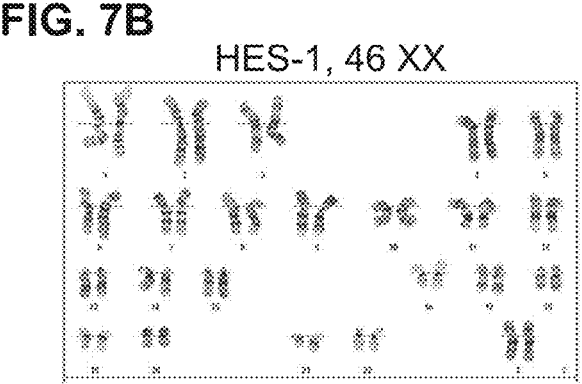
Figure 7C:
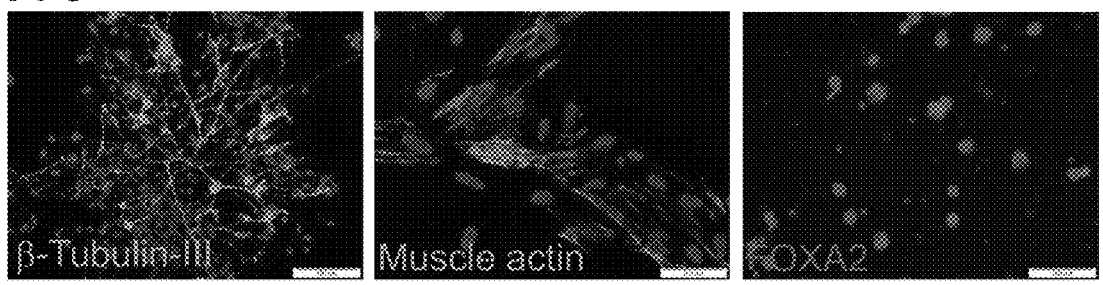
Figure 7D:
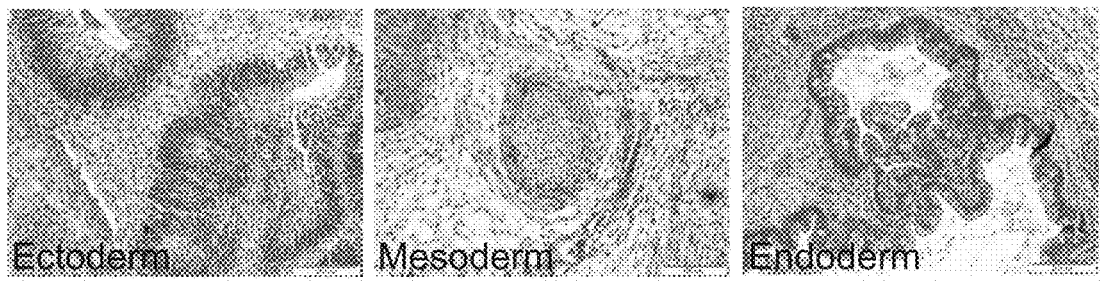
Figure 7E:
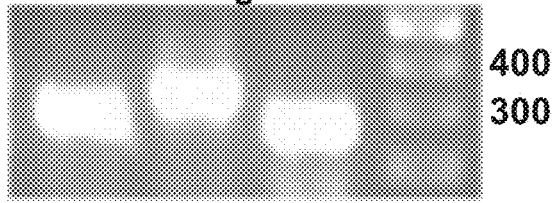
Figure 7F:
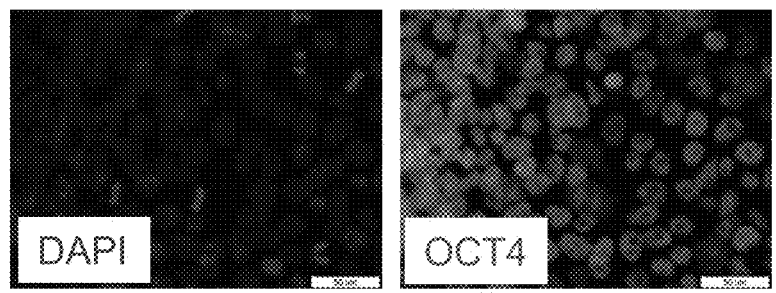
Figure 7G:
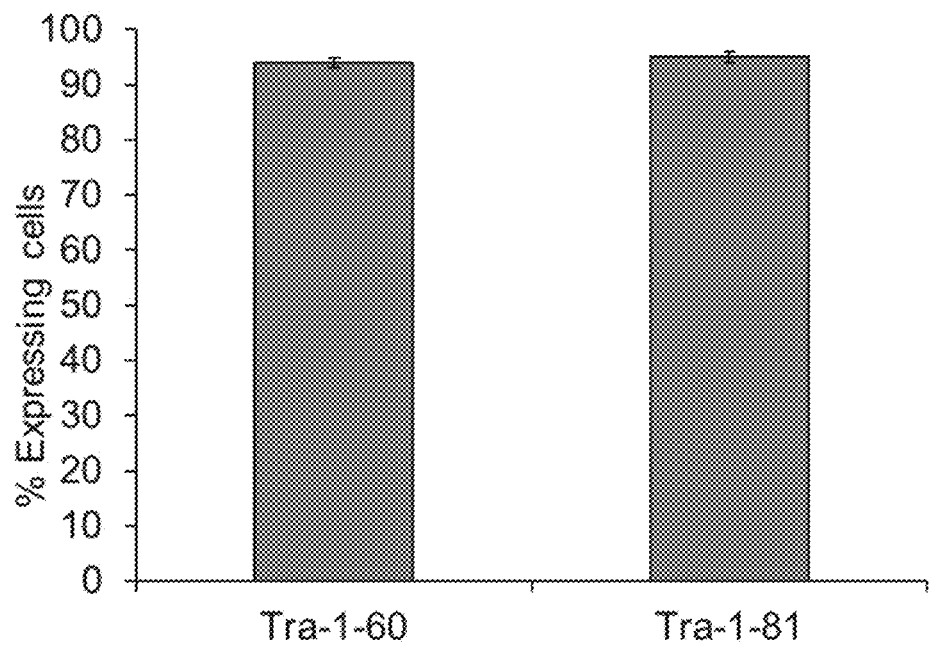
Figure 7H:
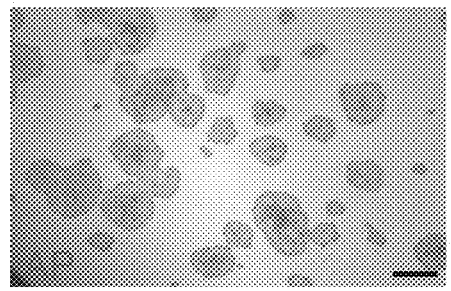

Characterization of HES-1 cells cultured in this system revealed that they formed flat monolayer colonies. The cells within the colonies were tightly packed, had a high ratio of nucleus to cytoplasm, and contained prominent nucleoli (FIG. 7A). HES-1 cells could be propagated on LN111 for at least 10 passages while maintaining a normal karyotype (FIG. 7B), and retaining their pluripotency potential in vitro and in vivo (FIG. 7C-D). RT-PCR analysis showed that they expressed the key pluripotency transcription factors (TFs) Oct4, Nanog, and SOX2 (FIG. 7E), and immunofluorescence staining showed that the majority of the cells expressed Oct4 (FIG. 7F). FACS analysis showed that over 90% of the cells expressed TRA-1-60 and TRA-1-81 (FIG. 7G), and they expressed Alkaline Phosphatase (FIG. 7H). LN111 could likewise support extended undifferentiated propagation of two xeno-free GMP-grade hPSC lines, HADC100 and HADC102, [36] (6 and 8 passages, respectively). These results showed that the LN111-based culture system supported extended self-renewal of hPSCs.

Figure 2A:
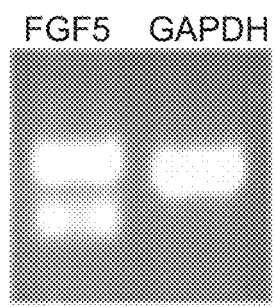
Figure 2C:
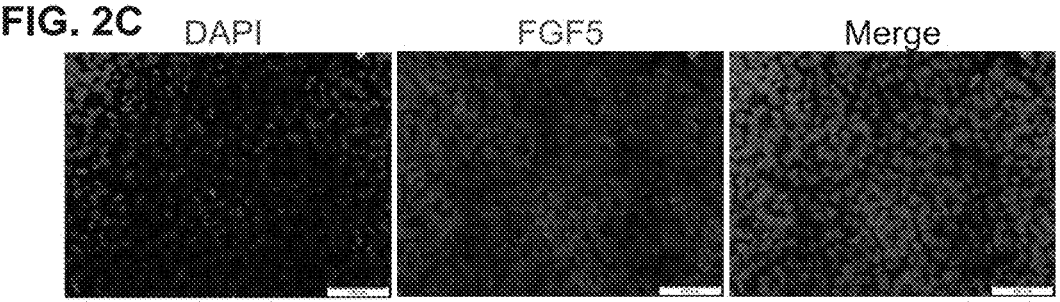
Figure 2E:
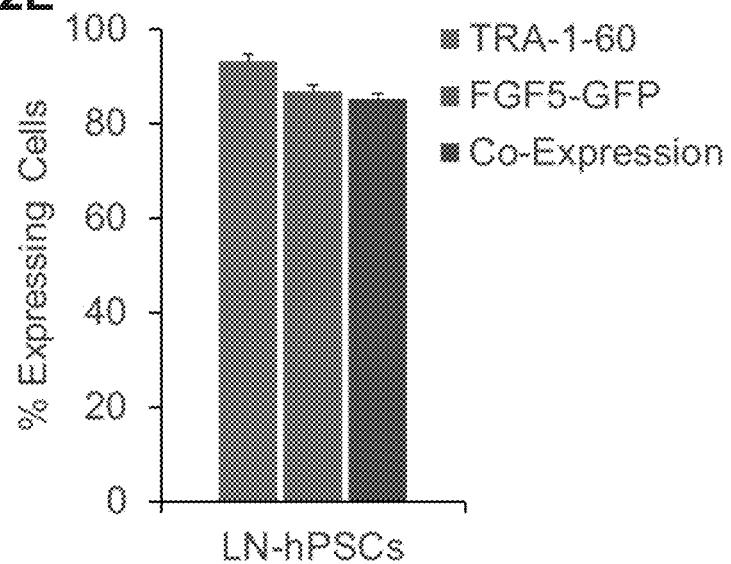
Figure 2F:
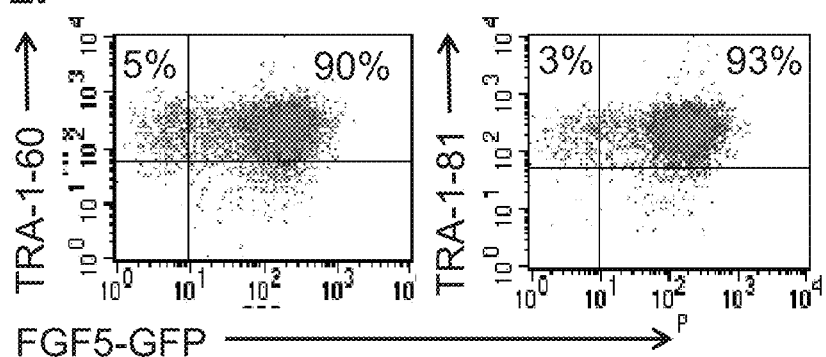
Figure 2G:
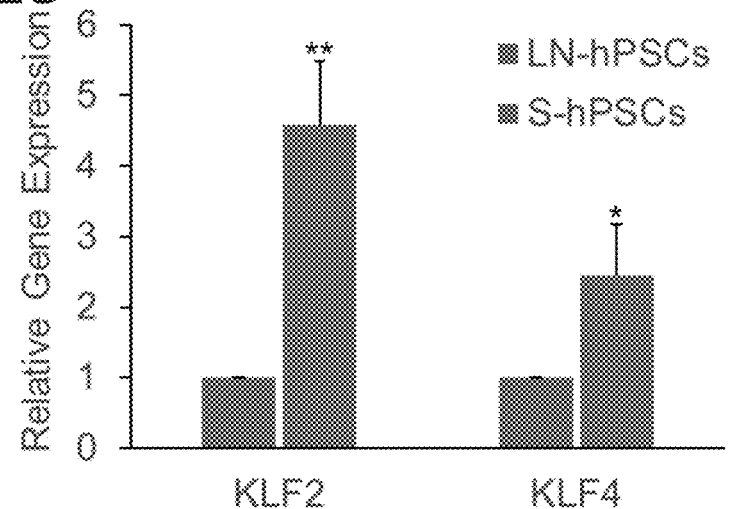

Evaluation of the expression levels of FGF5 in hPSCs cultured on LN111 (LN-hPSCs) by RT-PCR showed that the cells expressed both splice variants of FGF5 (FIG. 2A). Real-Time PCR revealed higher expression of FGF5 in LN-hPSCs compared to feeder-dependent, suspension, or naïve cultures (FIG. 2B). Immunofluorescence staining demonstrated that the majority of cells expressed FGF5 (FIG. 2C), and FACS analyses of the three FGF5-reporter clones confirmed significantly higher percentages of FGF5-GFP expressing cells (86%±2%, 90%±1%, and 79%±3% respectively) in LN-hPSCs compared with hF-hPSCs, S-hPSCs, and N-hPSCs (FIG. 2D). FACS analyses further showed that the majority of reporter LN-hPSCs co-expressed FGF5-GFP with TRA-1-60 and TRA-1-81 (FIGS. 2E-F). These results demonstrated that the LN111-based culture system promoted the self-renewal of undifferentiated hPSC cultures highly enriched for FGF5-expressing cells.

Figure 2H:
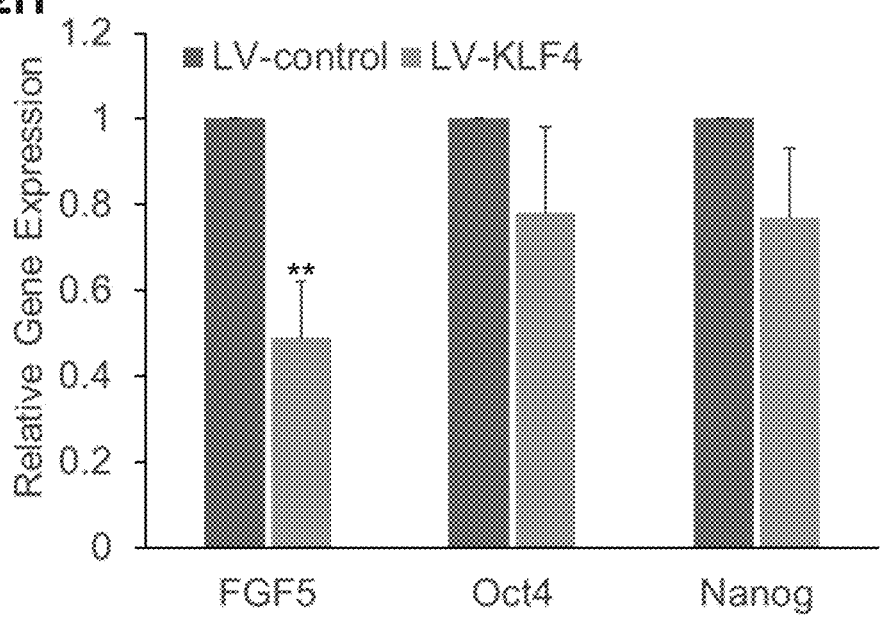

KLF4 negatively regulates FGF5 expression in hPSCs: Next, the present inventors assessed the involvement of KLF2 and KLF4 in the regulation of FGF5 expression in hPSCs. Their expression was analyzed in LN-hPSCs and S-hPSCs. Real-Time PCR analysis showed that KLF2 and KLF4 were expressed at higher levels in S-hPSCs compared to LN-hPSCs (FIG. 2G), in contrast to FGF5 which was expressed at higher levels in LN-hPSCs compared to S-hPSCs (FIG. 2B). To test the effect of KLF4 on FGF5 expression we transiently transfected LN-hPSCs with a plasmid over-expressing KLF4 (LV-KLF4). Real-Time PCR analysis showed that over-expression of KLF4 significantly decreased FGF5 expression levels. It did not affect Oct4 and Nanog expression, confirming that the cells remained pluripotent (FIG. 2H). These results suggested that KLF4 and KLF2 negatively regulate FGF5 expression in hPSCs, and that their different expression levels in various hPSCs may affect FGF5 expression levels.

The transcriptome profile of LN-hPSCs resembles a post-implantation formative-like pluripotency state: To analyze the expression profiles of LN-hPSCs, hF-hPSCs and S-hPSCs, the Human Stem Cell Pluripotency Gene Expression Array [39] was used. A heat map presenting the expression of genes in all hPSC samples revealed two groups of genes. The first group included pluripotency-associated genes which were highly expressed by all samples. This group included the key TFs Oct4, Nanog and SOX2, as well as additional genes such as TDGF1, DNMT3B, LIN28, and PODXL. The second group included lineage-specific genes, that were not expressed, or expressed at low levels, among them CDX2 (trophoblast), NEUROD1, TH and OLIG2 (neuroectoderm), T and WT1 (mesoderm), PECAM1 (endoderm) and DDX4 (PGCs) (FIG. 3A and Table 3). These results were in line with previous studies showing the high expression of pluripotency genes, and mostly absence of lineage-specific genes expression, in various undifferentiated hPSC lines [36, 39]. They confirmed that hPSCs propagated in the three culture systems are undifferentiated and pluripotent.

TABLE 3

| | | HADC100-S | HADC102-S | HES-1-F | HES-1-F | HADC100-LN | HADC102-LN | HES-1-LN | HES-1-LN |
|---|---|---|---|---|---|---|---|---|---|
| POU5F1-Hs00742896_s1 | POU5F1 | 11.89 | 11.33 | 10.55 | 9.37 | 11.69 | 11.76 | 10.74 | 10.65 |
| SOX2-Hs00602736_s1 | SOX2 | 9.34 | 9.95 | 7.40 | 8.38 | 9.55 | 9.37 | 7.85 | 9.94 |
| Nanog*-Hs02387400_g1 | Nanog | 7.32 | 7.05 | 7.23 | 6.25 | 8.58 | 8.38 | 7.59 | 7.54 |
| BRIX-Hs00217848_m1 | BRIX | 9.66 | 8.86 | 8.88 | 7.77 | 9.25 | 9.15 | 9.03 | 8.97 |
| CD9-Hs00233521_m1 | CD9 | 7.94 | 7.28 | 6.93 | 6.48 | 7.86 | 7.64 | 6.35 | 7.46 |
| COMMD3-Hs00201350_m1 | COMMD3 | 13.88 | 14.29 | 16.24 | 14.23 | 15.93 | 14.46 | 14.13 | 14.61 |
| CRABP2-Hs00275636_m1 | CRABP2 | 3.28 | 6.47 | 5.92 | 4.46 | 4.70 | 4.82 | 3.80 | 2.70 |
| DNMT3B-Hs00171876_m1 | DNMT3B | 4.55 | 4.90 | 4.35 | 3.92 | 4.21 | 4.79 | 3.85 | 5.06 |
| EBAF-Hs00745761_s1 | EBAF | 12.64 | 10.04 | 13.84 | 10.30 | 17.44 | 18.24 | 17.06 | 12.47 |
| FGF4-Hs00173564_m1 | FGF4 | 14.03 | 14.74 | 12.98 | 12.18 | 16.08 | 16.30 | 14.06 | 14.16 |
| FGF5-Hs00170454_m1 | FGF5 | 13.73 | 14.69 | 12.44 | 12.50 | 12.82 | 13.15 | 11.27 | 14.16 |
| FOXD3-Hs00255287_s1 | FOXD3 | 12.45 | 10.49 | 12.22 | 11.82 | 13.54 | 11.88 | 11.01 | 10.20 |
| GABRB3-Hs00241459_m1 | GABRB3 | 9.18 | 9.64 | 8.75 | 5.66 | 7.60 | 9.88 | 8.50 | 9.76 |
| GAL-Hs00544355_m1 | GAL | 10.42 | 7.55 | 8.69 | 7.42 | 11.34 | 8.80 | 7.45 | 8.05 |
| GATA6-Hs00232018_m1 | GBX2 | 14.98 | 15.56 | 21.41 | 15.83 | 21.93 | 17.90 | 16.10 | 18.03 |
| GBX2-Hs00230965_m1 | GDF3 | 12.25 | 10.50 | 9.92 | 8.88 | 13.61 | 12.29 | 10.56 | 11.53 |
| GDF3-Hs00220998_m1 | GRB7 | 8.88 | 9.13 | 9.97 | 8.23 | 9.31 | 9.83 | 9.01 | 8.30 |
| GRB7-Hs00917999_g1 | IFITM1 | 4.92 | 4.53 | 4.37 | 3.37 | 6.53 | 6.32 | 5.11 | 4.85 |
| IFITM1-Hs00705137_s1 | IFITM2 | 7.39 | 6.53 | 5.84 | 4.82 | 7.51 | 7.26 | 5.92 | 6.21 |
| IFITM2-Hs00829485_sH | IL6ST | 11.52 | 11.62 | 10.85 | 9.98 | 11.93 | 12.84 | 10.40 | 11.29 |
| IL6ST-Hs00174360_m1 | IMP2 | 7.02 | 7.73 | 7.12 | 6.27 | 7.17 | 7.68 | 6.97 | 6.86 |
| IMP2-Hs00538956_m1 | KIT | 9.30 | 9.81 | 8.87 | 8.49 | 8.96 | 9.48 | 9.24 | 10.26 |
| KIT-Hs00174029_m1 | LEFTB | 11.86 | 9.70 | 11.61 | 9.55 | 16.87 | 16.55 | 14.15 | 12.53 |
| LEFTB-Hs00764128_s1 | LIFR | 16.92 | 13.77 | 21.41 | 20.75 | 17.01 | 22.11 | 21.61 | 20.56 |
| LIN28-Hs00702808_s1 | LIN28 | 4.47 | 4.98 | 4.39 | 3.46 | 3.75 | 4.32 | 3.88 | 3.95 |
| NODAL-Hs00415443_m1 | NODAL | 10.61 | 8.58 | 9.31 | 7.53 | 14.67 | 14.18 | 11.21 | 11.00 |
| NOG-Hs00271352_s1 | NOG | 11.57 | 12.88 | 14.37 | 14.34 | 14.16 | 16.12 | 16.11 | 11.96 |
| NR5A2-Hs00187067_m1 | NR5A2 | 12.44 | 13.31 | 12.30 | 10.72 | 10.67 | 11.48 | 11.38 | 10.94 |
| NR6A1-Hs00265966_m1 | NR6A1 | 7.63 | 5.89 | 7.45 | 5.15 | 6.36 | 7.03 | 5.95 | 6.98 |
| PODXL-Hs00193638_m1 | PODXL | 3.80 | 5.38 | 4.36 | 3.04 | 3.49 | 4.28 | 3.79 | 4.32 |
| PTEN-Hs00829813_s1 | PTEN | 13.80 | 10.83 | 14.05 | 15.09 | 17.62 | 12.90 | 15.02 | 13.65 |
| REST-Hs00194498_m1 | REST | 9.22 | 9.64 | 8.88 | 8.29 | 9.54 | 9.87 | 9.65 | 9.53 |

TABLE 3-continued

|  |  | HADC100-S | HADC102-S | HES-1-F | HES-1-F | HADC100-LN | HADC102-LN | HES-1-LN | HES-1-LN |
|---|---|---|---|---|---|---|---|---|---|
| SEMA3A-Hs00173810_m1 | SEMA3A | 9.67 | 10.23 | 8.46 | 7.72 | 9.15 | 10.05 | 8.58 | 9.37 |
| SERPINA1-Hs00165475_m1 | SERPINA1 | 20.32 | 20.40 | 15.06 | 9.25 | 21.93 | 22.11 | 16.00 | 18.72 |
| SFRP2-Hs00293258_m1 | SFRP2 | 8.06 | 7.94 | 6.68 | 5.74 | 6.91 | 7.24 | 6.55 | 6.55 |
| TDGF1-Hs02339499_g1 | TDGF1 | 5.83 | 5.14 | 5.04 | 3.99 | 6.60 | 5.21 | 4.82 | 5.29 |
| TERT-Hs00162669_m1 | TERT | 12.26 | 12.51 | 12.24 | 11.56 | 10.24 | 11.44 | 10.90 | 12.92 |
| TFCP2L1-Hs00232708_m1 | TFCP2L1 | 11.48 | 10.67 | 10.73 | 8.97 | 13.86 | 13.66 | 11.19 | 12.45 |
| UTF1-Hs00747497_g1 | UTF1 | 12.15 | 8.50 | 10.09 | 7.42 | 11.89 | 11.18 | 10.49 | 11.25 |
| ZFP42-Hs00399279_m1 | Xist | 21.74 | 18.18 | 15.64 | 14.94 | 21.93 | 17.18 | 21.61 | 20.56 |
| LIFR-Hs00158730_m1 | ZFP42 | 5.32 | 6.71 | 5.00 | 4.71 | 5.60 | 6.62 | 5.21 | 5.37 |
| Xist-Hs01079824_m1 | FN1 | 5.09 | 5.18 | 5.80 | 6.10 | 5.42 | 5.87 | 4.40 | 6.55 |
|  | LAMA1 | 10.71 | 9.75 | 10.04 | 10.59 | 8.72 | 10.03 | 9.10 | 11.13 |
| FN1-Hs00277509_m1 | LAMB1 | 6.77 | 7.85 | 7.82 | 6.74 | 7.84 | 8.37 | 7.40 | 8.48 |
| LAMA1-Hs00300550_m1 | LAMC1 | 7.87 | 8.94 | 7.64 | 8.02 | 8.46 | 8.75 | 8.04 | 9.34 |
| LAMB1-Hs00158620_m1 | COL1A1 | 8.13 | 7.32 | 8.57 | 6.53 | 6.43 | 6.55 | 5.40 | 6.37 |
| LAMC1-Hs00267056_m1 | COL2A1 | 13.92 | 15.05 | 13.66 | 13.59 | 13.88 | 12.38 | 12.74 | 14.18 |
| COL1A1-Hs00164004_m1 | CDX2 | 21.74 | 21.76 | 21.41 | 17.85 | 15.82 | 22.11 | 21.61 | 20.56 |
| COL2A1-Hs00156568_m1 | CGB | 14.96 | 14.73 | 13.81 | 12.41 | 13.23 | 13.01 | 14.34 | 13.41 |
|  | GCM1 | 17.62 | 21.76 | 21.41 | 20.75 | 21.93 | 18.58 | 17.05 | 20.56 |
| CDX2-Hs00230919_m1 | KRT1 | 21.74 | 21.76 | 21.41 | 20.75 | 21.93 | 22.11 | 21.61 | 20.56 |
| CGB-Hs00361224_gH | EOMES | 12.67 | 11.47 | 16.41 | 15.41 | 14.34 | 17.67 | 21.61 | 11.08 |
| GCM1-Hs00172692_m1 | ISL1 | 15.11 | 13.50 | 18.33 | 17.13 | 16.06 | 16.54 | 13.78 | 16.54 |
| KRT1-Hs00196158_m1 | OLIG2 | 21.74 | 21.76 | 21.41 | 20.75 | 17.45 | 22.11 | 16.57 | 20.56 |
| EOMES-Hs00172872_m1 | AFP | 13.16 | 21.76 | 21.41 | 20.75 | 21.93 | 22.11 | 21.61 | 20.56 |
|  | SOX17 | 13.65 | 11.77 | 17.18 | 20.75 | 16.70 | 22.11 | 21.61 | 14.14 |
| NES-Hs00707120_s1 | PTF1A | 21.74 | 21.76 | 21.41 | 20.75 | 21.93 | 22.11 | 21.61 | 20.56 |
| NEUROD1-Hs00159598_m1 | FOXA2 | 11.80 | 10.89 | 21.41 | 16.31 | 17.32 | 16.43 | 15.23 | 16.04 |
| PAX6-Hs00240871_m1 | GATA4 | 11.29 | 11.61 | 18.57 | 20.75 | 14.69 | 22.11 | 21.61 | 15.29 |
|  | GATA6 | 13.47 | 11.70 | 16.62 | 17.37 | 18.03 | 17.53 | 15.95 | 20.56 |
| TH-Hs00165941_m1 | TAT | 21.74 | 18.74 | 14.64 | 20.75 | 21.93 | 18.00 | 21.61 | 20.56 |
| SYP-Hs00300531_m1 | PAX4 | 21.74 | 16.67 | 17.93 | 16.69 | 21.93 | 17.19 | 21.61 | 20.56 |
| HLXB9-Hs00232128_m1 | SST | 16.73 | 16.44 | 18.21 | 18.72 | 16.23 | 17.08 | 14.85 | 16.51 |
|  | INS | 21.74 | 21.76 | 21.41 | 20.75 | 21.93 | 22.11 | 21.61 | 19.24 |
| GFAP-Hs00157674_m1 | IPF1 | 20.51 | 21.76 | 21.41 | 20.75 | 21.93 | 22.11 | 21.61 | 20.56 |
| ISL1-Hs00158126_m1 | GCG | 21.74 | 21.76 | 21.41 | 20.75 | 21.93 | 22.11 | 21.61 | 17.08 |
|  | IAPP | 16.67 | 21.76 | 21.41 | 20.75 | 16.29 | 22.11 | 21.61 | 17.60 |
| OLIG2-Hs00377820_m1 | PECAM1 | 21.74 | 17.53 | 16.25 | 16.73 | 21.43 | 22.11 | 17.54 | 20.56 |
|  | CDH5 | 18.64 | 21.76 | 21.41 | 20.75 | 21.93 | 17.07 | 17.07 | 20.56 |
| AFP-Hs00173490_m1 | CD34 | 15.88 | 14.97 | 13.46 | 11.83 | 14.97 | 15.27 | 15.19 | 13.24 |
| SOX17-Hs00751752_s1 | FLT1 | 12.66 | 16.38 | 14.15 | 14.03 | 11.30 | 14.39 | 12.80 | 13.16 |
| PTF1A-Hs00603586_g1 | NES | 11.17 | 9.69 | 11.38 | 10.26 | 10.96 | 10.55 | 10.40 | 10.37 |
| FOXA2-Hs00232764_m1 | NEUROD1 | 18.14 | 21.76 | 21.41 | 20.75 | 21.93 | 22.11 | 21.61 | 20.56 |

TABLE 3-continued

| | | HADC100-S | HADC102-S | HES-1-F | HES-1-F | HADC100-LN | HADC102-LN | HES-1-LN | HES-1-LN |
|---|---|---|---|---|---|---|---|---|---|
| GATA4-Hs00171403_m1 | PAX6 | 11.16 | 12.20 | 16.16 | 10.53 | 8.58 | 16.27 | 15.86 | 9.22 |
| | TH | 21.74 | 21.76 | 19.16 | 20.75 | 21.93 | 22.11 | 21.61 | 19.53 |
| TAT-Hs00356930_m1 | SYP | 16.88 | 14.63 | 15.94 | 14.26 | 15.01 | 15.29 | 14.57 | 15.52 |
| | HLXB9 | 21.74 | 15.37 | 21.41 | 14.09 | 21.93 | 22.11 | 21.61 | 20.56 |
| PAX4-Hs00173014_m1 | GFAP | 21.74 | 15.11 | 13.49 | 11.48 | 16.31 | 13.93 | 14.05 | 13.25 |
| SST-Hs00174949_m1 | T | 18.05 | 17.53 | 19.17 | 20.75 | 18.08 | 20.31 | 21.61 | 20.56 |
| INS-Hs00355773_m1 | WT1 | 18.11 | 16.20 | 16.90 | 20.75 | 21.93 | 22.11 | 21.61 | 11.52 |
| IPF1-Hs00236830_m1 | MYF5 | 21.74 | 16.26 | 16.70 | 20.75 | 16.69 | 17.71 | 18.58 | 16.71 |
| GCG-Hs00174967_m1 | MYOD1 | 21.74 | 21.76 | 21.41 | 20.75 | 21.93 | 22.11 | 21.61 | 18.52 |
| IAPP-Hs00169095_m1 | DES | 10.70 | 10.42 | 6.00 | 7.92 | 12.26 | 10.38 | 11.41 | 7.03 |
| | NPPA | 21.74 | 21.76 | 21.41 | 18.69 | 21.93 | 22.11 | 21.61 | 20.39 |
| PECAM1-Hs00169777_m1 | HBB | 21.74 | 21.76 | 21.41 | 20.75 | 21.93 | 22.11 | 21.61 | 20.56 |
| CDH5-Hs00174344_m1 | HBZ | 14.42 | 21.76 | 21.41 | 16.97 | 17.23 | 22.11 | 16.83 | 11.93 |
| CD34-Hs00156373_m1 | RUNX2 | 14.16 | 14.44 | 14.94 | 13.08 | 14.59 | 13.84 | 14.58 | 14.83 |
| FLT1-Hs00176573_m1 | DDX4 | 16.72 | 21.76 | 16.66 | 20.75 | 21.93 | 22.11 | 21.61 | 20.56 |
| | SYCP3 | 18.46 | 16.05 | 15.67 | 16.99 | 21.93 | 18.04 | 18.58 | 16.07 |
| T-Hs00610080_m1 | | 35.6002 | 40 | 34.7641 | 35.2886 | 36.9656 | 36.1567 | Muscle | |
| WT1-Hs00240913_m1 | | 40 | 40 | 40 | 40 | 40 | 37.9645 | Muscle | |
| MYF5-Hs00271574_m1 | | 28.2656 | 28.9605 | 30.3286 | 24.59 | 29.7955 | 26.4755 | Muscle | |
| MYOD1-Hs00159528_m1 | | 40 | 40 | 40 | 40 | 40 | 39.8345 | Cardiac muscle | |
| DES-Hs00157258_m1 | | 26.0723 | 28.7923 | 27.736 | 28.485 | 27.9527 | 28.0852 | Cardiac muscle | |
| NPPA-Hs00383230_g1 | | 40 | 40 | 40 | 40 | 40 | 40 | Blood | |
| HBB-Hs00747223_g1 | | 40 | 32.6718 | 35.3023 | 40 | 35.2152 | 31.3743 | Blood | |
| HBZ-Hs00744391_s1 | | 31.7309 | 32.4205 | 32.663 | 33.5311 | 32.964 | 34.2699 | Bone (and hESCs-Medeiros et al BMC biotechnology 2009) | |
| RUNX2-Hs00231692_m1 | | 40 | 34.9757 | 40 | 35.2454 | 40 | 40 | PGCs | |
| DDX4-Hs00251859_m1 | | 35.9255 | 36.7174 | 40 | 34.2583 | 36.962 | 35.5071 | PGCs | |
| SYCP3-Hs00538143_m1 | | | | | | | | | |

Figure 3B:
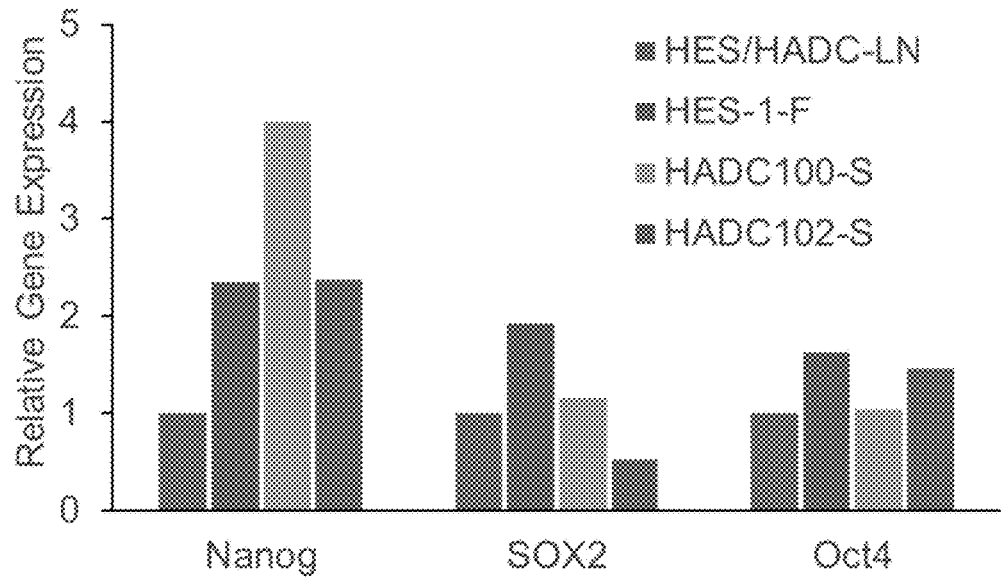
Figure 3C:
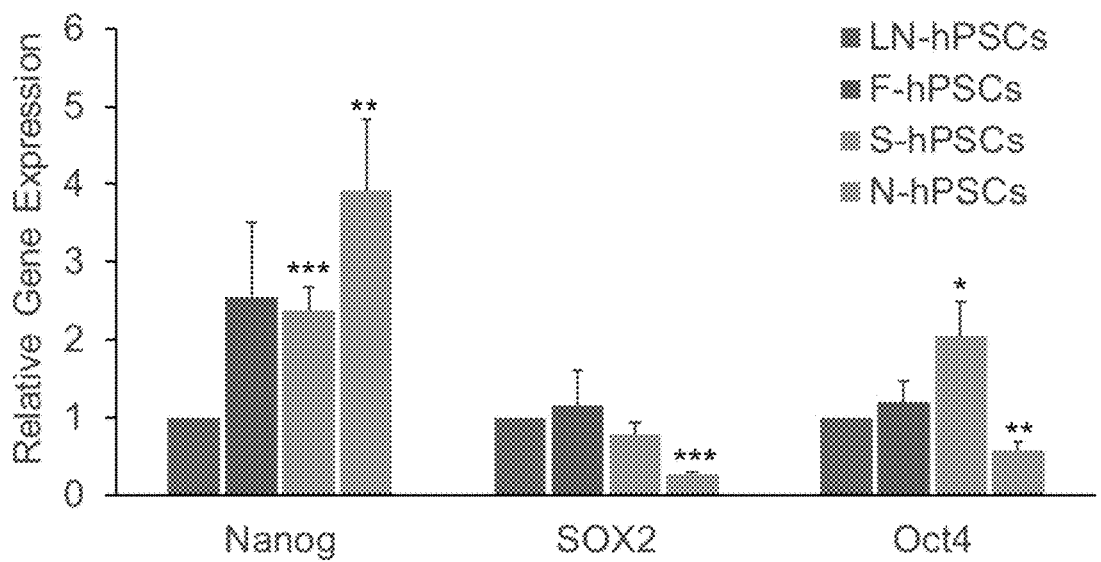
Figure 3D:
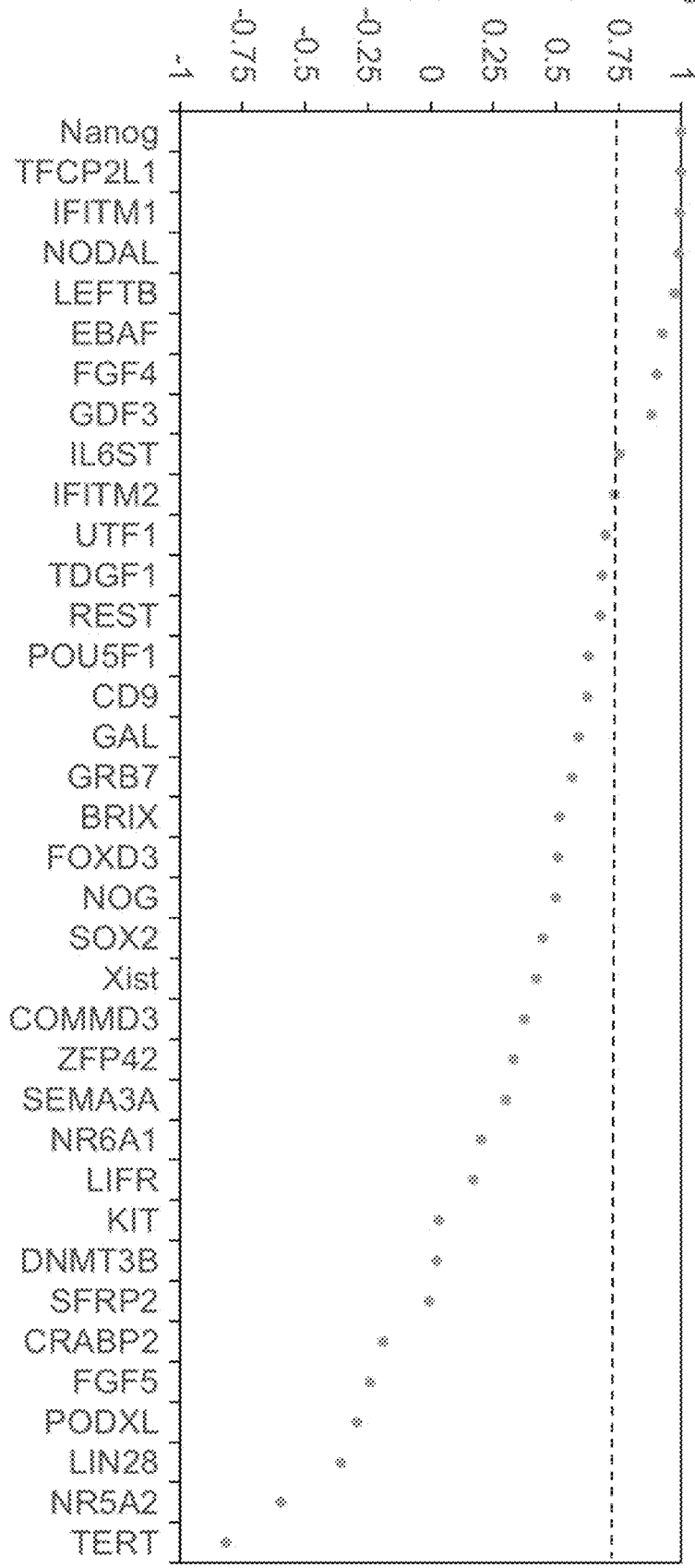

The gene expression array analysis showed that Nanog was expressed at lower levels in LN-hPSCs compared with hF-hPSCs and S-hPSCs, while the relative expression levels of Oct4, and SOX2 were not markedly different between samples (FIG. 3B). Real-Time PCR analysis confirmed a significant lower expression level of Nanog in LN-hPSCs compared to S-hPSCs, F-hPSCs and naïve hPSCs (FIG. 3C). Next, the present inventors sought to identify additional pluripotency-associated genes with an expression pattern similar to Nanog. Pairwise Pearson correlation of the expression of Nanog with all pluripotency genes expressed in the hPSC samples showed a set of genes whose expression was highly correlated with the expression of Nanog, among them TFCPL2L1, NODAL, FGF4, and GDF3 (FIG. 3D). The pairwise correlation also revealed a set of genes whose expression exhibited negative correlation with the expression of Nanog, among them TERT, LIN28, and FGF5 (FIG. 3D). These results were confirmed by Real-Time PCR the decreased expression levels of TFCP2L1, NODAL and GDF3, and the elevated expression levels of TERT in LN-hPSCs compared with S-hPSCs and N-hPSCs (FIGS. 8A-B) as well as the higher expression of LIN28 in LN-hPSCs compared to hF-hPSCs (FIG. 8C).

The global transcriptome of LN-hPSCs (lines HES-1, HES-2, and H7) was analyzed by RNA-sequencing, in comparison to RNA-sequencing of hF-hiPSCs.

Figure 3E:
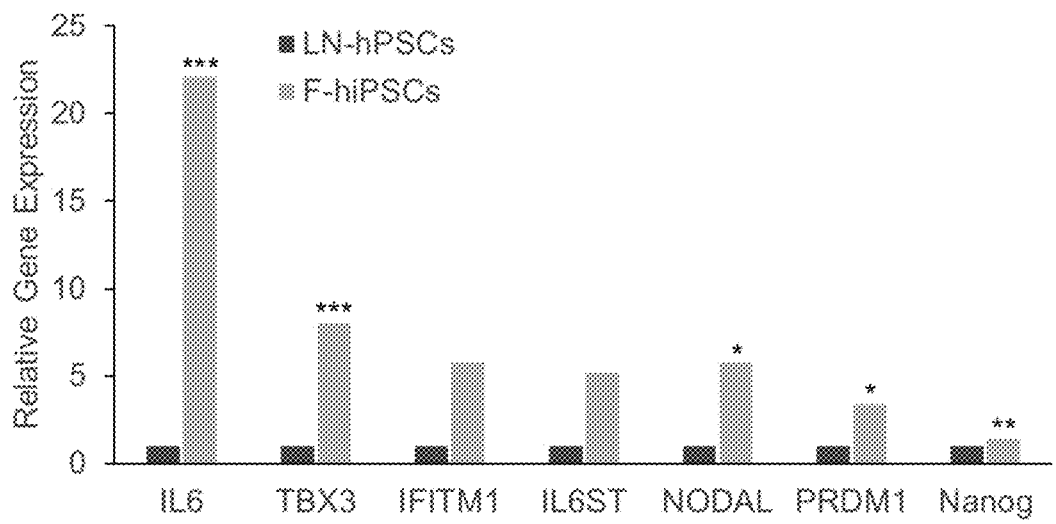
Figure 3F:
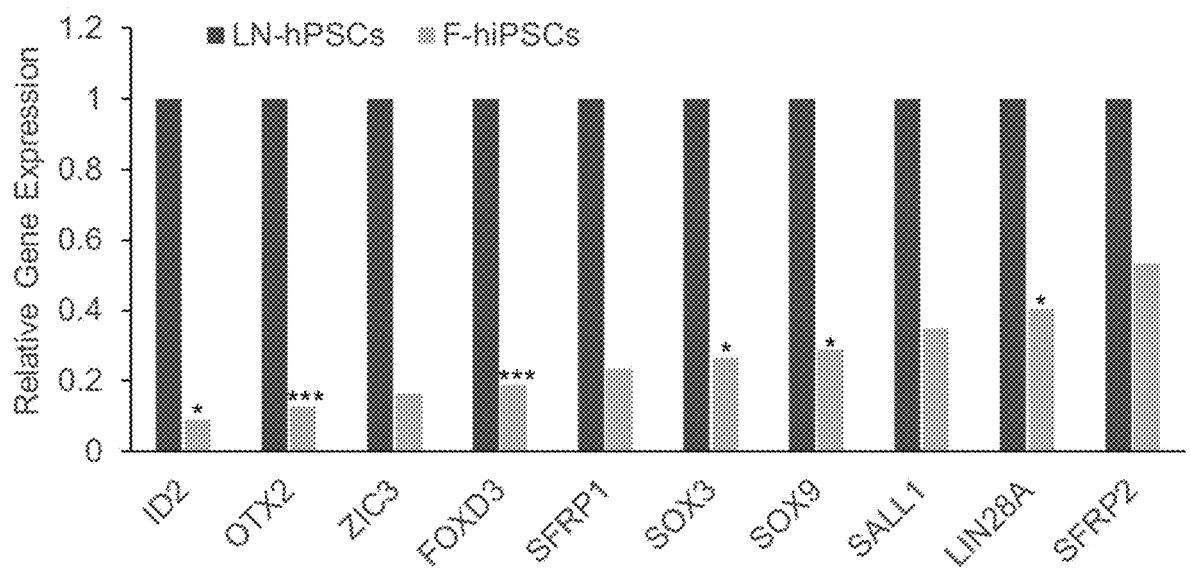

Consistent with the array results, Nanog and additional human naïve pluripotency-associated genes (TBX3, IL6, NODAL, PRDM1) exhibited lower expression in LN-hPSCs compared with F-hiPSCs (FIG. 3E). In contrast, genes associated with primed pluripotency in hPSCs (SALL1, SALL3, SOX3) were expressed at higher levels in LN-hPSCs (FIG. 3F). Interestingly, among the up-regulated genes were OTX2, ZIC3, FOXD3 and LIN28A/B, reported to act as major regulators of the transition from naïve to formative-primed pluripotency in mouse PSCs, by suppressing naïve genes and activating primed genes. It was confirmed by Real-Time PCR that OTX2, ZIC3, SFRP2 and LIN28A were expressed at higher levels in LN-hPSCs compared with hF-hPSCs (FIG. 8C). These analyses indicated that the gene expression profile of LN-hPSCs resembles a more advanced post-implantation formative-like pluripotency state compared with hF-hPSCs, and S-hPSCs.

Figure 4A:
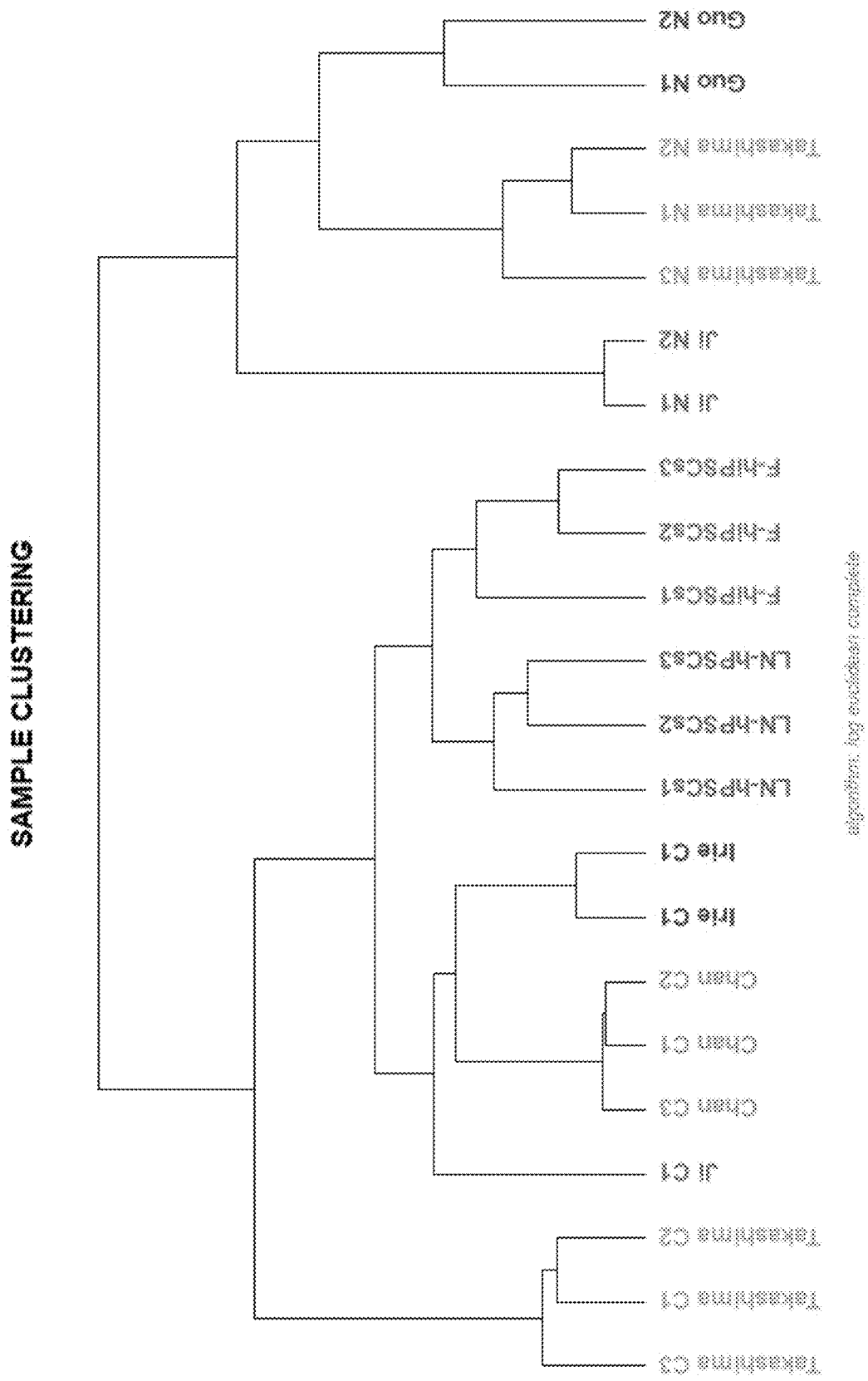
Figure 4B:
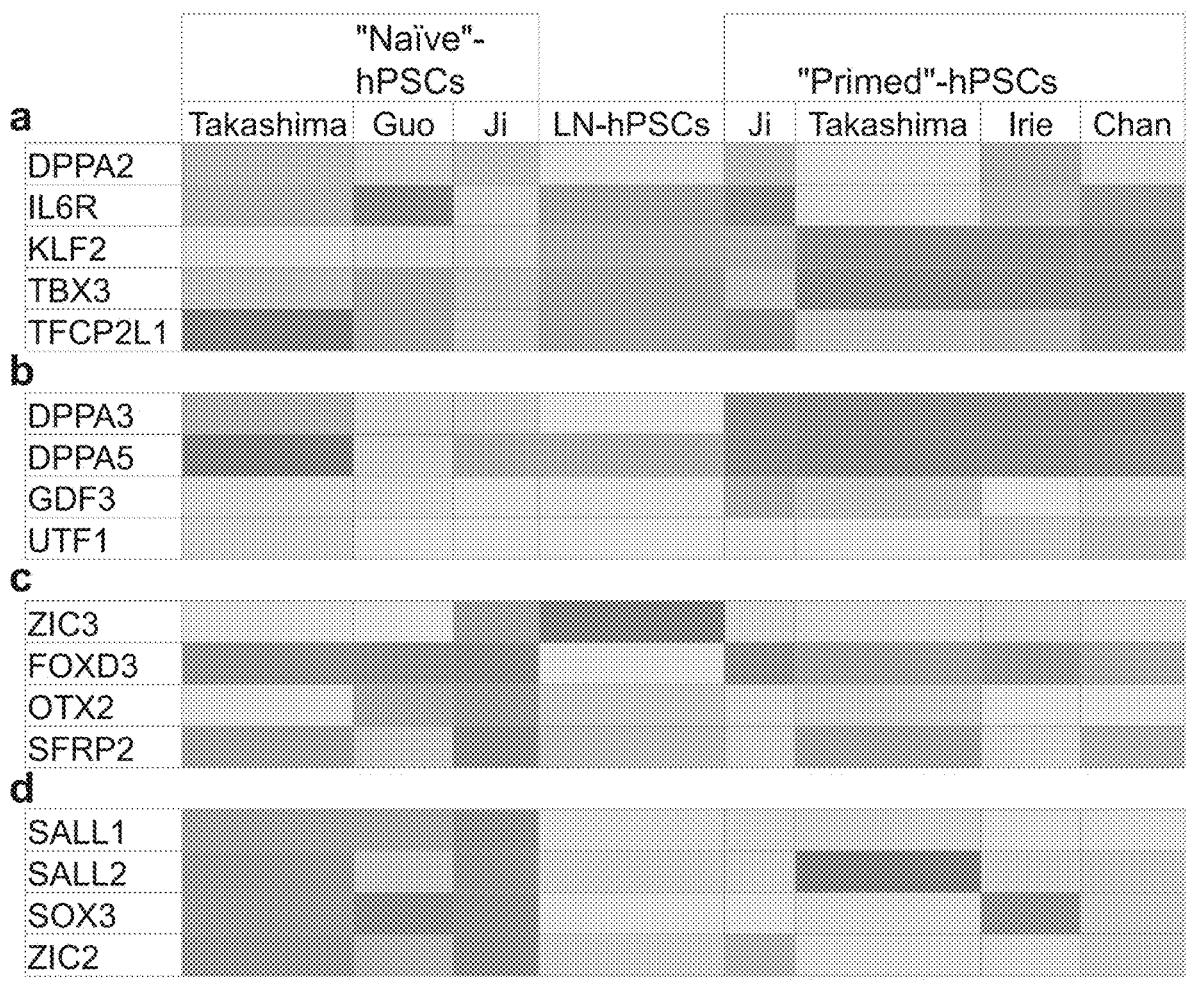

The present inventors next compared the RNA-seq. data of LN-hPSCs with published RNA-seq. data of (i) conventional/primed hPSCs cultured on mouse embryonic fibroblasts (19, 47, 48), or on Matrigel (49), (ii) naïve hPSCs cultured in 5iLFA (48), or in 2tiLGo (19, 42). Clustering by dendogram of the various hPSC samples, based on genes that were differentially expressed between naïve and conventional/primed hPSC samples (16), discriminated the naïve from conventional/primed samples. In accordance with formative-like gene expression profile, LN-hPSCs clustered with the conventional/primed group. Furthermore, within this group, LN-hPSCs clustered as an intermediate subgroup between the conventional and naïve clusters (FIG. 4A). Analysis of the expression of pluripotency-associated genes showed that like conventional/primed hPSCs, LN-hPSCs expressed lower levels of naïve pluripotency genes (FIG. 4Ba), and higher levels of primed-associated pluripotency genes (FIG. 4Bd). For some naïve pluripotency genes LN-hPSCs showed intermediate levels of expression between naïve and conventional/prime hPSCs (FIG. 4Bb). Moreover, pluripotency genes associated with the formative state in the mouse were expressed at higher levels in LN-hPSCs compared with naïve and conventional/primed hPSCs (FIG. 4Bc).

Figure 4C:
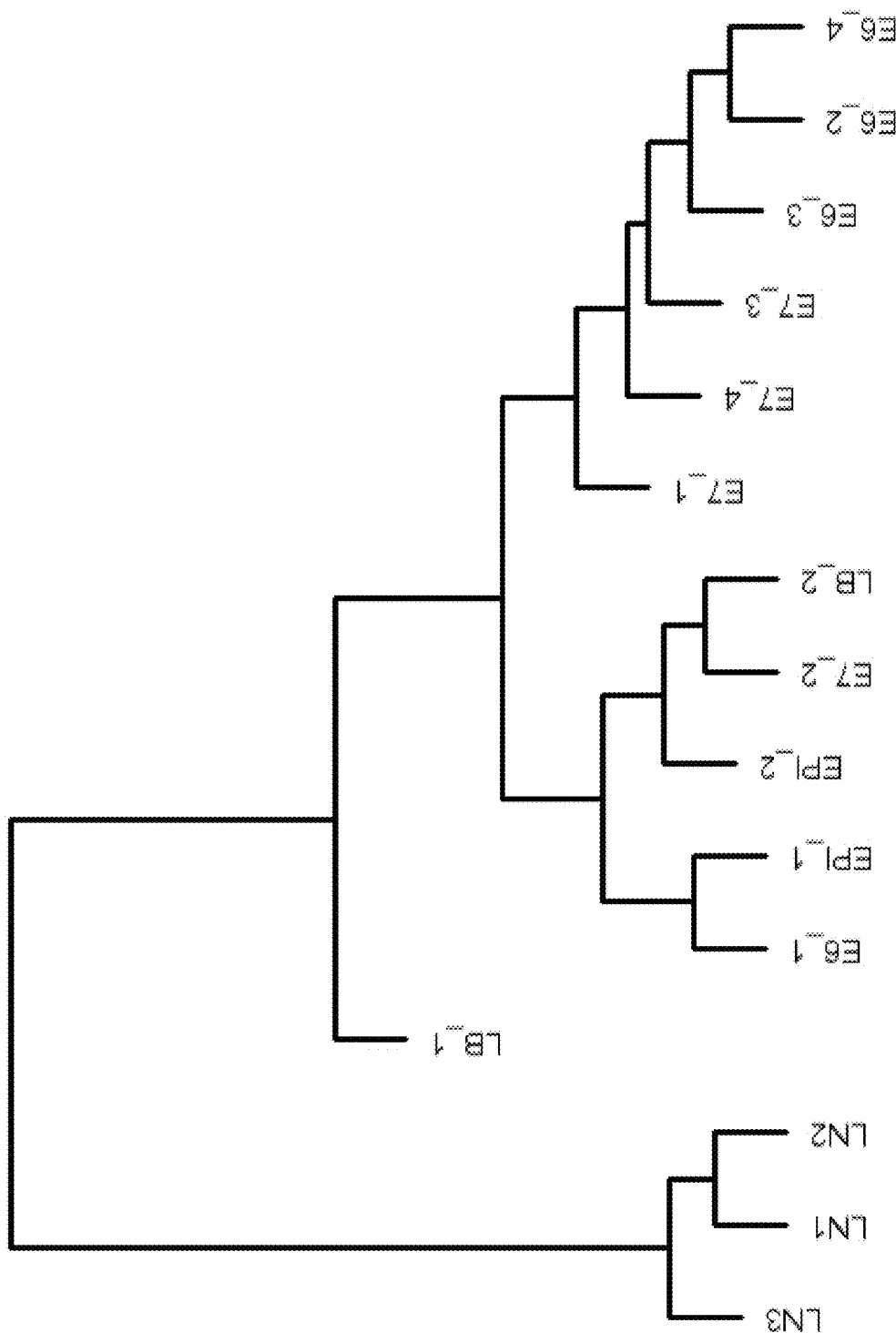
Figure 4D:
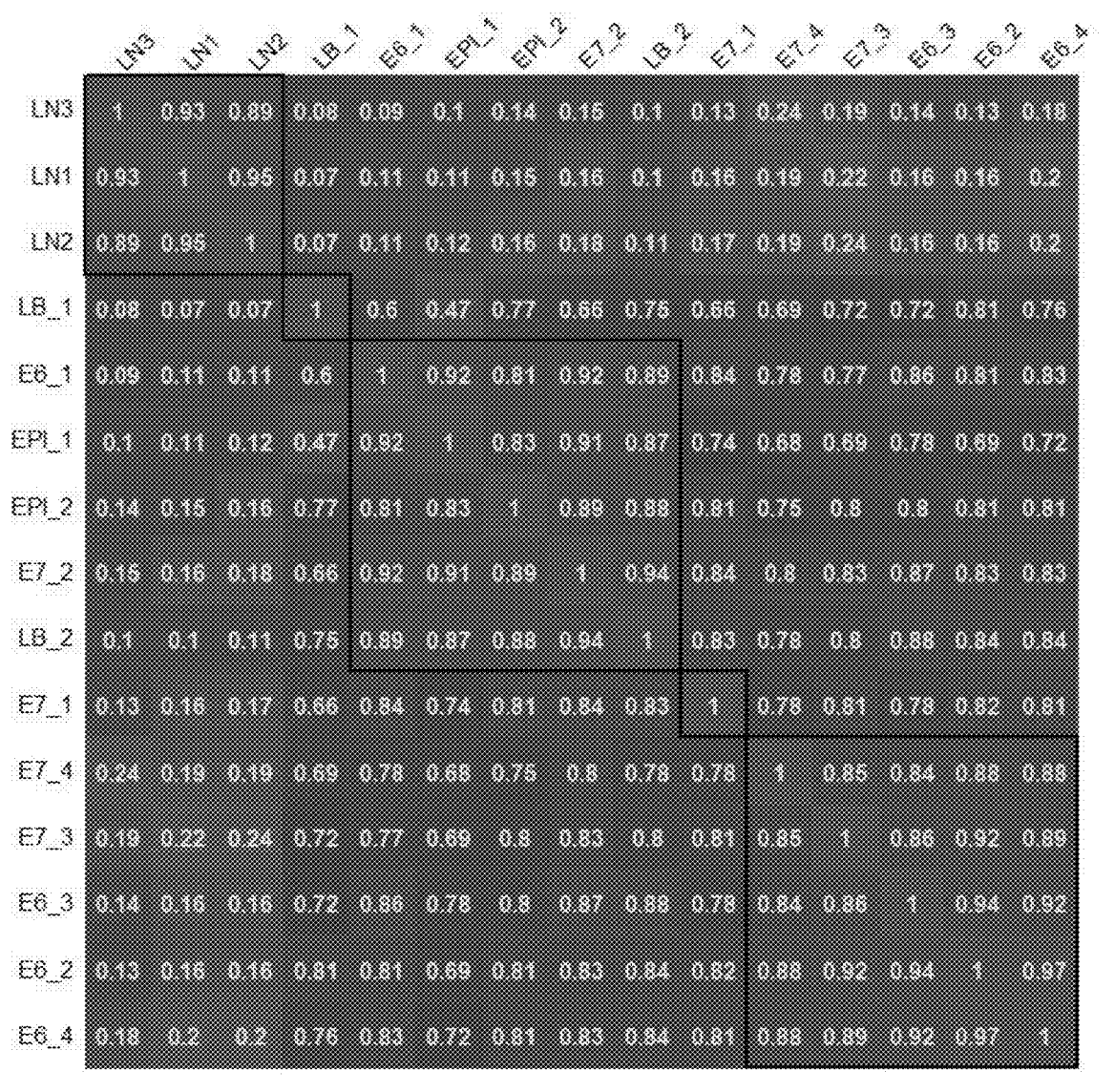

Clustering by dendogram of LN-hPSC and published expression profile of epiblast cells from pre-implantation human embryos ((13-15), (16)) showed that LN-hPSC samples clustered distinctly from the pre-implantation epiblast cells (FIG. 4C). Pearson correlation revealed low correlation between LN-hPSCs and the epiblast cells (0.07-0.24) (FIG. 4D). Taken together, the present gene expression analyses suggest that the profile of LN-hPSCs corresponds to an early post-implantation, formative-like pluripotency state between naïve and conventional/primed hPSCs.

Figure 4E:
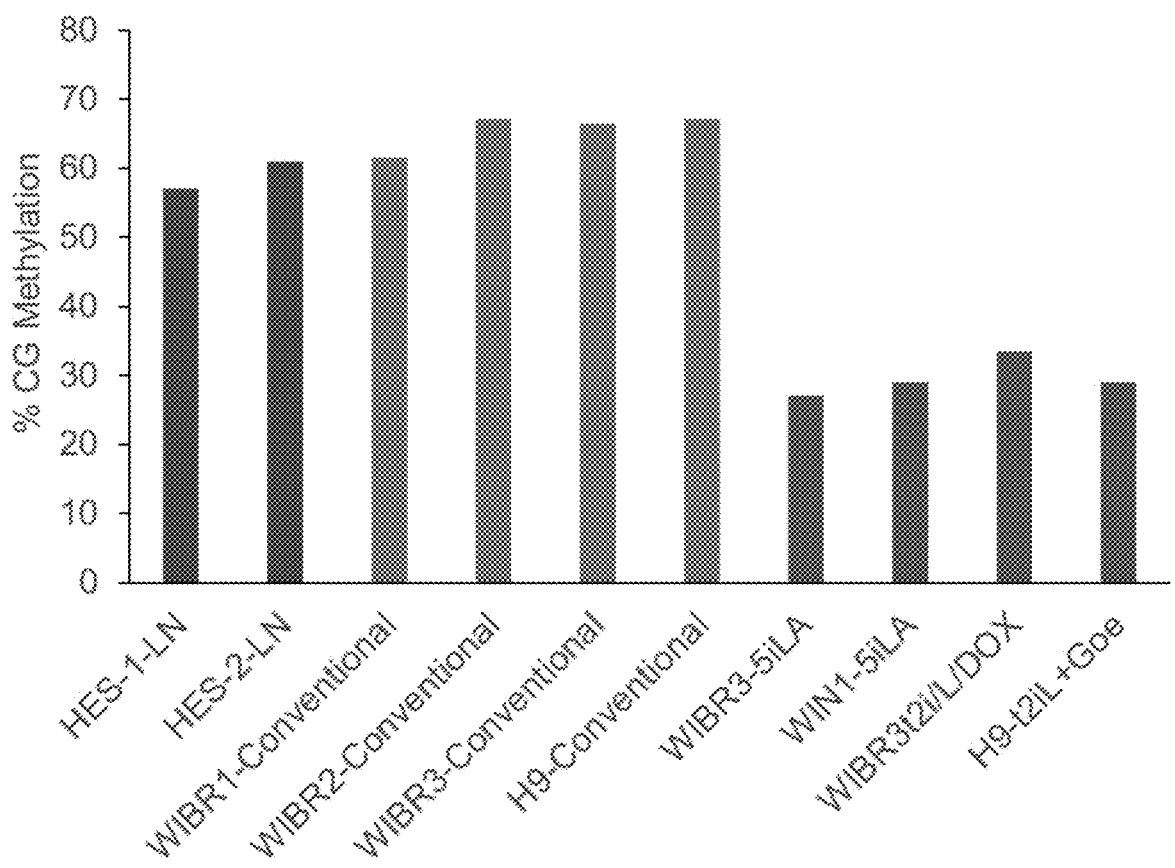

The present inventors further assessed the methylation status of LN-hPSCs using reduced representation bisulphite sequencing (RRBS), and compared it with the published RRBS data of naïve and conventional/primed hPSCs. Genome-wide CpG methylation levels of HES-1 and HES-2 hPSC lines cultured on LN111 were 57 and 61 respectively, in line with published RRBS analyses of conventional/primed hPSCs (61-67%), and in contrast to the lower methylation levels of naïve hPSCs (27-34%) (19, 43, 50) (FIG. 4E). Hence, the global methylation levels of LN-hPSCs are similar to conventional/primed hPSCs, suggesting that they are related to the embryonic post implantation phase.

Figure 5A:
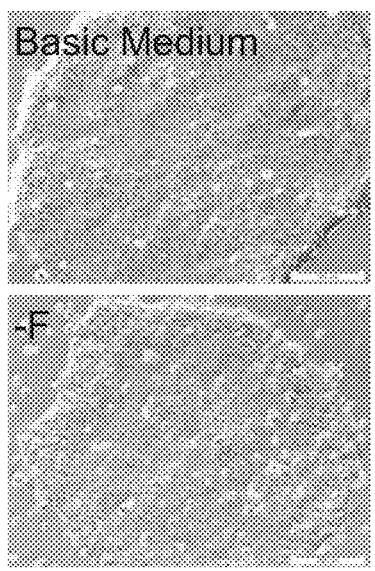
Figure 5B:
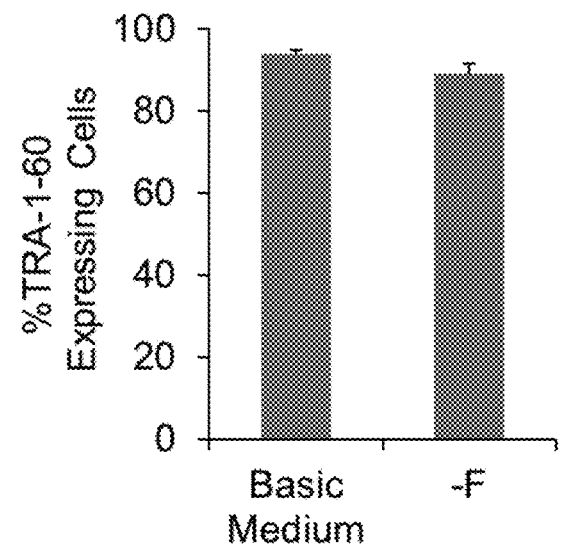
Figure 5C:
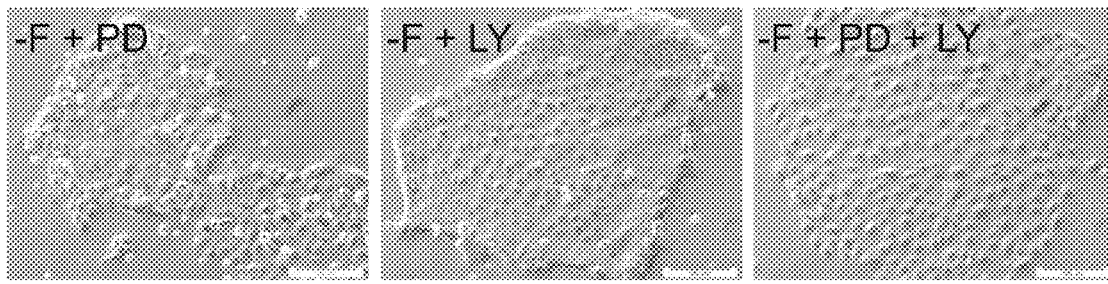
Figure 5C:
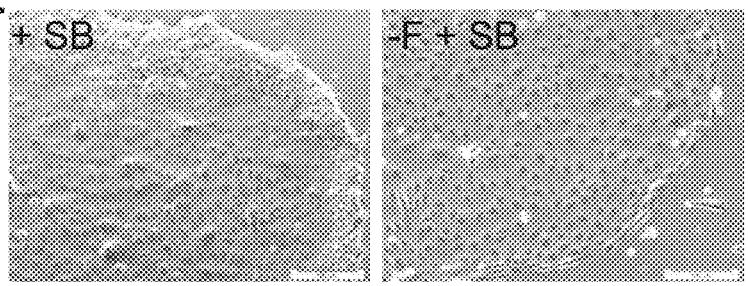
Figure 5F:
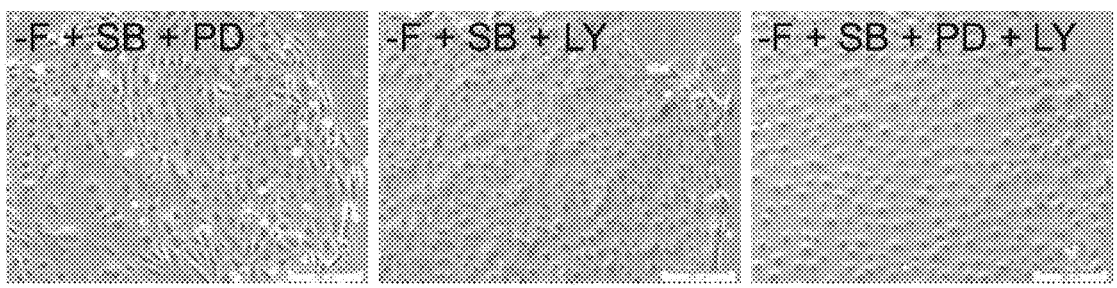
Figure 5G:
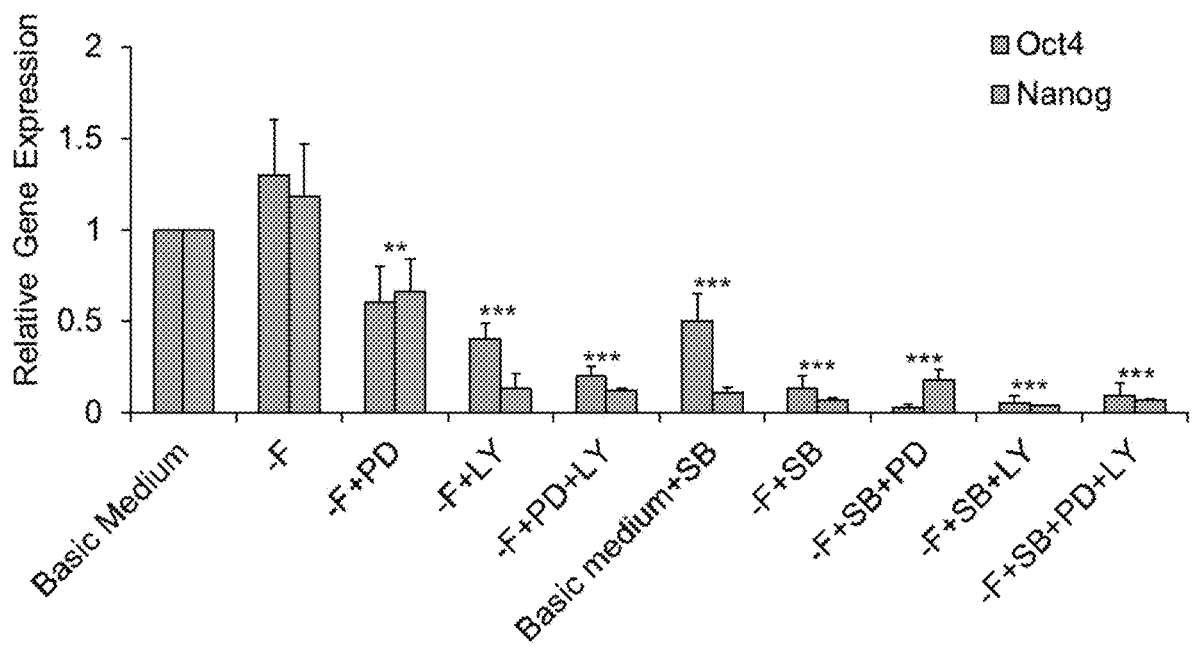

The FGF and TGFβ/activin dependent signaling pathways are required for the self-renewal of LN-hPSCs: To analyze the signaling pathways that maintain the self-renewal of LN-hPSCs, the cells were cultured for two days under standard conditions and then further cultured for five days under various modified conditions. Initially, the effect of FGF2 depletion from the basic medium that does not include factors from the TGFβ super family was explored. Under these culture conditions smaller hPSC colonies developed, however with a typical undifferentiated morphology (FIG. 5A). Moreover, TRA-1-60 as well as Oct4 and Nanog expression levels were similar to cells cultured in the basic medium supplemented with FGF2, suggesting that the cells retained undifferentiated phenotype (FIGS. 5B and 5G). In the absence of FGF2, the MEK/ERK and PI3K/AKT pathways could still be activated via endogenous FGFs, and/or by insulin that is one of the components of the B27 supplement. The present inventors therefore blocked these pathways by culturing the cells in a medium depleted for FGF2, in the presence of PD032590 (PD), a specific MEK inhibitor, or LY294002 (LY), a specific PI3K inhibitor, or both inhibitors. Differentiation was observed in all of these conditions, as evidenced by changes in cell morphology (FIG. 5C), and significant down-regulation of Oct4 and Nanog expression levels (FIG. 5G).

The present inventors next analyzed the role of TGFβ signaling in promoting undifferentiated state of LN-hPSCs. RT-PCR analysis showed that LN-hPSCs, expressed TGFβ and Activin A as well as both Activin type IA and type IB receptors (FIG. 5D). LN-hPSCs cultured for 5 d in a medium containing FGF2 in the presence of SB431542 (SB), a selective inhibitor of TGFβ, and activin receptors [55], appeared differentiated but contained cells with morphological characteristics of undifferentiated stem cells at the colonies' margins (FIG. 5E). Under these conditions Oct4 levels were moderately down-regulated, while Nanog expression, previously reported to be a direct target of SMAD2/3 signaling in hPSCs [56], was drastically reduced (FIG. 5G). When FGF2 was depleted from the medium the colonies including the margins differentiated (FIG. 5E), and Oct4 and Nanog expression levels were strongly reduced (FIG. 5G). Upon culturing of LN-hPSCs without FGF2 supplementation, in the presence of SB and with various combinations of PD and LY, small numbers of colonies with differentiated morphology survived (FIG. 5F), and Oct4 and Nanog levels decreased significantly (FIG. 5G). These results showed that all three signaling pathways are required for the undifferentiated self-renewal of LN-hPSCs. They further showed an autocrine/paracrine effect of FGF and TGFβ/Activin A signaling on the maintenance of undifferentiated LN-hPSCs.

The canonical WNT signaling is inactive in LN-hPSCs, and its induction upregulates primitive streak and mesendodermal markers: Assessment of the canonical WNT signaling activity in LN-hPSCs by immunofluorescence showed staining for β-catenin at the cells' membranes, indicating the presence of β-catenin bound to E-cadherin at adherens junctions. In contrast, naive 5iLFA-hPSCs expressed β-catenin in the cytoplasm (FIG. 6A). RNA-seq. of the expression of various components of the canonical WNT signaling in LN-hPSCs revealed low expression levels of most WNT ligands. Notably, WNT3 that was reported to be essential for mouse PS formation, was not detected. In contrast, higher variable expression levels of WNT receptors (FZD1-10) and their LRP5/6 co-receptors were detected. Of the four β-catenin co-factors, TCF7L1 and TCF7L2 that were shown to act mainly as repressors were expressed at higher levels, compared with TCF7 and LEF1 that act mainly as activators. High expression levels were also detected for the antagonists of the Frizzled receptors SFRP1/2 (FIG. 9A). In contrast to primed PSCs where inactivation of endogenous heterogeneous WNT signaling promotes undifferentiated phenotype [66, 67], culturing of LN-hPSCs in the presence of XAV939, a tankyrase 1/2 inhibitor that stimulates β-catenin degradation [68] did not affect LN-hPSC colonies morphology and the percentages of cells expressing TRA-1-60 (FIGS. 6B-C). Taken together, these results suggested that the canonical WNT signaling is homogenously inactive in LN-hPSCs.

Consistent with the lack of canonical WNT signaling in LN-hPSCs, RNA-seq. data showed low levels or no expression of the early PS markers T, SOX17, and GSC in LN-hPSCs (FIG. 9B). However, the expression of WNT receptors in LN-hPSCs suggested that they may respond to WNT stimulation. To assess whether WNT activation will promote LN-hPSCs progression towards the PS stage, the cells were cultured them for 3 days in the presence of CHIR. Following treatment with CHIR, LN-hPSC colonies appeared differentiated with cells migrating from the colonies (FIG. 6D). Real-Time PCR showed down-regulation of the core pluripotency TFs Oct4, Nanog and SOX2 as well as OTX2, a marker of mouse formative state (REF) (FIG. 6E), concomitant with the up-regulation of the PS and mesendodermal markers T, SOX17, and GSC, while the early ecdodermal marker PAX6 was down-regulated (FIG. 6F). Immunostaining for Oct4, Nanog, and OTX2 showed robust expression in LN-hPSC colonies, while in the CHIR-treated LN-hPSCs, positive staining was mostly observed within the center of the colonies, but not in the migrating cells. In contrast, T-positive cells were not detected in LN-hPSCs but upon WNT activation, T was expressed in the majority of the cells. (FIG. 6G). These results showed that LN-hPSCs respond to WNT stimulation by suppression of core and formative pluripotency TFs and activation of PS markers, suggesting that LN-hPSCs resemble formative earlier post-implantation pluripotent cells poised for PS (primitive streak) formation.

LN-hPSCs are competent to initiate germ cell specification: Finally, the present inventors explored the competence of LN-hPSCs to initiate primordial germ cell (PGC) differentiation. It was hypothesized that in hPSCs, similar to mPSCs, competence for PGC specification requires a formative pluripotency state. The present inventors therefore assessed the ability of LN-hPSCs to initiate PGC differentiation by culturing them in the presence of BMP4, which was shown to have a conserved role in germ cell specification. [70]. BMP4 treatment induced the expression of the early PGC TFs PRDM1 (BLIMP1) and TFAP2C, concomitant with the down-regulation of the formative pluripotency TFs OTX2 and FOXD3 (FIG. 6H). It was shown in the mouse system that the TFs OTX2 and FOXD3 that are upregulated in mEpiLCs restrict initiation of PGC specification, and that their downregulation, probably by BMP-mediated WNT signaling, enables germline differentiation [45, 72]. These results suggested that LN-hPSCs are competent to initiate PGC specification, and that PGC specification, similar to mPSCs, is initiated by down-regulation of the formative TFs.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

References for Example 1

1. Evans, M. J., and Kaufman, M. H. (1981) Establishment in culture of pluripotential cells from mouse embryos. *Nature* 292, 154-156
2. Martin, G. R. (1981) Isolation of a pluripotent cell line from early mouse embryos cultured in medium conditioned by teratocarcinoma stem cells. *Proc Natl Acad Sci USA* 78, 7634-7638
3. Brons, I. G., Smithers, L. E., Trotter, M. W., Rugg-Gunn, P., Sun, B., Chuva de Sousa Lopes, S. M., Howlett, S. K., Clarkson, A., Ahrlund-Richter, L., Pedersen, R. A., and Vallier, L. (2007) Derivation of pluripotent epiblast stem cells from mammalian embryos. *Nature* 448, 191-195
4. Tesar, P. J., Chenoweth, J. G., Brook, F. A., Davies, T. J., Evans, E. P., Mack, D. L., Gardner, R. L., and McKay, R. D. (2007) New cell lines from mouse epiblast share defining features with human embryonic stem cells. *Nature* 448, 196-199
5. Nichols, J., and Smith, A. (2009) Naive and primed pluripotent states. *Cell Stem Cell* 4, 487-492
6. Chenoweth, J. G., McKay, R. D., and Tesar, P. J. (2010) Epiblast stem cells contribute new insight into pluripotency and gastrulation. *Dev Growth Differ* 52, 293-301
7. Smith, A. (2017) Formative pluripotency: the executive phase in a developmental continuum. *Development* 144, 365-373
8. Hayashi, K., Ohta, H., Kurimoto, K., Aramaki, S., and Saitou, M. (2011) Reconstitution of the mouse germ cell specification pathway in culture by pluripotent stem cells. *Cell* 146, 519-532
9. Thomson, J. A., Itskovitz-Eldor, J., Shapiro, S. S., Waknitz, M. A., Swiergiel, J. J., Marshall, V. S., and Jones, J. M. (1998) Embryonic stem cell lines derived from human blastocysts. *Science* 282, 1145-1147
10. Reubinoff, B. E., Pera, M. F., Fong, C. Y., Trounson, A., and Bongso, A. (2000) Embryonic stem cell lines from human blastocysts: somatic differentiation in vitro. *Nat Biotechnol* 18, 399-404
11. Buecker, C., and Geijsen, N. (2010) Different flavors of pluripotency, molecular mechanisms, and practical implications. *Cell Stem Cell* 7, 559-564
12. Reijo Pera, R. A., DeJonge, C., Bossert, N., Yao, M., Hwa Yang, J. Y., Asadi, N. B., Wong, W., Wong, C., and Firpo, M. T. (2009) Gene expression profiles of human inner cell mass cells and embryonic stem cells. *Differentiation* 78, 18-23
13. Yan, L., Yang, M., Guo, H., Yang, L., Wu, J., Li, R., Liu, P., Lian, Y., Zheng, X., Yan, J., Huang, J., Li, M., Wu, X., Wen, L., Lao, K., Qiao, J., and Tang, F. (2013) Single-cell RNA-Seq profiling of human preimplantation embryos and embryonic stem cells. *Nat Struct Mol Biol* 20, 1131-1139
14. Blakeley, P., Fogarty, N. M., del Valle, I., Wamaitha, S. E., Hu, T. X., Elder, K., Snell, P., Christie, L., Robson, P., and Niakan, K. K. (2015) Defining the three cell lineages of the human blastocyst by single-cell RNA-seq. *Development* 142, 3151-3165
15. Petropoulos, S., Edsgard, D., Reinius, B., Deng, Q., Panula, S. P., Codeluppi, S., Plaza Reyes, A., Linnarsson, S., Sandberg, R., and Lanner, F. (2016) Single-Cell RNA- Seq Reveals Lineage and X Chromosome Dynamics in Human Preimplantation Embryos. *Cell* 165, 1012-1026
16. Stirparo, G. G., Boroviak, T., Guo, G., Nichols, J., Smith, A., and Bertone, P. (2018) Integrated analysis of single-cell embryo data yields a unified transcriptome signature for the human pre-implantation epiblast. *Development* 145
17. Nakamura, T., Okamoto, I., Sasaki, K., Yabuta, Y., Iwatani, C., Tsuchiya, H., Seita, Y., Nakamura, S., Yamamoto, T., and Saitou, M. (2016) A developmental coordinate of pluripotency among mice, monkeys and humans. *Nature* 537, 57-62
18. Gafni, O., Weinberger, L., Mansour, A. A., Manor, Y. S., Chomsky, E., Ben-Yosef, D., Kalma, Y., Viukov, S., Maza, I., Zviran, A., Rais, Y., Shipony, Z., Mukamel, Z., Krupalnik, V., Zerbib, M., Geula, S., Caspi, I., Schneir, D., Shwartz, T., Gilad, S., Amann-Zalcenstein, D., Benjamin, S., Amit, I., Tanay, A., Massarwa, R., Novershtern, N., and Hanna, J. H. (2013) Derivation of novel human ground state naive pluripotent stem cells. *Nature*
19. Takashima, Y., Guo, G., Loos, R., Nichols, J., Ficz, G., Krueger, F., Oxley, D., Santos, F., Clarke, J., Mansfield, W., Reik, W., Bertone, P., and Smith, A. (2014) Resetting transcription factor control circuitry toward ground-state pluripotency in human. *Cell* 158, 1254-1269
20. Theunissen, T. W., Powell, B. E., Wang, H., Mitalipova, M., Faddah, D. A., Reddy, J., Fan, Z. P., Maetzel, D., Ganz, K., Shi, L., Lungjangwa, T., Imsoonthornruksa, S., Stelzer, Y., Rangarajan, S., D'Alessio, A., Zhang, J., Gao, Q., Dawlaty, M. M., Young, R. A., Gray, N. S., and Jaenisch, R. (2014) Systematic identification of culture conditions for induction and maintenance of naive human pluripotency. *Cell Stem Cell* 15, 471-487
21. Guo, G., von Meyenn, F., Rostovskaya, M., Clarke, J., Dietmann, S., Baker, D., Sahakyan, A., Myers, S., Bertone, P., Reik, W., Plath, K., and Smith, A. (2017) Epigenetic resetting of human pluripotency. *Development* 144, 2748-2763
22. Huang, K., Maruyama, T., and Fan, G. (2014) The naive state of human pluripotent stem cells: a synthesis of stem cell and preimplantation embryo transcriptome analyses. *Cell Stem Cell* 15, 410-415
23. Zhan, X., Culpepper, A., Reddy, M., Loveless, J., and Goldfarb, M. (1987) Human oncogenes detected by a defined medium culture assay. *Oncogene* 1, 369-376
24. Zhan, X., Bates, B., Hu, X. G., and Goldfarb, M. (1988) The human FGF-5 oncogene encodes a novel protein related to fibroblast growth factors. *Mol Cell Biol* 8, 3487-3495
25. Goldfarb, M., Bates, B., Drucker, B., Hardin, J., and Haub, 0. (1991) Expression and possible functions of the FGF-5 gene. *Ann N Y Acad Sci* 638, 38-52
26. Pelton, T. A., Sharma, S., Schulz, T. C., Rathjen, J., and Rathjen, P. D. (2002) Transient pluripotent cell populations during primitive ectoderm formation: correlation of in vivo and in vitro pluripotent cell development. *J Cell Sci* 115, 329-339
27. Zhong, W., Wang, Q. T., Sun, T., Wang, F., Liu, J., Leach, R., Johnson, A., Puscheck, E. E., and Rappolee, D. A. (2006) FGF ligand family mRNA expression profile for mouse preimplantation embryos, early gestation human placenta, and mouse trophoblast stem cells. *Mol Reprod Dev* 73, 540-550
28. Hebert, J. M., Boyle, M., and Martin, G. R. (1991) mRNA localization studies suggest that murine FGF-5 plays a role in gastrulation. *Development* 112, 407-415
29. Buecker, C., Srinivasan, R., Wu, Z., Cabo, E., Acampora, D., Faial, T., Simeone, A., Tan, M., Swigut, T., and Wysocka, J. (2014) Reorganization of enhancer patterns in transition from naive to primed pluripotency. *Cell Stem Cell* 14, 838-853
30. Ben-Dor, I., Itsykson, P., Goldenberg, D., Galun, E., and Reubinoff, B. E. (2006) Lentiviral vectors harboring a dual-gene system allow high and homogeneous transgene expression in selected polyclonal human embryonic stem cells. *Mol Ther* 14, 255-267
31. Steiner, D., Khaner, H., Cohen, M., Even-Ram, S., Gil, Y., Itsykson, P., Turetsky, T., Idelson, M., Aizenman, E., Ram, R., Berman-Zaken, Y., and Reubinoff, B. (2010) Derivation, propagation and controlled differentiation of human embryonic stem cells in suspension. *Nat Biotechnol* 28, 361-364
32. Ozawa, K., Suzuki, S., Asada, M., Tomooka, Y., Li, A. J., Yoneda, A., Komi, A., and Imamura, T. (1998) An alternatively spliced fibroblast growth factor (FGF)-5 mRNA is abundant in brain and translates into a partial agonist/antagonist for FGF-5 neurotrophic activity. *J Biol Chem* 273, 29262-29271
33. Cohen, M. A., Itsykson, P., and Reubinoff, B. E. (2007) Neural differentiation of human ES cells. *Curr Protoc Cell Biol* Chapter 23, Unit 23 27
34. Ekblom, P., Lonai, P., and Talts, J. F. (2003) Expression and biological role of laminin-1. *Matrix Biol* 22, 35-47
35. Li, S., Edgar, D., Fassler, R., Wadsworth, W., and Yurchenco, P. D. (2003) The role of laminin in embryonic cell polarization and tissue organization. *Dev Cell* 4, 613-624
36. Tannenbaum, S. E., Turetsky, T. T., Singer, O., Aizenman, E., Kirshberg, S., Ilouz, N., Gil, Y., Berman-Zaken, Y., Perlman, T. S., Geva, N., Levy, O., Arbell, D., Simon, A., Ben-Meir, A., Shufaro, Y., Laufer, N., and Reubinoff, B. E. (2012) Derivation of xeno-free and GMP-grade human embryonic stem cells—platforms for future clinical applications. *PLoS One* 7, e35325
37. Jiang, J., Chan, Y. S., Loh, Y. H., Cai, J., Tong, G. Q., Lim, C. A., Robson, P., Zhong, S., and Ng, H. H. (2008) A core Klf circuitry regulates self-renewal of embryonic stem cells. *Nat Cell Biol* 10, 353-360
38. Kaczynski, J., Cook, T., and Urrutia, R. (2003) Sp1- and Kruppel-like transcription factors. *Genome Biol* 4, 206
39. Adewumi, O., Aflatoonian, B., Ahrlund-Richter, L., Amit, M., Andrews, P. W., Beighton, G., Bello, P. A., Benvenisty, N., Berry, L. S., Bevan, S., Blum, B., Brooking, J., Chen, K. G., Choo, A. B., Churchill, G. A., Corbel, M., Damjanov, I., Draper, J. S., Dvorak, P., Emanuelsson, K., Fleck, R. A., Ford, A., Gertow, K., Gertsenstein, M., Gokhale, P. J., Hamilton, R. S., Hampl, A., Healy, L. E., Hovatta, O., Hyllner, J., Imreh, M. P., Itskovitz-Eldor, J., Jackson, J., Johnson, J. L., Jones, M., Kee, K., King, B. L., Knowles, B. B., *Lako*, M., Lebrin, F., Mallon, B. S., Manning, D., Mayshar, Y., McKay, R. D., Michalska, A. E., Mikkola, M., Mileikovsky, M., Minger, S. L., Moore, H. D., Mummery, C. L., Nagy, A., Nakatsuji, N., O'Brien, C. M., Oh, S. K., Olsson, C., Otonkoski, T., Park, K. Y., Passier, R., Patel, H., Patel, M., Pedersen, R., Pera, M. F., Piekarczyk, M. S., Pera, R. A., Reubinoff, B. E., Robins, A. J., Rossant, J., Rugg-Gunn, P., Schulz, T. C., Semb, H., Sherrer, E. S., Siemen, H., Stacey, G. N., Stojkovic, M., Suemori, H., Szatkiewicz, J., Turetsky, T., Tuuri, T., van den Brink, S., Vintersten, K., Vuoristo, S., Ward, D., Weaver, T. A., Young, L. A., and Zhang, W. (2007)

Characterization of human embryonic stem cell lines by the International Stem Cell Initiative. *Nat Biotechnol* 25, 803-816

40. Boroviak, T., Loos, R., Lombard, P., Okahara, J., Behr, R., Sasaki, E., Nichols, J., Smith, A., and Bertone, P. (2015) Lineage-Specific Profiling Delineates the Emergence and Progression of Naive Pluripotency in Mammalian Embryogenesis. *Dev Cell* 35, 366-382

41. Mitsui, K., Tokuzawa, Y., Itoh, H., Segawa, K., Murakami, M., Takahashi, K., Maruyama, M., Maeda, M., and Yamanaka, S. (2003) The homeoprotein Nanog is required for maintenance of pluripotency in mouse epiblast and ES cells. *Cell* 113, 631-642

42. Guo, G., von Meyenn, F., Santos, F., Chen, Y., Reik, W., Bertone, P., Smith, A., and Nichols, J. (2016) Naive Pluripotent Stem Cells Derived Directly from Isolated Cells of the Human Inner Cell Mass. *Stem Cell Reports* 6, 437-446

43. Pastor, W. A., Chen, D., Liu, W., Kim, R., Sahakyan, A., Lukianchikov, A., Plath, K., Jacobsen, S. E., and Clark, A. T. (2016) Naive Human Pluripotent Cells Feature a Methylation Landscape Devoid of Blastocyst or Germline Memory. *Cell Stem Cell* 18, 323-329

44. Zhang, J., Ratanasirintrawoot, S., Chandrasekaran, S., Wu, Z., Ficarro, S. B., Yu, C., Ross, C. A., Cacchiarelli, D., Xia, Q., Seligson, M., Shinoda, G., Xie, W., Cahan, P., Wang, L., Ng, S. C., Tintara, S., Trapnell, C., Onder, T., Loh, Y. H., Mikkelsen, T., Sliz, P., Teitell, M. A., Asara, J. M., Marto, J. A., Li, H., Collins, J. J., and Daley, G. Q. (2016) LIN28 Regulates Stem Cell Metabolism and Conversion to Primed Pluripotency. *Cell Stem Cell* 19, 66-80

45. Respuela, P., Nikolic, M., Tan, M., Frommolt, P., Zhao, Y., Wysocka, J., and Rada-Iglesias, A. (2016) Foxd3 Promotes Exit from Naive Pluripotency through Enhancer Decommissioning and Inhibits Germline Specification. *Cell Stem Cell* 18, 118-133

46. Parisi, S., Passaro, F., Russo, L., Musto, A., Navarra, A., Romano, S., Petrosino, G., and Russo, T. (2017) Lin28 is induced in primed embryonic stem cells and regulates let-7-independent events. *FASEB J* 31, 1046-1058

47. Irie, N., Weinberger, L., Tang, W. W., Kobayashi, T., Viukov, S., Manor, Y. S., Dietmann, S., Hanna, J. H., and Surani, M. A. (2015) SOX17 is a critical specifier of human primordial germ cell fate. *Cell* 160, 253-268

48. Ji, X., Dadon, D. B., Powell, B. E., Fan, Z. P., Borges-Rivera, D., Shachar, S., Weintraub, A. S., Hnisz, D., Pegoraro, G., Lee, T. I., Misteli, T., Jaenisch, R., and Young, R. A. (2016) 3D Chromosome Regulatory Landscape of Human Pluripotent Cells. *Cell Stem Cell* 18, 262-275

49. Chan, Y. S., Goke, J., Ng, J. H., Lu, X., Gonzales, K. A., Tan, C. P., Tng, W. Q., Hong, Z. Z., Lim, Y. S., and Ng, H. H. (2013) Induction of a human pluripotent state with distinct regulatory circuitry that resembles preimplantation epiblast. *Cell Stem Cell* 13, 663-675

50. Theunissen, T. W., Friedli, M., He, Y., Planet, E., O'Neil, R. C., Markoulaki, S., Pontis, J., Wang, H., Iouranova, A., Imbeault, M., Duc, J., Cohen, M. A., Wert, K. J., Castanon, R., Zhang, Z., Huang, Y., Nery, J. R., Drotar, J., Lungjangwa, T., Trono, D., Ecker, J. R., and Jaenisch, R. (2016) Molecular Criteria for Defining the Naive Human Pluripotent State. *Cell Stem Cell* 19, 502-515

51. James, D., Levine, A. J., Besser, D., and Hemmati-Brivanlou, A. (2005) TGFbeta/activin/nodal signaling is necessary for the maintenance of pluripotency in human embryonic stem cells. *Development* 132, 1273-1282

52. Xu, R. H., Peck, R. M., Li, D. S., Feng, X., Ludwig, T., and Thomson, J. A. (2005) Basic FGF and suppression of BMP signaling sustain undifferentiated proliferation of human ES cells. *Nat Methods* 2, 185-190

53. Li, J., Wang, G., Wang, C., Zhao, Y., Zhang, H., Tan, Z., Song, Z., Ding, M., and Deng, H. (2007) MEK/ERK signaling contributes to the maintenance of human embryonic stem cell self-renewal. *Differentiation* 75, 299-307

54. Singh, A. M., Reynolds, D., Cliff, T., Ohtsuka, S., Mattheyses, A. L., Sun, Y., Menendez, L., Kulik, M., and Dalton, S. (2012) Signaling network crosstalk in human pluripotent cells: a Smad2/3-regulated switch that controls the balance between self-renewal and differentiation. *Cell Stem Cell* 10, 312-326

55. Inman, G. J., Nicolas, F. J., Callahan, J. F., Harling, J. D., Gaster, L. M., Reith, A. D., Laping, N. J., and Hill, C. S. (2002) SB-431542 is a potent and specific inhibitor of transforming growth factor-beta superfamily type I activin receptor-like kinase (ALK) receptors ALK4, ALK5, and ALK7. *Mol Pharmacol* 62, 65-74

56. Xu, R. H., Sampsell-Barron, T. L., Gu, F., Root, S., Peck, R. M., Pan, G., Yu, J., Antosiewicz-Bourget, J., Tian, S., Stewart, R., and Thomson, J. A. (2008) NANOG is a direct target of TGFbeta/activin-mediated SMAD signaling in human ESCs. *Cell Stem Cell* 3, 196-206

57. Xie, H., Tranguch, S., Jia, X., Zhang, H., Das, S. K., Dey, S. K., Kuo, C. J., and Wang, H. (2008) Inactivation of nuclear Wnt-beta-catenin signaling limits blastocyst competency for implantation. *Development* 135, 717-727

58. ten Berge, D., Kurek, D., Blauwkamp, T., Koole, W., Maas, A., Eroglu, E., Siu, R. K., and Nusse, R. (2011) Embryonic stem cells require Wnt proteins to prevent differentiation to epiblast stem cells. *Nat Cell Biol* 13, 1070-1075

59. Tang, F., Barbacioru, C., Bao, S., Lee, C., Nordman, E., Wang, X., Lao, K., and Surani, M. A. (2010) Tracing the derivation of embryonic stem cells from the inner cell mass by single-cell RNA-Seq analysis. *Cell Stem Cell* 6, 468-478

60. Sumi, T., Oki, S., Kitajima, K., and Meno, C. (2013) Epiblast ground state is controlled by canonical Wnt/beta-catenin signaling in the postimplantation mouse embryo and epiblast stem cells. *PLoS One* 8, e63378

61. Bennett, C. N., Ross, S. E., Longo, K. A., Bajnok, L., Hemati, N., Johnson, K. W., Harrison, S. D., and Mac-Dougald, O. A. (2002) Regulation of Wnt signaling during adipogenesis. *J Biol Chem* 277, 30998-31004

62. Ying, Q. L., Wray, J., Nichols, J., Batlle-Morera, L., Doble, B., Woodgett, J., Cohen, P., and Smith, A. (2008) The ground state of embryonic stem cell self-renewal. *Nature* 453, 519-523

63. Davidson, K. C., Adams, A. M., Goodson, J. M., McDonald, C. E., Potter, J. C., Berndt, J. D., Biechele, T. L., Taylor, R. J., and Moon, R. T. (2012) Wnt/beta-catenin signaling promotes differentiation, not self-renewal, of human embryonic stem cells and is repressed by Oct4. *Proc Natl Acad Sci USA* 109, 4485-4490

64. Kurek, D., Neagu, A., Tastemel, M., Tuysuz, N., Lehmann, J., van de Werken, H. J., Philipsen, S., van der Linden, R., Maas, A., van, I. W. F., Drukker, M., and ten Berge, D. (2015) Endogenous WNT signals mediate BMP-induced and spontaneous differentiation of epiblast stem cells and human embryonic stem cells. *Stem Cell Reports* 4, 114-128

65. Sierra, R. A., Hoverter, N. P., Ramirez, R. N., Vuong, L. M., Mortazavi, A., Merrill, B. J., Waterman, M. L., and Donovan, P. J. (2018) TCF7L1 suppresses primitive streak gene expression to support human embryonic stem cell pluripotency. *Development* 145

66. Sugimoto, M., Kondo, M., Koga, Y., Shiura, H., Ikeda, R., Hirose, M., Ogura, A., Murakami, A., Yoshiki, A., Chuva de Sousa Lopes, S. M., and Abe, K. (2015) A simple and robust method for establishing homogeneous mouse epiblast stem cell lines by wnt inhibition. *Stem Cell Reports* 4, 744-757

67. Taelman, J., Popovic, M., Bialecka, M., Tilleman, L., Warrier, S., Van der Jeught, M., Menten, B., Deforce, D., De Sutter, P., Abe, K., Heindryckx, B., and Chuva de Sousa Lopes, S. M. (2019) WNT inhibition and increased FGF signalling promotes derivation of less heterogeneous primed human embryonic stem cells, compatible with differentiation. *Stem Cells Dev*

68. Huang, S. M., Mishina, Y. M., Liu, S., Cheung, A., Stegmeier, F., Michaud, G. A., Charlat, O., Wiellette, E., Zhang, Y., Wiessner, S., Hild, M., Shi, X., Wilson, C. J., Mickanin, C., Myer, V., Fazal, A., Tomlinson, R., Serluca, F., Shao, W., Cheng, H., Shultz, M., Rau, C., Schirle, M., Schlegl, J., Ghidelli, S., Fawell, S., Lu, C., Curtis, D., Kirschner, M. W., Lengauer, C., Finan, P. M., Tallarico, J. A., Bouwmeester, T., Porter, J. A., Bauer, A., and Cong, F. (2009) Tankyrase inhibition stabilizes axin and antagonizes Wnt signalling. *Nature* 461, 614-620

69. Kee, K., Angeles, V. T., Flores, M., Nguyen, H. N., and Reijo Pera, R. A. (2009) Human DAZL, DAZ and BOULE genes modulate primordial germ-cell and haploid gamete formation. *Nature* 462, 222-225

70. Kobayashi, T., Zhang, H., Tang, W. W. C., Irie, N., Withey, S., Klisch, D., Sybirna, A., Dietmann, S., Contreras, D. A., Webb, R., Allegrucci, C., Alberio, R., and Surani, M. A. (2017) Principles of early human development and germ cell program from conserved model systems. *Nature* 546, 416-420

71. Irie, N., Sybirna, A., and Surani, M. A. (2018) What Can Stem Cell Models Tell Us About Human Germ Cell Biology? *Curr Top Dev Biol* 129, 25-65

72. Zhang, J., Zhang, M., Acampora, D., Vojtek, M., Yuan, D., Simeone, A., and Chambers, I. (2018) OTX2 restricts entry to the mouse germline. *Nature* 562, 595-599

73. Amps, K., Andrews, P. W., Anyfantis, G., Armstrong, L., Avery, S., Baharvand, H., Baker, J., Baker, D., Munoz, M. B., Beil, S., Benvenisty, N., Ben-Yosef, D., Biancotti, J. C., Bosman, A., Brena, R. M., Brison, D., Caisander, G., Camarasa, M. V., Chen, J., Chiao, E., Choi, Y. M., Choo, A. B., Collins, D., Colman, A., Crook, J. M., Daley, G. Q., Dalton, A., De Sousa, P. A., Denning, C., Downie, J., Dvorak, P., Montgomery, K. D., Feki, A., Ford, A., Fox, V., Fraga, A. M., Frumkin, T., Ge, L., Gokhale, P. J., Golan-Lev, T., Gourabi, H., Gropp, M., Lu, G., Hampl, A., Harron, K., Healy, L., Herath, W., Holm, F., Hovatta, O., Hyllner, J., Inamdar, M. S., Irwanto, A. K., Ishii, T., Jaconi, M., Jin, Y., Kimber, S., Kiselev, S., Knowles, B. B., Kopper, O., Kukharenko, V., Kuliev, A., Lagarkova, M. A., Laird, P. W., *Lako*, M., Laslett, A. L., Lavon, N., Lee, D. R., Lee, J. E., Li, C., Lim, L. S., Ludwig, T. E., Ma, Y., Maltby, E., Mateizel, I., Mayshar, Y., Mileikovsky, M., Minger, S. L., Miyazaki, T., Moon, S. Y., Moore, H., Mummery, C., Nagy, A., Nakatsuji, N., Narwani, K., Oh, S. K., Olson, C., Otonkoski, T., Pan, F., Park, I. H., Pells, S., Pera, M. F., Pereira, L. V., Qi, O., Raj, G. S., Reubinoff, B., Robins, A., Robson, P., Rossant, J., Salekdeh, G. H., Schulz, T. C., Sermon, K., Sheik Mohamed, J., Shen, H., Sherrer, E., Sidhu, K., Sivarajah, S., Skottman, H., Spits, C., Stacey, G. N., Strehl, R., Strelchenko, N., Suemori, H., Sun, B., Suuronen, R., Takahashi, K., Tuuri, T., Venu, P., Verlinsky, Y., Ward-van Oostwaard, D., Weisenberger, D. J., Wu, Y., Yamanaka, S., Young, L., and Zhou, Q. (2011) Screening ethnically diverse human embryonic stem cells identifies a chromosome 20 minimal amplicon conferring growth advantage. *Nat Biotechnol* 29, 1132-1144

74. Hough, S. R., Thornton, M., Mason, E., Mar, J. C., Wells, C. A., and Pera, M. F. (2014) Single-cell gene expression profiles define self-renewing, pluripotent, and lineage primed states of human pluripotent stem cells. *Stem Cell Reports* 2, 881-895

75. Nguyen, Q. H., Lukowski, S. W., Chiu, H. S., Senabouth, A., Bruxner, T. J. C., Christ, A. N., Palpant, N. J., and Powell, J. E. (2018) Single-cell RNA-seq of human induced pluripotent stem cells reveals cellular heterogeneity and cell state transitions between subpopulations. *Genome Res* 28, 1053-1066

76. Nakamura, T., Yabuta, Y., Okamoto, I., Sasaki, K., Iwatani, C., Tsuchiya, H., and Saitou, M. (2016) Single-cell transcriptome of early embryos and cultured embryonic stem cells of cynomolgus monkeys. *Sci Data* 4, 170067

77. Mohammed, H., Hernando-Herraez, I., Savino, A., Scialdone, A., Macaulay, I., Mulas, C., Chandra, T., Voet, T., Dean, W., Nichols, J., Marioni, J. C., and Reik, W. (2017) Single-Cell Landscape of Transcriptional Heterogeneity and Cell Fate Decisions during Mouse Early Gastrulation. *Cell Rep* 20, 1215-1228

78. Kalkan, T., and Smith, A. (2014) Mapping the route from naive pluripotency to lineage specification. *Philos Trans R Soc Lond B Biol Sci* 369

79. Morgani, S., Nichols, J., and Hadjantonakis, A. K. (2017) The many faces of Pluripotency: in vitro adaptations of a continuum of in vivo states. *BMC Dev Biol* 17, 7

80. Kinoshita, M., and Smith, A. (2018) Pluripotency Deconstructed. *Dev Growth Differ* 60, 44-52

81. Kalkan, T., Olova, N., Roode, M., Mulas, C., Lee, H. J., Nett, I., Marks, H., Walker, R., Stunnenberg, H. G., Lilley, K. S., Nichols, J., Reik, W., Bertone, P., and Smith, A. (2017) Tracking the embryonic stem cell transition from ground state pluripotency. *Development* 144, 1221-1234

82. Timpl, R., Rohde, H., Robey, P. G., Rennard, S. I., Foidart, J. M., and Martin, G. R. (1979) Laminin—a glycoprotein from basement membranes. *J Biol Chem* 254, 9933-9937

83. Kalluri, R. (2003) Basement membranes: structure, assembly and role in tumour angiogenesis. *Nat Rev Cancer* 3, 422-433

84. Xu, C., Inokuma, M. S., Denham, J., Golds, K., Kundu, P., Gold, J. D., and Carpenter, M. K. (2001) Feeder-free growth of undifferentiated human embryonic stem cells. *Nat Biotechnol* 19, 971-974

85. Miyazaki, T., Futaki, S., Hasegawa, K., Kawasaki, M., Sanzen, N., Hayashi, M., Kawase, E., Sekiguchi, K., Nakatsuji, N., and Suemori, H. (2008) Recombinant human laminin isoforms can support the undifferentiated growth of human embryonic stem cells. *Biochem Biophys Res Commun* 375, 27-32

86. Hayashi, Y., Furue, M. K., Okamoto, T., Ohnuma, K., Myoishi, Y., Fukuhara, Y., Abe, T., Sato, J. D., Hata, R., and Asashima, M. (2007) Integrins regulate mouse embryonic stem cell self-renewal. *Stem Cells* 25, 3005-3015

87. Gropp, M., Shilo, V., Vainer, G., Gov, M., Gil, Y., Khaner, H., Matzrafi, L., Idelson, M., Kopolovic, J., Zak, N. B., and Reubinoff, B. E. (2012) Standardization of the teratoma assay for analysis of pluripotency of human ES cells and biosafety of their differentiated progeny. *PLoS One* 7, e45532

Example 2

Materials and Methods hPSC lines—hPSC lines used in this study were HES-1 (ES01), HES-2 (E502) (Reubinoff et al., 2000), HAD-C100 (NIH registry #0123), HAD-C 102 (NIH registry #0124) (Tannenbaum et al., 2012), H7 (WA07, NIH registry #0061) (Thomson et al., 1998).

hPSC culture—Conventional/primed hPSCs were cultured on Mitomycin C-treated C57BL/6 mouse embryonic fibroblasts (MTI-GlobalStem) (32,000 fibroblasts per cm$^2$), in a medium composed of DMEM/F12, 20% KSR, lx non-essential amino acids, 0.1 mM 2-mercaptoethanol, 2 mM L-glutamine, 50 units/ml penicillin, 50 µg/ml streptomycin (all from Invitrogen, Carlsbad, Calif., USA), and supplemented daily with 10 ng/ml FGF2 (Peprotech). Cells were passaged every 5-6 days using 1.5 mg/ml collagenase type IV (Invitrogen).

hPSCs were cultured on human foreskin feeders in serum-free medium as described (Ben-Dor et al., 2006; Gropp et al., 2012).

hPSC culturing under naïve conditions was performed using the 5iLFA protocol (Theunissen et al., 2014).

LN-hPSCs were cultured on mouse LN111, 3-D Culture Matrix Laminin I (CULTREX, TREVIGEN, #3446-005-01, Gaithersburg, Md., USA). 0.175 ml diluted LN111 (1:14 to a coating concentration of 0.43 mg/ml) was used to coat a well of a 6-well culture dish, leaving a margin of 2-3 mm at the well edge (a final concentration of ~8 microgram/cm$^2$). The coated dishes were incubated from 4 hours to 4 days, at 37° C., and washed with PBS before use. LN-hPSCs were cultured in a medium composed of DMEM/F12, B27 supplement (1:50), N2 supplement (1:100), 2 mM L-glutamine, 50 units/ml penicillin, 50 µg/ml streptomycin (all from Invitrogen), and supplemented daily with 20 ng/ml FGF2 (Peprotech). Cells were passaged every 5-6 days using 1.5 mg/ml collagenase type IV (Invitrogen). 5 µM ROCK inhibitor (Y-27632, Peprotech) was added for the first day after passaging.

hPSCs were cultured on human recombinant LN521 (BIOLAMINA, Sundbyberg, Sweden). Coating of culture dishes with hrLN521 was performed according to the manufacturer's instructions (Coating concentration ~0.45 microgram/cm$^2$). Cells were cultured in the same medium used for culturing LN-hPSCs, and passaged with collagenase type IV.

All hPSCs were maintained in 5% $CO_2$, 5% 02 incubator.

Signaling pathways analysis-hPSCs were cultured on LN111 for 2 days in complete medium, and then for additional 3-5 days in a medium+/−FGF2 in the presence of the following small molecules: PD032590 1 µM (Peprotech), LY294002 10 µM, SB431542 10 µM, CHIR99021 3 µM (all from Cayman Chemical, Michigan, USA), XAV939 2.5 µM (Peprotech), BMP4 50 ng/ml (Biogems-Peprotech).

WNT signaling pathways analysis—LN-hPSCs, primed hPSCs, and hPSCs cultured on LN521, were cultured for 2-3 days in complete medium, and then for additional 2-3 days in a medium containing CHIR99021 3 µM.

Immunofluorescence staining—hPSC colonies were fixed with 4% paraformaldehyde for 20 min at RT, permeabilized and blocked with 0.2% Triton X100 (Sigma-Aldrich), 5% normal goat/donkey serum (Biological Industries, Beit Haemek, Israel) in PBS for 45 min, and incubated with the following primary antibodies: mouse anti-human Oct4 (1:100; sc-5279, Santa Cruz Biotechnology Inc., USA), goat anti-human FGF5 (1:250; AF-237-NA, R&D Systems, Minneapolis, Minn., USA), mouse anti-Nanog (1:500; MABD24, R&D Systems), mouse anti SOX2 (1:50; MAB2018, R&D Systems), goat anti-human OTX2 (1:50; AF-1979, R&D Systems), mouse anti-Blimp1 (1:50; MAB36081, R&D Systems), mouse anti-AP2γ (1;100; sc-12762, Santa Cruz), Rabbit anti Nanos3 (1:150; ab70001 Abcam, Cambridge, Mass., USA), goat anti-Brachyury (1:150; AF-2085, R&D Systems), goat anti-human-SOX17 (1:100; AF1924 R&D), and mouse anti-beta-catenin (1:150; 610154 BD). Following washes with PBS the cells were incubated for 45 min at RT with the corresponding secondary antibodies: Alexa-488 Donkey anti-Rabbit IgG (1:200; Cat. No. A21206, Invitrogen), Alexa 488-conjugated Donkey anti-Mouse IgG (1:200; Cat. No. A21202, Invitrogen), Alexa 488-conjugated Donkey anti-Goat IgG (1:200; Cat. No. A11055 Invitrogen), or Rhodamine Red-X-AffiniPure Donkey Anti-Goat IgG (1:300; Cat. No. 705-295-147, Jackson, West Grove, PN). Stained cells were mounted with Vectashield mounting medium containing DAPI for nuclei counterstaining (Vector Laboratories, CA, USA), and staining was visualized with a Nikon E600 fluorescent microscope.

FACS analysis—FACS analyses for pluripotency marker expression were performed using mouse anti-TRA-1-60 (1:100; mab4360, R&D), and mouse anti-TRA-1-81 (1:100; mab4381, R&D). Staining with respective isotype control antibodies (all from eBiosciences) served as controls. Detection of primary antibodies was performed using FITC-conjugated Polyclonal Goat Anti-Mouse Immunoglobulins (1:100; Dako, Glostrup, Denmark). FACS analyses for neural progenitor marker expression were performed using PE-conjugated-mouse anti-PSA NCAM (1:50; Miltenyi Biotech #130-117-394), and APC-conjugated-mouse anti-A2B5 (1:17; Miltenyi Biotech #130-093-582). FACS analysis was performed on a FACScalibur system (Becton-Dickinson, San Jose, Calif.) using the Cellquest software, or on CytoFLEX cytometer (Beckman Coulter, Atlanta, Ga., USA) using the CytExpert software. A detailed FACS procedure is described elsewhere (Tannenbaum et al., 2012).

RNA isolation and cDNA synthesis—Total RNA was isolated from hPSCs using TRIzol® Reagent (Invitrogen), or using the Quick-RNA microprep kit (Zymo Research, Irvine, Calif., USA). Reverse transcription of full-length cDNA from total RNA was carried out using MMLV reverse transcriptase and random hexamers according to the manufacturer's instructions (Promega, Madison, Wis., USA), or the qScript cDNA synthesis kit (Quanta Biosciences, Beverly, Mass., USA).

RT-PCR analysis—Qualitative expression analysis of selected genes was carried by PCR amplification of cDNA with specific primers. Taq DNA Polymerase (cat. No. M186A, Promega) was used for amplification with the following PCR program: 35 cycles of denaturation at 94° C. for 30 s, annealing at 55° C. for 30 s, and extension at 72° C. for 30-45 s. PCR products were resolved on 1% agarose gels.

Real Time PCR analysis—A relative gene expression quantitation assay was performed by amplification of 25-50 ng cDNA by Real-Time PCR, using ABI Prism 7900HT Sequence Detection System (Applied Biosystems (ABI), Foster City, Calif.), specific TaqMan® Gene Expression Assays and TaqMan® Fast Universal PCR Master Mix (All from Invitrogen). Human β-glucuronidase (gusB) or human β-actin (actB) were used as endogenous gene references.

Data was analyzed using the RQ Manager Software v1.2 (ABI). For global expression analysis of pluripotency and differentiation associated genes, 200 ng cDNA were subjected to Real-time PCR amplification using Applied Biosystems® TaqMan® Human Stem Cell Pluripotency Array (Cat. No. 4385344), and Taqman Gene Expression Master Mix. Array data was analyzed using the DataAssist Software v2.0 (ABI).

RNA-Seq library preparation, sequencing, and analysis-Total RNA was extracted from LN-hPSCs using the miRNeasy Micro Kit (QIAGEN, Hilden, Germany). For quality control of RNA yield and library synthesis products RNA ScreenTape kit, D1000 ScreenTape kit (both from AGILENT TECHNOLOGIES), Qubit® RNA HS Assay kit, and Qubit® DNA HS Assay kit, (Invitrogen) were used for each specific step. mRNA libraries were prepared from 1 μg RNA using KAPA Stranded mRNA-Seq Kit, with mRNA Capture Beads (kapabiosystems, KK8421). Each library was eluted in 20 μl elution buffer, adjusted to 10 mM, then 10 μl (50%) from each sample were collected and pooled into one tube. The multiplex samples pool (1.6 pM including PhiX 1%) was loaded on NextSeq 500/550 High Output v2 kit (75 cycles) cartridge, and loaded on NextSeq 500 System (Illumina, San Diego, Calif., USA), with 75 cycles and Single-Read Sequencing conditions.

RNA unified analysis workflow was adopted for both experimental data and published data. To that end, raw published FASTQ files were downloaded from the European Bioinformatics Institute (EMBL-EBI), or from NCBI Gene Expression Omnibus (GEO), and analyzed in a similar manner to experimental FASTQ files. This approach reduces technical artifacts during sample comparisons. Published RNA-seq. data for conventional/primed hPSCs were obtained from hPSCs cultured on mouse embryonic fibroblasts (ERR590401, ERR590408, ERR590410 (Takashima et al., 2014), GSM1574595, GSM1574595 (Irie et al., 2015), and GSM1707597 (Ji et al., 2016)), or on Matrigel (ERR361241, ERR361243, ERR361245 (Chan et al., 2013)). Published RNA-seq. data for naive hPSCs were obtained from hPSCs cultured in 5iLFA (GSM1707595, GSM1707596 (Ji et al., 2016)), or in 2tiLGo (ERR590398, ERR590399, ERR590400 (Takashima et al., 2014), ERS1059992, ERS1059993 (Guo et al., 2016)). Quality control measures were applied to all FASTQ files, trimming low quality bases, residual adapters and filtering out short reads. These measures were performed with Trim_Galore v0.4.1 wrapper tool. File assessment before and after quality control was performed with FastQC v0.11.5. Reads were aligned to the transcriptome (HSA GRCh38) using Salmon v0.13.1, a tool for fast and bias-aware quantification of transcript expression (Patro et al., 2017). Differential gene expression was explored with DESeq2, (Love et al., 2014). Principle Component Analysis (PCA), heatmaps and clustering were performed with native R functions, ComplexHeatmap (Gu et al., 2016), dendextend (Galili, 2015) and custom R scripts. PCA loading vectors were exploited to extract component specific genes.

Reduced representation bisulfite sequencing (RRBS) library preparation, sequencing, and analysis—Genomic DNA was extracted from LN-hPSCs by cell lysis, followed by treatment with Proteinase K, phenol:chloroform extraction, and ethanol precipitation. Following DNA digestion with MspI, RRBS library was prepared as described (Boyle et al., 2012). Bisulfite conversion of RRBS library was performed using the EpiTect DNA Bisulfite Kit (Qiagen GmbH), and 100 bp paired-end sequencing was carried out using the HighSeq 2500 (Illumina). Quality control was applied to FASTQ files using Trim_Galore with rrbs option and FastQC all as described above. Alignment to the human genome assembly GRCh38 was performed with Bismark—Bisulfite Mapper and Methylation Caller v0.20.1. Bismark Alignment was followed by Bismark methylation extractor, coverge2cytosine utility and a final custom script to prepare files for the next step. Methylation percentage was calculated per each tile per each sample limited to tiles exhibiting minimal coverage of 6. Mean Methylation percentage per sample was then calculated separately for autosomal chromosomes and for X chromosomes. All calculations were performed with custom R scripts. For comparison of RRBS data with datasets of naïve and primed hPSC the following files were downloaded from GEO dataset GSE85708: GSM1969063_allc_WIBR2_4i, GSM1969065_allc_WIBR3_5i, GSM1969069_allc_Primed_WIBR2, and GSM1969070_allc_Primed_WIBR3. Since these files are cytosine reports from Bisulfite-Seq experiments and include GRCh37(hg19) methylation information for all C contexts, the files were up-lifted to assembly GRCh38, and CpG context was extracted for further analysis utilizing UCSC liftOver utility and custom python scripts. Files were then re-formatted, tiled to consecutive tiles of 100 bases, and further processed as described above. The pipeline was repeated separately for LN-hPSC vs. naïve-hPSC files and for LN-hPSC vs. primed-hPSC files and also separately for autosomal chromosomes and for chromosome X. Tiles exhibiting a read count of at least 10 in each samples were reserved for further analysis. Differentially Methylated Regions (DMR) were analyzed with Methylkit, DNA methylation analysis from high-throughput bisulfite sequencing results, v1.8.1. (Akalin et al., 2012). Regions were defined as 100-base tiles with minimum CpG count of 10. DMRs were defined with methylation difference of 30% points minimum and p-Value of 1e-15 maximum. Regions were annotated with HOMER (Hypergeometric Optimization of Motif Enrichment) and specifically "annotatePeaks.pl" function V4.10.3 (Heinz et al., 2010). Plots were created with native R utilities and with ggplot2, a system for declaratively creating graphics (Wickham, 2016).

Alkaline phosphatase activity detection and karyotyping—Detection of alkaline phosphatase activity was performed on hPSC colonies using the Alkaline Phosphatase Staining Kit II (Stemgent, Cambridge, Mass., USA) according to the manufacturer's instructions. Karyotype analysis, was performed on 3-4 day hPSC colonies.

Differentiation of hESCs in vitro for assessment of pluripotency—LN-hPSCs were dissociated from the matrix using Collagenase type IV (Invitrogen), and cultured in suspension as embryoid bodies (EBs) in medium composed of DMEM, 15-20% FCS, 2 mM L-glutamine, 1% nonessential amino acids, 50 U/ml penicillin, 50 μg/ml streptomycin, and 0.1 mM beta-mercaptoethanol (all from Invitrogen), or as neural progenitors (NPs) in DMEM/F12 medium containing B-27 (1:50), 2 mM L-Glutamine, 50 U/ml penicillin, and 50 μg/ml streptomycin (all from Invitrogen), and supplemented with 20 ng/ml FGF2 and 500 ng/ml rh-Noggin (both from Peprotech). Following two weeks in culture, the EBs and NPs were further differentiated by partial dissociation, plating on glass coverslips coated with 10 μg/ml poly-d-lysine and 4 μg/ml laminin (both from Sigma), and culturing for additional 5-7 days in the respective culture media without noggin and FGF2. The differentiated cells were fixed with 4% PFA and stained with mouse monoclonal anti-beta-tubulin isotype III (1:2000; Sigma), mouse monoclonal anti-human muscle actin (1:50;

Dako), and mouse monoclonal anti-human FOXA2 (1:50; R&D), or polyclonal goat IgG anti-human SOX17 (1:100; R&D). Detection of the primary antibodies was performed by FITC-conjugated polyclonal goat anti-mouse immunoglobulins (1:50, Dako).

Teratoma Formation assay—Teratoma formation assay was performed as previously described (Gropp et al., 2012).

PGC differentiation of hPSCs in suspension—LN-hPSCs and hPSCs cultured on hrLN-521 were dissociated into a single-cell suspension using TrypLE Select Enzyme (Invitrogen). Primed hPSCs were first dissociated from the MEF feeders by treatment with collagenase type IV, followed by dissociation into single cells by TrypLE Select Enzyme. 2000-3000 cells were seeded into a microwell of AggreWell™800 24-well plate (STEMCELL Technologies), and cultured as EBs in suspension, in PGCLC differentiation medium as described elsewhere (Irie et al., 2015).

PGC differentiation of hPSCs as adherent cultures—LN-hPSCs, primed hPSCs, and hPSCs cultured on LN521, were cultured for 2-3 days in complete medium, and then for additional 3 days in a medium depleted for FGF2 in the presence of CHIR99021 3 µM.

Differentiation of LN-hPSCs and primed hPSCs into neural progenitors—LN-hPSCs were dissociated into a single-cell suspension using TrypLE Select Enzyme (Invitrogen). Primed hPSCs were first dissociated from the MEF feeders by treatment with collagenase type IV, followed by dissociation into single cells by TrypLE Select Enzyme. To generate neural spheres, 10,000 cells were seeded into each well, in a non-treated, round bottom, 96-well Costar assay plate (#3788, Corning) Neural spheres were cultured in suspension for 3 days in growth factor-free NutriStem medium (Biological Industries), supplemented with FGF2 (20 ng/ml), ROCK inhibitor (Y-276325, 10 mM), TGF-beta inhibitor (SB431542, 5 mM), and BMP4 inhibitor (LDN193189, 10 mM) (All from Peprotech). After 3 days, the medium was replaced with the same medium containing FGF2 and LDN193189, and the NPs were further cultured for 4 days. After 1 week of culturing the neural spheres were dissociated into single cells by TrypLE Select Enzyme, and analyzed by FACS as described above.

Results

LN111-based culture system can also support the prolonged self-renewal of genetically stable HES-2 (FIGS. 10A-E) and HADC100 (FIGS. 11A-E) hPSC lines, retaining their pluripotent potential.

Lack of the canonical WNT signaling is also observed in HES-2 and HADC100 hPSCs cultured on LN111 (FIG. 12A), while its induction up-regulates primitive streak and mesendodermal markers (FIG. 12B). In contrast, partial activity of the canonical WNT signaling is observed in conventional/primed HES-1 hPSCs cultured on MEFs (FIGS. 13A-B).

Figure 14A:
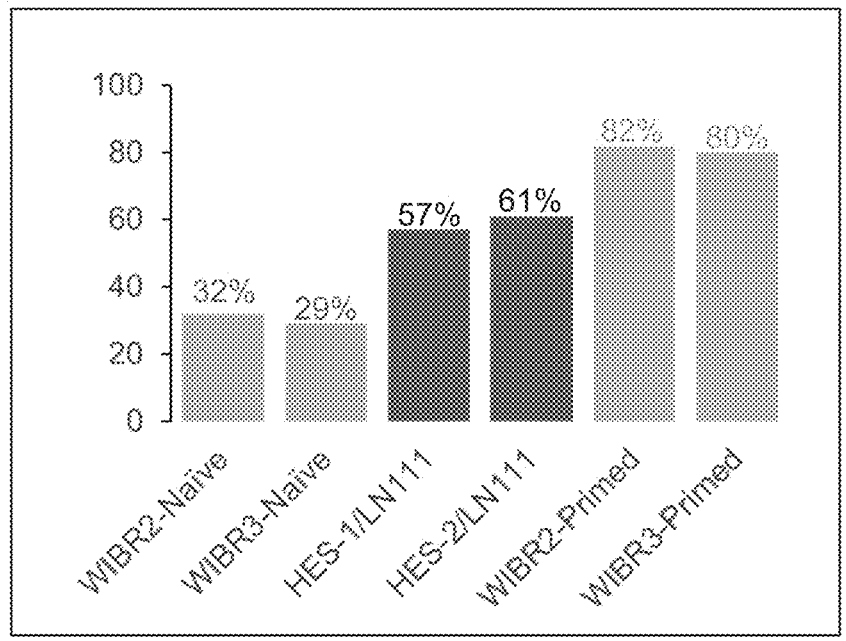
Figure 14B:
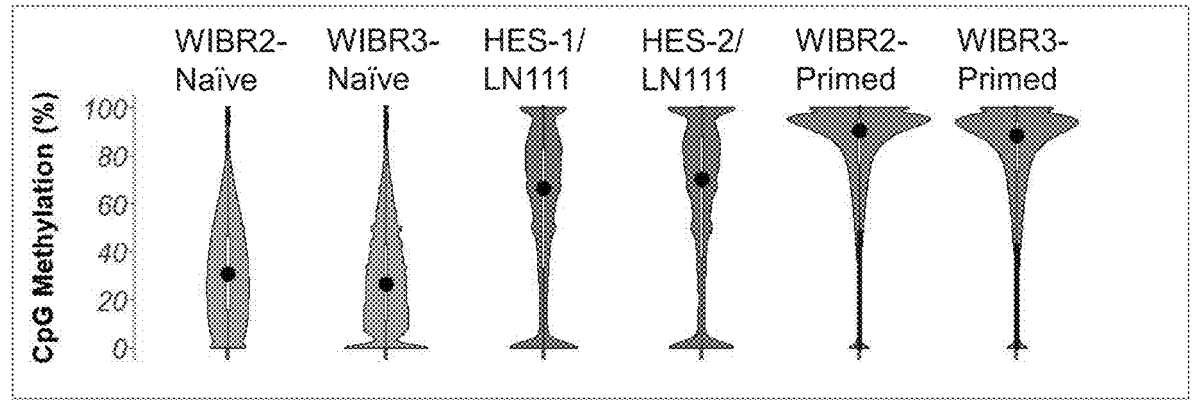
Figure 14C:
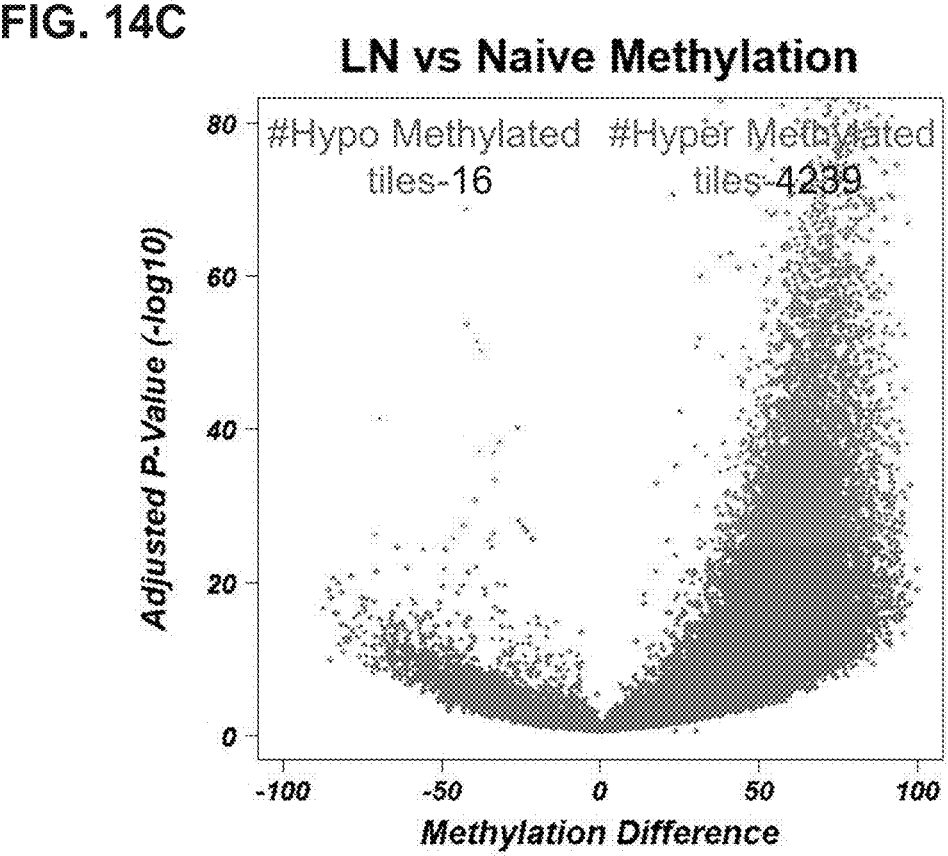
Figure 14D:
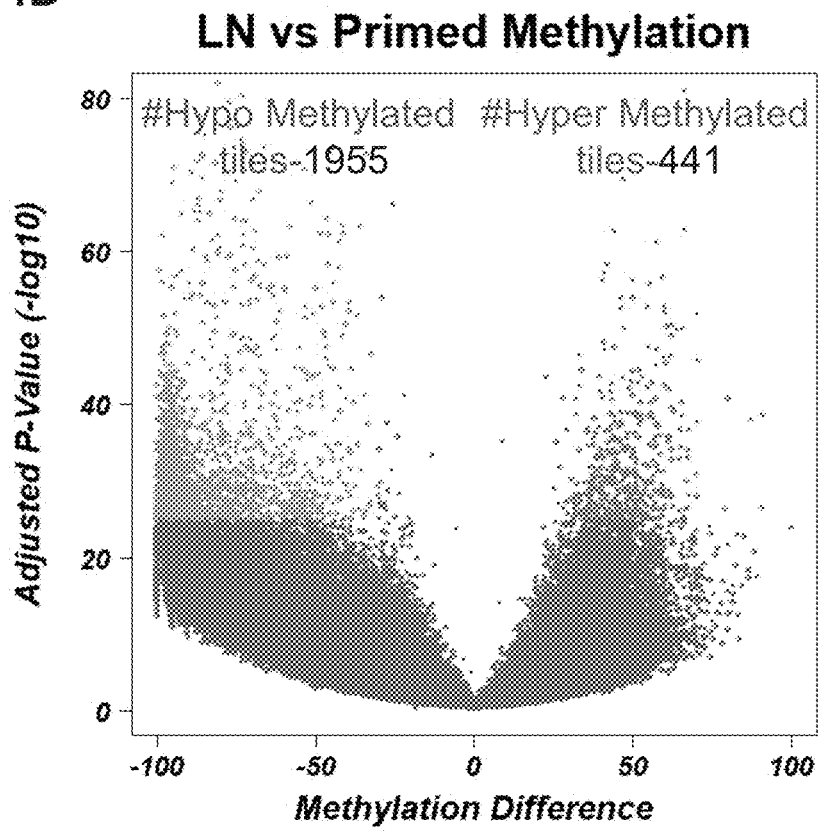

FIGS. 14A-B illustrate that HES-1 and HES-2 hPSCs cultured on LN111, show intermediate methylation levels between Naïve and conventional/primed hPSCs cultured on MEFs, that are more similar to primed hPSCs. This intermediate methylation status strengthens their distinct formative identity, and separates them from naïve and primed hPSCs.

HES-2 hPSCs cultured on LN111 are competent to initiate germ cell specification (FIGS. 15A-B). These results show that the potential to give rise to PGCs exists in additional hPSC lines cultured on LN111.

FIGS. 16A-B show that conventional/primed HES-1 cultured on MEFs do not express markers of PGCs following PGC induction, suggesting that they may lose their capacity to initiate PGC specification.

Human recombinant LN521 (hrLN521) based culture system shows characteristics similar to the LN111 based system. This system supports the undifferentiated propagation of HES-1 hPSCs expressing markers of pluripotency and early post-implantation epiblast (FIGS. 17A-B). Moreover, HES-1 hPSCs cultured on hrLN521 are competent to initiate germ cell specification (FIGS. 18A-B).

References for Example 2

Akalin, A., Kormaksson, M., Li, S., Garrett-Bakelman, F. E., Figueroa, M. E., Melnick, A., and Mason, C. E. (2012). methylKit: a comprehensive R package for the analysis of genome-wide DNA methylation profiles. Genome Biol 13, R87.

Ben-Dor, I., Itsykson, P., Goldenberg, D., Galun, E., and Reubinoff, B. E. (2006). Lentiviral vectors harboring a dual-gene system allow high and homogeneous transgene expression in selected polyclonal human embryonic stem cells. Mol Ther 14, 255-267.

Boyle, P., Clement, K., Gu, H., Smith, Z. D., Ziller, M., Fostel, J. L., Holmes, L., Meldrim, J., Kelley, F., Gnirke, A., et al. (2012). Gel-free multiplexed reduced representation bisulfite sequencing for large-scale DNA methylation profiling. Genome Biol 13, R92.

Chan, Y. S., Goke, J., Ng, J. H., Lu, X., Gonzales, K. A., Tan, C. P., Tng, W. Q., Hong, Z. Z., Lim, Y. S., and Ng, H. H. (2013). Induction of a human pluripotent state with distinct regulatory circuitry that resembles preimplantation epiblast. Cell Stem Cell 13, 663-675.

Galili, T. (2015). dendextend: an R package for visualizing, adjusting and comparing trees of hierarchical clustering. Bioinformatics 31, 3718-3720.

Gropp, M., Shilo, V., Vainer, G., Gov, M., Gil, Y., Khaner, H., Matzrafi, L., Idelson, M., Kopolovic, J., Zak, N. B., et al. (2012). Standardization of the teratoma assay for analysis of pluripotency of human ES cells and biosafety of their differentiated progeny. PLoS One 7, e45532.

Gu, Z., Eils, R., and Schlesner, M. (2016). Complex heatmaps reveal patterns and correlations in multidimensional genomic data. Bioinformatics 32, 2847-2849.

Guo, G., von Meyenn, F., Santos, F., Chen, Y., Reik, W., Bertone, P., Smith, A., and Nichols, J. (2016). Naive Pluripotent Stem Cells Derived Directly from Isolated Cells of the Human Inner Cell Mass. Stem Cell Reports 6, 437-446.

Heinz, S., Benner, C., Spann, N., Bertolino, E., Lin, Y. C., Laslo, P., Cheng, J. X., Murre, C., Singh, H., and Glass, C. K. (2010). Simple combinations of lineage-determining transcription factors prime cis-regulatory elements required for macrophage and B cell identities. Mol Cell 38, 576-589.

Irie, N., Weinberger, L., Tang, W. W., Kobayashi, T., Viukov, S., Manor, Y. S., Dietmann, S., Hanna, J. H., and Surani, M. A. (2015). SOX17 is a critical specifier of human primordial germ cell fate. Cell 160, 253-268.

Ji, X., Dadon, D. B., Powell, B. E., Fan, Z. P., Borges-Rivera, D., Shachar, S., Weintraub, A. S., Hnisz, D., Pegoraro, G., Lee, T. I., et al. (2016). 3D Chromosome Regulatory Landscape of Human Pluripotent Cells. Cell Stem Cell 18, 262-275.

Love, M. I., Huber, W., and Anders, S. (2014). Moderated estimation of fold change and dispersion for RNA-seq data with DESeq2. Genome Biol 15, 550.

Patro, R., Duggal, G., Love, M. I., Irizarry, R. A., and Kingsford, C. (2017). Salmon provides fast and bias-aware quantification of transcript expression. Nat Methods 14, 417-419.

Reubinoff, B. E., Pera, M. F., Fong, C. Y., Trounson, A., and Bongso, A. (2000). Embryonic stem cell lines from human blastocysts: somatic differentiation in vitro. Nat Biotechnol 18, 399-404.

Takashima, Y., Guo, G., Loos, R., Nichols, J., Ficz, G., Krueger, F., Oxley, D., Santos, F., Clarke, J., Mansfield, W., et al. (2014). Resetting transcription factor control circuitry toward ground-state pluripotency in human. Cell 158, 1254-1269.

Tannenbaum, S. E., Turetsky, T. T., Singer, O., Aizenman, E., Kirshberg, S., Ilouz, N., Gil, Y., Berman-Zaken, Y., Perlman, T. S., Geva, N., et al. (2012). Derivation of xeno-free and GMP-grade human embryonic stem cells—platforms for future clinical applications. PLoS One 7, e35325.

Theunissen, T. W., Powell, B. E., Wang, H., Mitalipova, M., Faddah, D. A., Reddy, J., Fan, Z. P., Maetzel, D., Ganz, K., Shi, L., et al. (2014). Systematic identification of culture conditions for induction and maintenance of naive human pluripotency. Cell Stem Cell 15, 471-487.

Thomson, J. A., Itskovitz-Eldor, J., Shapiro, S. S., Waknitz, M. A., Swiergiel, J. J., Marshall, V. S., and Jones, J. M. (1998). Embryonic stem cell lines derived from human blastocysts. Science 282, 1145-1147.

Wickham, H. (2016). ggplot2: Elegant Graphics for Data Analysis (New York: Springer).

---

What is claimed is:

1. A method of enriching for a population of formative hPSCs which express WNT receptors but do not express nuclear B-catenin, the method comprising culturing non-formative hPSCs on an adherent surface which comprises a coating of a single protein, said single protein being laminin, said culturing being effected in a culture medium comprising fibroblast growth factor 2 (FGF2), thereby enriching for the population of formative hPSCs which express WNT receptors but do not express nuclear B-catenin.

2. The method of claim 1, wherein said non-formative hPSCs comprise human ESCs or induced pluripotent stem cells (iPSCs).

3. The method of claim 1, wherein said coating is present in an amount of about 20 μg per $cm^2$.

4. The method of claim 1, wherein said coating comprises between 50-500 μg of said laminin per 9.6 $cm^2$ well.

5. The method of claim 1, wherein concentration of said FGF2 is between 5-50 ng/ml.

6. The method of claim 1, wherein said formative hPSCs express FGF5, as measured by immunostaining.

7. The method of claim 1, wherein said formative hPSCs express at least one marker selected from the group consisting of OCT4, NANOG, SOX2, TRA-1-60, SSEA3, SSEA4 and TRA-1-81.

8. The method of claim 1, wherein a concentration of said FGF2 is about 20 ng/ml.

* * * * *